(12) United States Patent
Chen et al.

(10) Patent No.: US 9,772,471 B2
(45) Date of Patent: Sep. 26, 2017

(54) MOBILE DEVICE AND OPTICAL IMAGING LENS THEREOF

(71) Applicant: GENIUS ELECTRONIC OPTICAL CO., LTD., Taichung (TW)

(72) Inventors: Shih-Han Chen, Taichung (TW); Yan Bin Chen, Fujian (CN); Long Ye, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/097,984

(22) Filed: Apr. 13, 2016

(65) Prior Publication Data

US 2017/0097490 A1    Apr. 6, 2017

Related U.S. Application Data

(63) Continuation of application No. 14/549,477, filed on Nov. 20, 2014, now Pat. No. 9,341,816, which is a
(Continued)

(30) Foreign Application Priority Data

Jul. 20, 2012    (CN) .......................... 2012 1 0252531

(51) Int. Cl.
*G02B 13/18*    (2006.01)
*G02B 3/02*    (2006.01)
(Continued)

(52) U.S. Cl.
CPC ............. *G02B 13/004* (2013.01); *G02B 3/00* (2013.01); *G02B 5/005* (2013.01); *G02B 5/208* (2013.01);
(Continued)

(58) Field of Classification Search
CPC ......... G02B 9/34; G02B 13/004; G02B 13/18
(Continued)

(56) References Cited

U.S. PATENT DOCUMENTS 7,274,518 B1    9/2007 Tang et al.
7,453,654 B2    11/2008 Shinohara
(Continued)

FOREIGN PATENT DOCUMENTS

CN    101393378    3/2009
CN    101655599    2/2010
(Continued)

OTHER PUBLICATIONS

Non-Final Office Action for U.S. Appl. No. 13/770,838 dated Jun. 11, 2014, 6 pages.
(Continued)

*Primary Examiner* — William Choi
(74) *Attorney, Agent, or Firm* — Kilpatrick Townsend & Stockton LLP

(57) ABSTRACT the An optical imaging lens includes four lens elements positioned in order from object side to the image side of the optical imaging lens. Through controlling the convex or concave shape of the surfaces of lens elements, the refracting power of lens elements, the thickness of the at least one lens element, one or more air gaps between lens elements along the optical axis, and a half field of view HFOV of the optical imaging lens, an embodiment satisfies the relation: $4.21 \leq T3/(G12 \times \tan(HFOV)) \leq 7.55$, for which T3 is the thickness of the third lens element and $G_{12}$ is the air gap between the first lens element and the second lens element. The optical imaging lens provided by embodiments of the present invention has better optical characteristics and a reduced total length in comparison to conventional lenses.

19 Claims, 48 Drawing Sheets

Related U.S. Application Data continuation of application No. 13/770,838, filed on Feb. 19, 2013, now Pat. No. 8,929,000.

(51) Int. Cl.
*G02B 9/34* (2006.01)
*G02B 13/00* (2006.01)
*G02B 3/00* (2006.01)
*G02B 7/02* (2006.01)
*G02B 5/00* (2006.01)
*G02B 5/20* (2006.01)
*G02B 7/08* (2006.01)
*G02B 27/00* (2006.01)
*H04N 5/225* (2006.01)

(52) U.S. Cl.
CPC ............. *G02B 7/021* (2013.01); *G02B 7/022* (2013.01); *G02B 7/08* (2013.01); *G02B 9/34* (2013.01); *G02B 27/0025* (2013.01); *H04N 5/2253* (2013.01); *H04N 5/2254* (2013.01); *H04N 5/2257* (2013.01)

(58) Field of Classification Search
USPC ................................. 359/715, 753, 771–774
See application file for complete search history.

(56) References Cited

U.S. PATENT DOCUMENTS

| | | | |
|---|---|---|---|
| 7,715,119 | B2 | 5/2010 | Taniyama |
| 7,777,972 | B1 | 8/2010 | Chen et al. |
| 7,848,032 | B1 | 12/2010 | Chen et al. |
| 7,920,340 | B2 | 4/2011 | Tang |
| 7,969,664 | B2 | 6/2011 | Tang et al. |
| 8,068,290 | B1 | 11/2011 | Tsai et al. |
| 8,089,704 | B2 | 1/2012 | Tang et al. |
| 8,929,000 | B2 | 1/2015 | Chen et al. |
| 9,341,816 | B2 | 5/2016 | Chen et al. |
| 2005/0105194 | A1 | 5/2005 | Matsui et al. |
| 2007/0008625 | A1 | 1/2007 | Park et al. |
| 2009/0109549 | A1* | 4/2009 | Yasuhiko ................ G02B 9/34 359/715 |
| 2011/0025903 | A1 | 2/2011 | Naoi |
| 2011/0090572 | A1 | 4/2011 | Tang |
| 2011/0115962 | A1 | 5/2011 | Chen et al. |
| 2011/0261470 | A1 | 10/2011 | Chen et al. |
| 2012/0002302 | A1 | 1/2012 | Cho |
| 2012/0013998 | A1 | 1/2012 | Tang et al. |
| 2012/0033124 | A1 | 2/2012 | Tsai |
| 2012/0044403 | A1* | 2/2012 | Tang .................... G02B 13/18 348/340 |
| 2012/0063012 | A1* | 3/2012 | Lee ...................... G02B 13/004 359/772 |
| 2012/0140105 | A1* | 6/2012 | Tang .................... G02B 13/004 348/340 |

FOREIGN PATENT DOCUMENTS

| | | |
|---|---|---|
| CN | 102483504 | 5/2012 |
| CN | 202339435 | 7/2012 |
| JP | 2009169005 | 7/2009 |
| JP | 2011507036 | 3/2011 |
| TW | 201209472 | 3/2012 |

OTHER PUBLICATIONS

Notice of Allowance for U.S. Appl. No. 13/770,838 dated Oct. 16, 2014, 7 pages.

Final Office Action for U.S. Appl. No. 14/549,477 dated Sep. 29, 2015, 11 pages.

Non-Final Office Action for U.S. Appl. No. 14/549,477 dated Mar. 20, 2015, 9 pages.

Notice of Allowance for U.S. Appl. No. 14/549,477 dated Jan. 20, 2016, 8 pages.

Office Action for Chinese Application No. 2012102525310 dated Sep. 19, 2014, 7 pages.

Taiwan Application No. 101138125, Office Action dated May 13, 2014, 6 pages.

* cited by examiner

| f(focal length)=2.34 mm, HFOV(Half angular field of view)=35.544 deg ||||||||
|---|---|---|---|---|---|---|---|
| Surface# | | Radius | Thickness | Refractive index | Abbe number | Material | focal length |
| - | Object | ∞ | | | | | |
| 100 | Aperture stop | ∞ | -0.03 | | | | |
| 111 | 1st lens element | 1.441 | 0.443 | 1.544102 | 56.1143 | plastic | 1.8216 |
| 112 | | -2.861 | 0.098 | | | | |
| 121 | 2nd lens element | -5.852 | 0.29 | 1.632210 | 23.2792 | plastic | -3.2152 |
| 122 | | 3.212 | 0.348 | | | | |
| 131 | 3rd lens element | -0.952 | 0.399 | 1.544102 | 56.1143 | plastic | 1.3896 |
| 132 | | -0.485 | 0.035 | | | | |
| 141 | 4th lens element | 1.287 | 0.284 | 1.531130 | 55.7441 | plastic | -1.5975 |
| 142 | | 0.473 | 0.4 | | | | |
| 151 | IR cut filter | ∞ | 0.30000 | 1.5168 | 64.1673 | | |
| 152 | IR cut filter | ∞ | 0.466 | | | | |
| 160 | Image plane | ∞ | | | | | |

FIG.2

| Aspherical parameters | | | | |
|---|---|---|---|---|
| Surface# | 111 | 112 | 121 | 122 |
| K | -1.72E+01 | 1.56E+01 | -4.04E+01 | -4.15E+01 |
| a4 | 5.26E-01 | -5.06E-01 | -4.90E-01 | 2.17E-01 |
| a6 | -2.18E+00 | -8.64E-01 | -1.77E+00 | -1.46E+00 |
| a8 | 1.24E+00 | 1.50E+00 | 7.81E+00 | 3.80E+00 |
| a10 | 5.47E+00 | 6.03E+00 | -2.31E+00 | -2.32E+00 |
| a12 | -2.61E+01 | -1.39E+01 | 3.81E+00 | -5.26E+00 |
| a14 | -1.24E+02 | 9.64E+00 | -1.98E+01 | 7.27E+00 |
| a16 | 5.59E+02 | -4.24E+00 | -9.13E+00 | -3.44E-01 |
| Surface# | 131 | 132 | 141 | 142 |
| K | -2.06E+00 | -3.06E+00 | -4.21E+00 | -5.10E+00 |
| a4 | 2.44E-01 | -3.40E-01 | -3.65E-01 | -2.34E-01 |
| a6 | -6.21E-01 | 8.00E-02 | 1.73E-01 | 1.53E-01 |
| a8 | 2.91E-01 | 9.41E-01 | 6.70E-02 | -1.20E-01 |
| a10 | -1.69E+00 | -1.54E+00 | -7.10E-02 | 6.00E-02 |
| a12 | 3.67E+00 | 1.91E+00 | -2.88E-03 | -9.59E-03 |
| a14 | 8.09E+00 | 1.71E+00 | 1.60E-02 | -1.88E-03 |
| a16 | -2.45E+01 | -3.34E+00 | -5.57E-03 | 4.73E-05 |

FIG.4

| f(focal length)=2.557882 mm, HFOV(Half angular field of view)=32.177 deg. | | | | | | | |
|---|---|---|---|---|---|---|---|
| Surface# | | Radius | Thickness | Refractive index | Abbe number | Material | focal length |
| - | Object | ∞ | | | | | |
| 200 | Aperture stop | ∞ | -0.03 | | | | |
| 211 | 1st lens element | 1.482 | 0.444 | 1.544102 | 56.1143 | plastic | 1.8571 |
| 212 | | -2.861 | 0.107 | | | | |
| 221 | 2nd lens element | -5.76 | 0.317 | 1.632210 | 23.2792 | plastic | -3.1761 |
| 222 | | 3.186 | 0.355 | | | | |
| 231 | 3rd lens element | -0.936 | 0.413 | 1.544102 | 56.1143 | plastic | 1.3747 |
| 232 | | -0.481 | 0.059 | | | | |
| 241 | 4th lens element | 1.326 | 0.257 | 1.531130 | 55.7441 | plastic | -1.5144 |
| 242 | | 0.468 | 0.4 | | | | |
| 251 | IR cut filter | ∞ | 0.30000 | 1.5168 | 64.1673 | | |
| 252 | IR cut filter | ∞ | 0.614 | | | | |
| 260 | Image plane | ∞ | | | | | |

FIG.7

| Aspherical parameters | | | | |
|---|---|---|---|---|
| Surface# | 211 | 212 | 221 | 222 |
| K | -1.90E+01 | 1.61E+01 | -7.06E+01 | -3.67E+01 |
| a4 | 5.26E-01 | -5.06E-01 | -4.90E-01 | 2.17E-01 |
| a6 | -2.18E+00 | -8.64E-01 | -1.77E+00 | -1.46E+00 |
| a8 | 1.24E+00 | 1.50E+00 | 7.81E+00 | 3.80E+00 |
| a10 | 5.47E+00 | 6.03E+00 | -2.31E+00 | -2.32E+00 |
| a12 | -2.61E+01 | -1.39E+01 | 3.81E+00 | -5.26E+00 |
| a14 | -1.24E+02 | 9.64E+00 | -1.98E+01 | 7.27E+00 |
| a16 | 5.59E+02 | -4.24E+00 | -9.13E+00 | -3.44E-01 |
| Surface# | 231 | 232 | 241 | 242 |
| K | -1.98E+00 | -3.31E+00 | -4.12E+00 | -5.17E+00 |
| a4 | 2.44E-01 | -3.40E-01 | -3.65E-01 | -2.34E-01 |
| a6 | -6.21E-01 | 8.00E-02 | 1.73E-01 | 1.53E-01 |
| a8 | 2.91E-01 | 9.41E-01 | 6.70E-02 | -1.20E-01 |
| a10 | -1.69E+00 | -1.54E+00 | -7.10E-02 | 6.00E-02 |
| a12 | 3.67E+00 | 1.91E+00 | -2.88E-03 | -9.59E-03 |
| a14 | 8.09E+00 | 1.71E+00 | 1.60E-02 | -1.88E-03 |
| a16 | -2.45E+01 | -3.34E+00 | -5.57E-03 | 4.73E-05 |

FIG.8

| f(focal length)=2.557882 mm, HFOV(Half angular field of view)=32.177 deg. | | | | | | | |
|---|---|---|---|---|---|---|---|
| Surface# | | Radius | Thickness | Refractive index | Abbe number | Material | focal length |
| - | Object | ∞ | | | | | |
| 300 | Aperture stop | ∞ | -0.03 | | | | |
| 311 | 1st lens element | 1.451 | 0.428 | 1.544102 | 56.1143 | plastic | 1.8294 |
| 312 | | -2.871 | 0.133 | | | | |
| 321 | 2nd lens element | -4.857 | 0.348 | 1.632210 | 23.2792 | plastic | -3.0839 |
| 322 | | 3.391 | 0.348 | | | | |
| 331 | 3rd lens element | -0.963 | 0.382 | 1.544102 | 56.1143 | plastic | 1.3786 |
| 332 | | -0.482 | 0.078 | | | | |
| 341 | 4th lens element | 1.4 | 0.247 | 1.531130 | 55.7441 | plastic | -1.5163 |
| 342 | | 0.481 | 0.4 | | | | |
| 351 | IR cut filter | ∞ | 0.30000 | 1.5168 | 64.1673 | | |
| 352 | IR cut filter | ∞ | 0.494 | | | | |
| 360 | Image plane | ∞ | | | | | |

FIG.11

| Aspherical parameters | | | | |
|---|---|---|---|---|
| Surface# | 311 | 312 | 321 | 322 |
| K | -1.90E+01 | 1.55E+01 | -5.33E+01 | -3.62E+01 |
| a4 | 5.10E-01 | -5.01E-01 | -4.77E-01 | 2.15E-01 |
| a6 | -2.28E+00 | -8.93E-01 | -1.75E+00 | -1.47E+00 |
| a8 | 1.22E+00 | 1.35E+00 | 7.89E+00 | 3.87E+00 |
| a10 | 6.89E+00 | 5.70E+00 | -2.15E+00 | -2.28E+00 |
| a12 | -3.29E+01 | -1.39E+01 | 3.90E+00 | -6.23E+00 |
| a14 | -1.21E+02 | 7.12E+00 | -2.03E+01 | 7.86E+00 |
| a16 | 4.87E+02 | -3.53E+00 | -5.56E+00 | 8.22E+00 |
| Surface# | 331 | 332 | 341 | 342 |
| K | -1.97E+00 | -3.09E+00 | -5.09E+00 | -5.29E+00 |
| a4 | 2.07E-01 | -3.37E-01 | -3.84E-01 | -2.67E-01 |
| a6 | -6.58E-01 | 4.50E-02 | 2.19E-01 | 1.70E-01 |
| a8 | 3.55E-01 | 8.92E-01 | 3.60E-02 | -1.15E-01 |
| a10 | -1.79E+00 | -1.43E+00 | -7.40E-02 | 5.40E-02 |
| a12 | 3.75E+00 | 2.07E+00 | 2.31E-03 | -1.20E-02 |
| a14 | 8.45E+00 | 1.68E+00 | 1.70E-02 | -1.98E-03 |
| a16 | -2.67E+01 | -3.91E+00 | -4.78E-03 | 1.02E-03 |

FIG.12

| f(focal length)=2.72496 mm,HFOV(Half angular field of view)=32.023 deg. |||||||
|---|---|---|---|---|---|---|
| Surface# | | Radius | Thickness | Refractive index | Abbe number | Material | focal length |
| - | Object | ∞ | | | | | |
| 400 | Aperture stop | ∞ | -0.03 | | | | |
| 411 | 1st lens element | 1.458 | 0.439 | 1.544102 | 56.1143 | plastic | 1.8246 |
| 412 | | -2.811 | 0.123 | | | | |
| 421 | 2nd lens element | -5.491 | 0.383 | 1.632210 | 23.2792 | plastic | -3.0785 |
| 422 | | 3.134 | 0.297 | | | | |
| 431 | 3rd lens element | -0.948 | 0.441 | 1.544102 | 56.1143 | plastic | 1.3229 |
| 432 | | -0.477 | 0.031 | | | | |
| 441 | 4th lens element | 1.457 | 0.267 | 1.531130 | 55.7441 | plastic | -1.4659 |
| 442 | | 0.476 | 0.4 | | | | |
| 451 | IR cut filter | ∞ | 0.30000 | 1.5168 | 64.1673 | | |
| 452 | IR cut filter | ∞ | 0.577 | | | | |
| 460 | Image plane | ∞ | | | | | |

FIG.15

| Aspherical parameters | | | | |
|---|---|---|---|---|
| Surface# | 411 | 412 | 421 | 422 |
| K | -1.79E+01 | 1.57E+01 | -4.62E+01 | -2.38E+01 |
| a4 | 5.04E-01 | -5.11E-01 | -4.82E-01 | 2.21E-01 |
| a6 | -2.29E+00 | -8.98E-01 | -1.75E+00 | -1.48E+00 |
| a8 | 1.31E+00 | 1.42E+00 | 7.87E+00 | 3.82E+00 |
| a10 | 7.37E+00 | 5.99E+00 | -2.12E+00 | -2.30E+00 |
| a12 | -3.27E+01 | -1.33E+01 | 3.90E+00 | -6.19E+00 |
| a14 | -1.23E+02 | 8.02E+00 | -2.03E+01 | 8.26E+00 |
| a16 | 4.74E+02 | -7.75E+00 | -4.40E+00 | 1.05E+01 |
| Surface# | 431 | 432 | 441 | 442 |
| K | -1.96E+00 | -3.24E+00 | -5.00E+00 | -5.70E+00 |
| a4 | 2.14E-01 | -3.29E-01 | -3.74E-01 | -2.60E-01 |
| a6 | -6.49E-01 | 4.40E-02 | 2.20E-01 | 1.74E-01 |
| a8 | 3.19E-01 | 8.93E-01 | 3.60E-02 | -1.15E-01 |
| a10 | -1.87E+00 | -1.43E+00 | -7.40E-02 | 5.40E-02 |
| a12 | 3.70E+00 | 2.07E+00 | 2.59E-03 | -1.20E-02 |
| a14 | 8.59E+00 | 1.65E+00 | 1.70E-02 | -1.83E-03 |
| a16 | -2.63E+01 | -4.01E+00 | -4.72E-03 | 1.16E-03 |

FIG.16

| f(focal length)=2.72496 mm,HFOV(Half angular field of view)=32.023 deg. |||||||||
|---|---|---|---|---|---|---|---|
| Surface# | | Radius | Thickness | Refractive index | Abbe number | Material | focal length |
| - | Object | ∞ | | | | | |
| 500 | Aperture stop | ∞ | -0.03 | | | | |
| 511 | 1st lens element | 1.42 | 0.424 | 1.544102 | 56.1143 | plastic | 1.7876 |
| 512 | | -2.792 | 0.097 | | | | |
| 521 | 2nd lens element | -4.818 | 0.303 | 1.632210 | 23.2792 | plastic | -3.3173 |
| 522 | | 3.857 | 0.281 | | | | |
| 531 | 3rd lens element | -1.024 | 0.458 | 1.544102 | 56.1143 | plastic | 1.3272 |
| 532 | | -0.491 | 0.094 | | | | |
| 541 | 4th lens element | 1.517 | 0.249 | 1.531130 | 55.7441 | plastic | -1.4583 |
| 542 | | 0.485 | 0.4 | | | | |
| 551 | IR cut filter | ∞ | 0.30000 | 1.5168 | 64.1673 | | |
| 552 | IR cut filter | ∞ | 0.475 | | | | |
| 560 | Image plane | ∞ | | | | | |

FIG.19

| Aspherical parameters | | | | |
|---|---|---|---|---|
| Surface# | 511 | 512 | 521 | 522 |
| K | -1.84E+01 | 1.60E+01 | -3.84E+01 | -3.04E+01 |
| a4 | 5.35E-01 | -5.16E-01 | -4.87E-01 | 2.16E-01 |
| a6 | -2.23E+00 | -9.08E-01 | -1.77E+00 | -1.48E+00 |
| a8 | 1.19E+00 | 1.41E+00 | 7.82E+00 | 3.85E+00 |
| a10 | 6.30E+00 | 5.95E+00 | -2.15E+00 | -2.25E+00 |
| a12 | -3.51E+01 | -1.36E+01 | 3.95E+00 | -6.17E+00 |
| a14 | -1.26E+02 | 5.71E+00 | -1.96E+01 | 7.98E+00 |
| a16 | 4.70E+02 | -1.64E+01 | -2.82E+00 | 9.12E+00 |
| Surface# | 531 | 532 | 541 | 542 |
| K | -2.24E+00 | -3.20E+00 | -5.28E+00 | -5.24E+00 |
| a4 | 2.36E-01 | -3.23E-01 | -3.92E-01 | -2.69E-01 |
| a6 | -6.28E-01 | 7.00E-02 | 2.18E-01 | 1.73E-01 |
| a8 | 3.48E-01 | 9.22E-01 | 3.80E-02 | -1.15E-01 |
| a10 | -1.79E+00 | -1.41E+00 | -7.20E-02 | 5.40E-02 |
| a12 | 3.93E+00 | 2.08E+00 | 3.18E-03 | -1.20E-02 |
| a14 | 9.24E+00 | 1.67E+00 | 1.70E-02 | -1.86E-03 |
| a16 | -2.40E+01 | -3.94E+00 | -5.07E-03 | 1.16E-03 |

FIG.20

| f(focal length)=2.821205 mm,HFOV(Half angular field of view)=29.667 deg. | | | | | | | |
|---|---|---|---|---|---|---|---|
| Surface# | | Radius | Thickness | Refractive index | Abbe number | Material | focal length |
| - | Object | ∞ | | | | | |
| 600 | Aperture stop | ∞ | -0.03 | | | | |
| 611 | 1st lens element | 1.181 | 0.41 | 1.544102 | 56.1143 | plastic | 1.5094 |
| 612 | | -2.39 | 0.118 | | | | |
| 621 | 2nd lens element | -2.566 | 0.385 | 1.632210 | 23.2792 | plastic | -2.5248 |
| 622 | | 4.561 | 0.368 | | | | |
| 631 | 3rd lens element | -1.15 | 0.424 | 1.544102 | 56.1143 | plastic | 2.4585 |
| 632 | | -0.7 | 0.104 | | | | |
| 641 | 4th lens element | 7.775 | 0.408 | 1.531130 | 55.7441 | plastic | -1.9599 |
| 642 | | 0.904 | 0.4 | | | | |
| 651 | IR cut filter | ∞ | 0.30000 | 1.5168 | 64.1673 | | |
| 652 | IR cut filter | ∞ | 0.323 | | | | |
| 660 | Image plane | ∞ | | | | | |

FIG.23

| Aspherical parameters | | | | |
|---|---|---|---|---|
| Surface# | 611 | 612 | 621 | 622 |
| K | -1.11E+01 | 1.22E+01 | -7.01E+01 | -3.34E+01 |
| a4 | 6.04E-01 | -7.60E-02 | -1.90E-01 | 3.35E-01 |
| a6 | -2.09E+00 | -9.39E-01 | -1.18E+00 | -1.28E+00 |
| a8 | 1.30E+00 | 3.08E-01 | 7.56E+00 | 4.10E+00 |
| a10 | 6.14E+00 | 4.73E+00 | -6.83E+00 | -1.89E+00 |
| a12 | -3.41E+01 | -1.28E+01 | -7.07E+00 | -6.06E+00 |
| a14 | -1.16E+02 | 7.61E+00 | -2.07E+01 | 8.37E+00 |
| a16 | 4.34E+02 | -1.24E+01 | 8.23E+01 | 3.02E+01 |
| Surface# | 631 | 632 | 641 | 642 |
| K | -4.18E+00 | -3.71E+00 | -4.54E+01 | -9.75E+00 |
| a4 | -1.12E-01 | -1.45E-01 | -2.94E-01 | -2.64E-01 |
| a6 | -9.34E-01 | 3.80E-02 | 2.34E-01 | 1.89E-01 |
| a8 | 7.25E-01 | 6.24E-01 | 2.70E-02 | -1.27E-01 |
| a10 | -3.21E+00 | -1.57E+00 | -8.40E-02 | 5.70E-02 |
| a12 | 4.70E+00 | 2.14E+00 | 6.00E-04 | -1.20E-02 |
| a14 | 1.37E+01 | 1.83E+00 | 1.70E-02 | -2.15E-03 |
| a16 | -6.82E+00 | -3.58E+00 | -5.51E-03 | 7.43E-04 |

FIG.24

| f(focal length)=2.462521 mm, HFOV(Half angular field of view)=32.852 deg. ||||||||
|---|---|---|---|---|---|---|---|
| Surface # | | Radius | Thickness | Refractive index | Abbe number | Material | focal length |
| - | Object | ∞ | | | | | |
| 700 | Aperture stop | ∞ | -0.03 | | | | |
| 711 | 1st lens element | 1.372 | 0.437 | 1.544102 | 56.1143 | plastic | 1.7668 |
| 712 | | -2.881 | 0.103 | | | | |
| 721 | 2nd lens element | -5.23 | 0.26 | 1.632210 | 23.2792 | plastic | -3.1745 |
| 722 | | 3.36 | 0.41 | | | | |
| 731 | 3rd lens element | -0.757 | 0.28 | 1.544102 | 56.1143 | plastic | 1.5721 |
| 732 | | -0.455 | 0.068 | | | | |
| 741 | 4th lens element | 1.267 | 0.255 | 1.531130 | 55.7441 | plastic | -1.6718 |
| 742 | | 0.486 | 0.4 | | | | |
| 751 | IR cut filter | ∞ | 0.30000 | 1.5168 | 64.1673 | | |
| 752 | IR cut filter | ∞ | 0.551 | | | | |
| 760 | Image plane | ∞ | | | | | |

FIG.27

| | Aspherical parameters | | | |
|---|---|---|---|---|
| Surface# | 711 | 712 | 721 | 722 |
| K | -1.89E+01 | 1.66E+01 | 1.48E+01 | -1.04E+02 |
| a4 | 5.66E-01 | -4.96E-01 | -5.25E-01 | 1.34E-01 |
| a6 | -2.00E+00 | -8.41E-01 | -1.63E+00 | -1.73E+00 |
| a8 | 9.32E-01 | 1.44E+00 | 7.80E+00 | 3.49E+00 |
| a10 | 1.37E+00 | 5.08E+00 | -3.86E+00 | -2.06E+00 |
| a12 | -3.05E+01 | -1.88E+01 | -2.19E+00 | -4.53E+00 |
| a14 | -2.79E+01 | -1.20E+01 | -2.65E+01 | 5.86E+00 |
| a16 | 2.65E+02 | 3.35E+01 | -1.95E+01 | -1.64E+01 |
| Surface# | 731 | 732 | 741 | 742 |
| K | -2.52E+00 | -3.14E+00 | -3.63E+00 | -5.93E+00 |
| a4 | 1.81E-01 | -2.42E-01 | -3.85E-01 | -2.45E-01 |
| a6 | -7.59E-01 | 2.30E-01 | 1.91E-01 | 1.34E-01 |
| a8 | 1.53E-01 | 1.16E+00 | 7.40E-02 | -1.15E-01 |
| a10 | -2.20E+00 | -1.32E+00 | -7.10E-02 | 6.40E-02 |
| a12 | 2.60E+00 | 2.08E+00 | -5.11E-03 | -8.33E-03 |
| a14 | 7.46E+00 | 1.73E+00 | 1.60E-02 | -2.06E-03 |
| a16 | -1.61E+01 | -4.34E+00 | -4.62E-03 | -7.16E-04 |

FIG.28

| f(focal length)=2.670121 mm,HFOV(Half angular field of view)=30.689 deg. ||||||||
|---|---|---|---|---|---|---|---|
| Surface# | | Radius | Thickness | Refractive index | Abbe number | Material | focal length |
| - | Object | ∞ | | | | | |
| 800 | Aperture stop | ∞ | -0.03 | | | | |
| 811 | 1st lens element | 1.531 | 0.437 | 1.544102 | 56.1143 | plastic | 1.4508 |
| 812 | | -1.475 | 0.131 | | | | |
| 821 | 2nd lens element | -1.531 | 0.275 | 1.632210 | 23.2792 | plastic | -2.4019 |
| 822 | | 2264.766 | 0.367 | | | | |
| 831 | 3rd lens element | -0.769 | 0.539 | 1.544102 | 56.1143 | plastic | 1.0492 |
| 832 | | -0.409 | 0.049 | | | | |
| 841 | 4th lens element | 2.259 | 0.25 | 1.531130 | 55.7441 | plastic | -1.106 |
| 842 | | 0.449 | 0.4 | | | | |
| 851 | IR cut filter | ∞ | 0.30000 | 1.5168 | 64.1673 | | |
| 852 | IR cut filter | ∞ | 0.66 | | | | |
| 860 | Image plane | ∞ | | | | | |

FIG.31

| Aspherical parameters | | | | |
|---|---|---|---|---|
| Surface# | 811 | 812 | 821 | 822 |
| K | -2.05E+01 | 5.37E+00 | -7.61E+00 | 1.54E+07 |
| a4 | 4.15E-01 | -1.98E-01 | -2.52E-01 | 1.76E-01 |
| a6 | -2.66E+00 | -7.30E-01 | -7.06E-01 | -1.25E+00 |
| a8 | 1.37E+00 | 2.36E+00 | 7.22E+00 | 4.62E+00 |
| a10 | 5.21E+00 | 3.31E+00 | -8.50E+00 | -2.02E+00 |
| a12 | -3.44E+01 | -1.53E+01 | -1.43E+00 | -1.33E+01 |
| a14 | -1.44E+02 | -1.67E+01 | 1.34E+01 | 5.71E+00 |
| a16 | 3.91E+02 | 1.58E+02 | 5.80E+00 | 6.30E+01 |
| Surface# | 831 | 832 | 841 | 842 |
| K | -9.34E-01 | -3.65E+00 | 2.90E-02 | -7.33E+00 |
| a4 | 4.50E-02 | -6.35E-01 | -2.28E-01 | -2.67E-01 |
| a6 | -1.63E+00 | 7.63E-01 | 1.12E-01 | 2.70E-01 |
| a8 | 2.74E+00 | 3.27E-01 | 7.50E-02 | -1.92E-01 |
| a10 | 3.14E-01 | -1.82E+00 | -8.70E-02 | 8.20E-02 |
| a12 | 1.40E-01 | 2.62E+00 | 7.66E-03 | -8.51E-03 |
| a14 | 1.80E+01 | 1.86E+00 | 2.00E-02 | -3.44E-03 |
| a16 | -2.50E+01 | -3.71E+00 | -6.82E-03 | 9.22E-05 |

FIG.32

| f(focal length)=1.574087 mm, HFOV(Half angular field of view)=37.32 deg. ||||||||
|---|---|---|---|---|---|---|---|
| Surface# | | Radius | Thickness | Refractive index | Abbe number | Material | focal length |
| - | Object | ∞ | | | | | |
| 900 | Aperture stop | ∞ | -0.03 | | | | |
| 911 | 1st lens element | 1.31 | 0.372 | 1.544102 | 56.1143 | plastic | 1.705 |
| 912 | | -2.893 | 0.066 | | | | |
| 921 | 2nd lens element | -10.05 | 0.26 | 1.632210 | 23.2792 | plastic | -3.4696 |
| 922 | | 2.862 | 0.234 | | | | |
| 931 | 3rd lens element | -0.979 | 0.328 | 1.544102 | 56.1143 | plastic | 1.2782 |
| 932 | | -0.456 | 0.036 | | | | |
| 941 | 4th lens element | 1.077 | 0.316 | 1.531130 | 55.7441 | plastic | -1.8124 |
| 942 | | 0.457 | 0.4 | | | | |
| 951 | IR cut filter | ∞ | 0.30000 | 1.5168 | 64.1673 | | |
| 952 | IR cut filter | ∞ | 0.103 | | | | |
| 960 | Image plane | ∞ | | | | | |

FIG.35

| Aspherical parameters | | | | |
|---|---|---|---|---|
| Surface# | 911 | 912 | 921 | 922 |
| K | -1.97E+01 | 2.15E+00 | -1.27E+04 | -1.53E+01 |
| a4 | 5.47E-01 | -3.63E-01 | -2.56E-01 | 2.29E-01 |
| a6 | -2.24E+00 | -5.49E-01 | -1.41E+00 | -1.46E+00 |
| a8 | 1.76E+00 | 2.13E+00 | 9.07E+00 | 3.19E+00 |
| a10 | 9.21E+00 | 7.65E+00 | -9.00E-01 | -4.10E+00 |
| a12 | -3.48E+01 | -8.83E+00 | 5.33E+00 | -8.35E+00 |
| a14 | -1.22E+02 | 2.54E+01 | -2.35E+01 | 1.13E+01 |
| a16 | 6.18E+02 | 1.22E+02 | -2.77E+01 | 4.27E+01 |
| Surface# | 931 | 932 | 941 | 942 |
| K | -2.65E+00 | -3.04E+00 | -2.58E+00 | -4.88E+00 |
| a4 | 3.20E-01 | -3.05E-01 | -3.76E-01 | -2.40E-01 |
| a6 | -5.60E-01 | 1.30E-01 | 2.23E-01 | 1.93E-01 |
| a8 | 1.13E-01 | 1.03E+00 | 2.80E-02 | -1.68E-01 |
| a10 | -2.59E+00 | -1.09E+00 | -8.80E-02 | 7.80E-02 |
| a12 | 2.81E+00 | 2.95E+00 | 4.26E-03 | -1.60E-02 |
| a14 | 7.38E-01 | 2.78E+00 | 1.20E-02 | -2.07E-03 |
| a16 | -6.50E+01 | -1.15E+00 | -9.84E-03 | 2.58E-03 |

FIG.36

| f(focal length)=2.774864 mm,HFOV(Half angular field of view)=29.827 deg. | | | | | | | |
|---|---|---|---|---|---|---|---|
| Surface# | | Radius | Thickness | Refractive index | Abbe number | Material | focal length |
| - | Object | ∞ | | | | | |
| 1000 | Aperture stop | ∞ | -0.03 | | | | |
| 1011 | 1st lens element | 1.14 | 0.429 | 1.544102 | 56.1143 | plastic | 1.4658 |
| 1012 | | -2.33 | 0.118 | | | | |
| 1021 | 2nd lens element | -2.331 | 0.528 | 1.632210 | 23.2792 | plastic | -2.4599 |
| 1022 | | 5.202 | 0.342 | | | | |
| 1031 | 3rd lens element | -1.402 | 0.404 | 1.544102 | 56.1143 | plastic | 1.5951 |
| 1032 | | -0.592 | 0.087 | | | | |
| 1041 | 4th lens element | -1.803 | 0.403 | 1.531130 | 55.7441 | plastic | -1.2101 |
| 1042 | | 1.082 | 0.4 | | | | |
| 1051 | IR cut filter | ∞ | 0.30000 | 1.5168 | 64.1673 | | |
| 1052 | IR cut filter | ∞ | 0.149 | | | | |
| 1060 | Image plane | ∞ | | | | | |

FIG.39

| Aspherical parameters | | | | |
|---|---|---|---|---|
| Surface# | 1011 | 1012 | 1021 | 1022 |
| K | -1.07E+01 | 1.02E+01 | -4.31E+01 | 2.15E+01 |
| a4 | 6.95E-01 | 9.25E-03 | -6.90E-02 | 4.06E-01 |
| a6 | -2.13E+00 | -8.92E-01 | -1.15E+00 | -1.20E+00 |
| a8 | 7.46E-01 | 9.70E-02 | 6.69E+00 | 3.99E+00 |
| a10 | 7.35E+00 | 4.46E+00 | -9.70E+00 | -2.01E+00 |
| a12 | -1.89E+01 | -1.69E+01 | -1.10E+01 | -5.82E+00 |
| a14 | -7.25E+01 | -1.20E+01 | -1.67E+01 | 6.74E+00 |
| a16 | 1.15E+02 | 2.83E+01 | 1.06E+02 | 2.00E+00 |
| Surface# | 1031 | 1032 | 1041 | 1042 |
| K | -1.08E+00 | -3.05E+00 | -1.88E+01 | -1.38E+01 |
| a4 | -1.35E-01 | -2.58E-01 | -2.92E-01 | -2.92E-01 |
| a6 | -8.69E-01 | -2.00E-02 | 2.67E-01 | 2.32E-01 |
| a8 | 8.87E-01 | 4.76E-01 | 2.30E-02 | -1.63E-01 |
| a10 | -3.72E+00 | -1.72E+00 | -1.57E-01 | 5.90E-02 |
| a12 | 2.82E+00 | 2.13E+00 | -3.90E-02 | -8.96E-03 |
| a14 | 1.16E+01 | 2.05E+00 | 1.20E-02 | -2.14E-03 |
| a16 | -3.31E+00 | -3.14E+00 | 1.30E-02 | -2.70E-04 |

FIG.40

| f(focal length)=3.198024 mm, HFOV(Half angular field of view)= 27.218 deg. | | | | | | | |
|---|---|---|---|---|---|---|---|
| Surface# | | Radius | Thickness | Refractive index | Abbe number | Material | focal length |
| - | Object | ∞ | | | | | |
| 1111 | Aperture stop | 1.419 | 0.448 | 1.514612 | 57.200025 | plastic | 1.9905 |
| 1112 | 1st lens element | -3.322 | -0.006 | | | | |
| 1100 | | ∞ | 0.14 | | | | |
| 1121 | 2nd lens element | -6.821 | 0.266 | 1.607265 | 26.646710 | plastic | -2.7466 |
| 1122 | | 2.261 | 0.885 | | | | |
| 1131 | 3rd lens element | -4.617 | 0.485 | 1.514612 | 57.200025 | plastic | 1.7675 |
| 1132 | | -0.789 | 0.113 | | | | |
| 1141 | 4th lens element | 14.917 | 0.433 | 1.543402 | 56.022618 | plastic | -1.6763 |
| 1142 | | 0.852 | 0.4 | | | | |
| 1151 | IR cut filter | ∞ | 0.30000 | 1.516800 | 64.167336 | | |
| 1152 | IR cut filter | ∞ | 0.354 | | | | |
| 1060 | Image plane | ∞ | | | | | |

FIG.43

| Aspherical parameters | | | | |
|---|---|---|---|---|
| Surface# | 1111 | 1112 | 1121 | 1122 |
| K | 0.00E+00 | 4.91E+01 | 0.00E+00 | -7.37E+00 |
| a4 | 0.00E+00 | 7.50E-02 | 3.44E-01 | 2.55E-01 |
| a6 | 0.00E+00 | -8.70E-02 | -8.29E-01 | -5.48E-01 |
| a8 | 0.00E+00 | 2.50E-02 | 6.96E-01 | 7.25E-01 |
| a10 | 0.00E+00 | 0.00E+00 | 6.46E-01 | -4.27E-01 |
| a12 | 0.00E+00 | 0.00E+00 | -7.17E-01 | 1.63E-01 |
| a14 | 0.00E+00 | 0.00E+00 | 2.92E-01 | 1.15E+00 |
| a16 | 0.00E+00 | 0.00E+00 | 5.97E-01 | 1.26E-01 |
| Surface# | 1131 | 1132 | 1141 | 1142 |
| K | -1.52E+02 | -4.88E+00 | 7.53E+01 | -7.19E+00 |
| a4 | -8.00E-02 | -1.09E-01 | -8.00E-02 | -9.80E-02 |
| a6 | 1.67E-01 | 2.18E-01 | 2.60E-02 | 2.60E-02 |
| a8 | -9.80E-02 | -6.60E-02 | 4.51E-03 | -1.00E-02 |
| a10 | -1.10E-02 | 1.700-004 | -1.99E-03 | 1.05E-03 |
| a12 | 3.82E-03 | 2.83E-03 | -5.28E-05 | 6.65E-06 |
| a14 | 6.58E-03 | 1.25E-04 | 1.07E-04 | -2.91E-05 |
| a16 | -4.54E-03 | -1.65E-05 | 1.85E-05 | 1.28E-05 |

FIG.44

| Embodiment | 1st Embodiment | 2nd Embodiment | 3rd Embodiment | 4th Embodiment |
|---|---|---|---|---|
| T3 / G34 | 11.45 | 7.01 | 4.90 | 14.23 |
| Gaa / T3 | 1.21 | 1.26 | 1.46 | 1.02 |
| EFL / G12 | 23.87 | 23.80 | 18.69 | 20.87 |
| T3 / G12 | 4.06 | 3.84 | 2.88 | 3.58 |
| T2+T3 | 0.69 | 0.73 | 0.73 | 0.83 |
| (T2+T3) / T3 | 1.73 | 1.77 | 1.91 | 1.87 |
| G12+G34 | 0.13 | 0.17 | 0.21 | 0.15 |
| f1+f3 | 3.21 | 3.23 | 3.21 | 3.15 |
| BFL / EFL | 0.50 | 0.51 | 0.48 | 0.50 |
| Fno | 2.61 | 2.84 | 2.75 | 2.86 |

| Embodiment | 5th Embodiment | 6th Embodiment | 7th Embodiment | 8th Embodiment |
|---|---|---|---|---|
| T3 / G34 | 4.86 | 4.07 | 4.15 | 11.72 |
| Gaa / T3 | 1.03 | 1.39 | 2.07 | 1.01 |
| EFL / G12 | 24.00 | 23.91 | 23.90 | 20.38 |
| T3 / G12 | 4.73 | 3.59 | 2.72 | 4.11 |
| T2+T3 | 0.76 | 0.81 | 0.54 | 0.81 |
| (T2+T3) / T3 | 1.66 | 1.91 | 1.93 | 1.51 |
| G12+G34 | 0.19 | 0.22 | 0.17 | 0.18 |
| f1+f3 | 3.12 | 3.97 | 3.34 | 2.50 |
| BFL / EFL | 0.51 | 0.36 | 0.51 | 0.51 |
| Fno | 2.58 | 3.13 | 2.74 | 3.1 |

| Embodiment | 9th Embodiment | 10th Embodiment | 11th Embodiment |
|---|---|---|---|
| T3 / G34 | 9.09 | 4.62 | 4.29 |
| Gaa / T3 | 1.02 | 1.36 | 2.33 |
| EFL / G12 | 23.90 | 23.48 | 23.85 |
| T3 / G12 | 4.98 | 3.42 | 3.62 |
| T2+T3 | 0.59 | 0.93 | 0.75 |
| (T2+T3) / T3 | 1.79 | 2.31 | 1.55 |
| G12+G34 | 0.10 | 0.21 | 0.25 |
| f1+f3 | 2.98 | 3.06 | 3.76 |
| BFL / EFL | 0.51 | 0.31 | 0.33 |
| Fno | 1.87 | 3.08 | 2.8 |

FIG.46

MOBILE DEVICE AND OPTICAL IMAGING LENS THEREOF

CROSS-REFERENCES TO RELATED APPLICATIONS

This application is a continuation of U.S. patent application Ser. No. 14/549,477, filed on Nov. 20, 2014, which is a continuation of U.S. patent application Ser. No. 13/770,838, filed on Feb. 19, 2013, now U.S. Pat. No. 8,929,000, which claims priority to China Patent Application No. 201210252531.0, filed on Jul. 20, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having four lens elements and an optical imaging lens thereof.

BACKGROUND OF THE INVENTION

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge-coupled device (CCD) and the complementary metal-oxide semiconductor (CMOS), but also the optical imaging lens mounted therein. When reducing the size of the optical imaging lens; however, achieving good optical characteristics becomes a challenging problem.

U.S. Pat. Nos. 7,715,119, 7,848,032, 8,089,704, 7,920,340, US Patent Publication No. 2011009572, U.S. Pat. Nos. 7,777,972, 7,969,664 and U.S. Pat. No. 7,274,518 all disclosed an optical imaging lens constructed with an optical imaging lens having four lens elements. In the first embodiment of U.S. Pat. No. 7,920,340, the length of the optical imaging lens is over 7 mm, which is not beneficial for the smaller design of mobile devices.

How to effectively shorten the length of the optical imaging lens is one of the most important topics in the industry to pursue the trend of smaller and smaller mobile devices.

Therefore, there is needed to develop optical imaging lens with a shorter length, while also having good optical characteristics.

SUMMARY OF THE INVENTION

An object of the present invention is to provide a mobile device and an optical imaging lens thereof. With controlling the convex or concave shape of the surfaces of the lens elements, the central thickness along the optical axis, and the air gap, etc., the length of the optical imaging lens is shortened and meanwhile the good optical characteristics, such as high resolution, are sustained.

In an exemplary embodiment, an optical imaging lens comprises, in order from an object side to an image side, first, second, third and fourth lens elements, each of the first, second, third, and fourth lens elements having an object-side surface facing toward the object side and an image-side surface facing toward the image side. The first lens element has positive refracting power and the object-side surface thereof is a convex surface. The second lens element has negative refracting power, the object-side surface thereof comprises a concave portion in the vicinity of the optical axis and the image-side surface thereof comprises a concave portion in the vicinity of the optical axis. The third lens element has positive refracting power, the object-side surface thereof is a concave surface and the image-side surface thereof being a convex surface. The object-side surface of the fourth lens element comprises a convex portion in the vicinity of the optical axis, and the image-side surface thereof comprises a concave portion in the vicinity of the optical axis and a convex portion in the vicinity of a periphery of the fourth lens element. Lens as a whole has only the four lens elements with refracting power, wherein a central thickness of the third lens element along the optical axis is T3, an air gap between the third lens element and the fourth lens element is $G_{34}$, and a sum of all air gaps from the first lens element to the fourth lens element along the optical axis is $G_{aa}$, and they satisfy the relations:

$(T3/G_{34})>4$; and $(G_{aa}/T3)>1$.

In another exemplary embodiment, assuming the thickness of the third lens element is not changed, when the air gap $G_{34}$ between the third lens element and the fourth lens element along the optical axis is shortened to satisfy the relation of "$(T3/G_{34})>4$", the length of the optical imaging lens is shortened. In another exemplary embodiment, assuming the sum of all air gaps from the first lens element to the fourth lens element along the optical axis, $G_{aa}$, is not changed, when the central thickness T3 of the third lens element along the optical axis is shortened to satisfy the relation of "$(G_{aa}/T3)>1$", the length of the optical imaging lens is also effectively shortened.

In another exemplary embodiment, other related parameters, such as the central thickness of lens element along the optical axis and other ratio of the central thickness of lens element along the optical axis to the sum of all air gaps, focal length, and/or other related parameters could be further controlled. For example, these related parameters could be a central thickness of the second lens element along the optical axis, T2, an air gap between the first lens element and the second lens element, $G_{12}$, an effective focal length, EFL, of the optical imaging lens, a back focal length, BFL, of the optical imaging lens, a focal length of the first lens element, f1, and a focal length of the third lens element, f3, satisfying at least one of the relations:

$(EFL/G_{12})<24$;

$(T3/G_{12})<5$;

$0.5 \le (T2+T3) \le 0.83 (mm)$;

$1.5 < [T2+T3]/T3 < 2.5$;

$0.07 < (G_{12}+G_{34}) < 0.25 (mm)$;

$2 < (f1+f3) < 4 (mm)$; and/or $(BFL/EFL) \ge 0.5$, wherein, BFL is defined by the distance between the image-side surface of the fourth lens element and an image plane along the optical axis.

Aforesaid exemplary embodiments are not limited and could be selectively incorporated in other embodiments described herein.

In example embodiments, an aperture stop is provided for adjusting the input of light of the system. For example, the aperture stop is preferably provided but not limited to be positioned in front of the first lens element, or positioned between the first lens element and the second lens element.

In some exemplary embodiments, more details about the convex or concave surface structure and/or the refracting power could be incorporated for one specific lens element or broadly for plural lens elements to enhance the control for the system performance and/or resolution. For example, for the first lens element, an image-side surface is comprised, but the image-side surface need not be limited to a convex portion in the vicinity of a periphery of the first lens element.

In another exemplary embodiment, a mobile device comprises a housing and an optical imaging lens assembly positioned in the housing. The optical imaging lens assembly comprises a lens barrel, any of aforesaid example embodiments of optical imaging lens, a module housing unit, and an image sensor. The lens comprising four lens elements with refracting power as a whole is positioned in the lens barrel, the module housing unit is for positioning the lens barrel, and the image sensor is positioned at the image-side of the optical imaging lens.

In some exemplary embodiments, the module housing unit optionally comprises an autofocus module and/or an image sensor base. The autofocus module may comprise a lens seat and a lens backseat, wherein the lens seat is positioned close to the outside of the lens barrel along with an axis; the lens backseat is positioned along the axis and around the outside of the lens seat; and the lens barrel and the optical imaging lens positioned therein are driven by the lens seat for moving along the axis to control the focusing of the optical imaging lens. The image sensor base could be positioned between the lens backseat and the image sensor, and closed to the lens backseat.

Through controlling the ratio among at least one central thickness of lens element along the optical axis, an air gap between two lens elements along the optical axis, and a sum of all air gaps between the four lens elements along the optical axis in a predetermined range, and incorporated with the arrangement of the convex or concave shape of the surfaces of the lens element(s) and/or refracting power, the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawings, in which:

FIG. 2 shows a table of optical data of each lens element of the optical imaging lens according to embodiment 1 of the invention;

FIG. 4 shows a table of aspherical data of the optical imaging lens according to embodiment 1 of the invention;

FIG. 7 shows a table of optical data of each lens element of the optical imaging lens according to embodiment 2 of the invention;

FIG. 8 shows a table of aspherical data of the optical imaging lens according to embodiment 2 of the invention;

FIG. 11 shows a table of optical data of each lens element of the optical imaging lens according to embodiment 3 of the invention;

FIG. 12 shows a table of aspherical data of the optical imaging lens according to embodiment 3 of the invention;

FIG. 15 shows a table of optical data of each lens element of the optical imaging lens according to embodiment 4 of the invention;

FIG. 16 shows a table of aspherical data of the optical imaging lens according to embodiment 4 of the invention;

FIG. 19 shows a table of optical data of each lens element of the optical imaging lens according to embodiment 5 of the invention;

FIG. 20 shows a table of aspherical data of the optical imaging lens according to embodiment 5 of the invention;

FIG. 23 shows a table of optical data of each lens element of the optical imaging lens according to embodiment 6 of the invention;

FIG. 24 shows a table of aspherical data of the optical imaging lens according to embodiment 6 of the invention;

FIG. 27 shows a table of optical data of each lens element of the optical imaging lens according to embodiment 7 of the invention;

FIG. 28 shows a table of aspherical data of the optical imaging lens according to embodiment 7 of the invention;

FIG. 31 shows a table of optical data of each lens element of the optical imaging lens according to embodiment 8 of the invention;

FIG. 32 shows a table of aspherical data of the optical imaging lens according to embodiment 8 of the invention;

FIG. 35 shows a table of optical data of each lens element of the optical imaging lens according to embodiment 9 of the invention;

FIG. 36 shows a table of aspherical data of the optical imaging lens according to embodiment 9 of the invention;

FIG. 39 shows a table of optical data of each lens element of the optical imaging lens according to embodiment 10 of the invention;

FIG. 40 shows a table of aspherical data of the optical imaging lens according to embodiment 10 of the invention;

FIG. 43 shows a table of optical data of each lens element of the optical imaging lens according to embodiment 11 of the invention;

FIG. 44 shows a table of aspherical data of the optical imaging lens according to embodiment 11 of the invention;

FIG. 46 shows a comparison table for the values of $T3/G_{34}$, $G_{aa}/T3$, $EFL/G_{12}$, $T3/G_{12}$, $T2+T3$, $(T2+T3)/T3$, $G_{12}+G_{34}$, $f1+f3$, and $BFL/EFL$ of all 11 example embodiments shown in FIGS. 1~45;

DETAILED DESCRIPTION OF THE INVENTION

Figure 1:
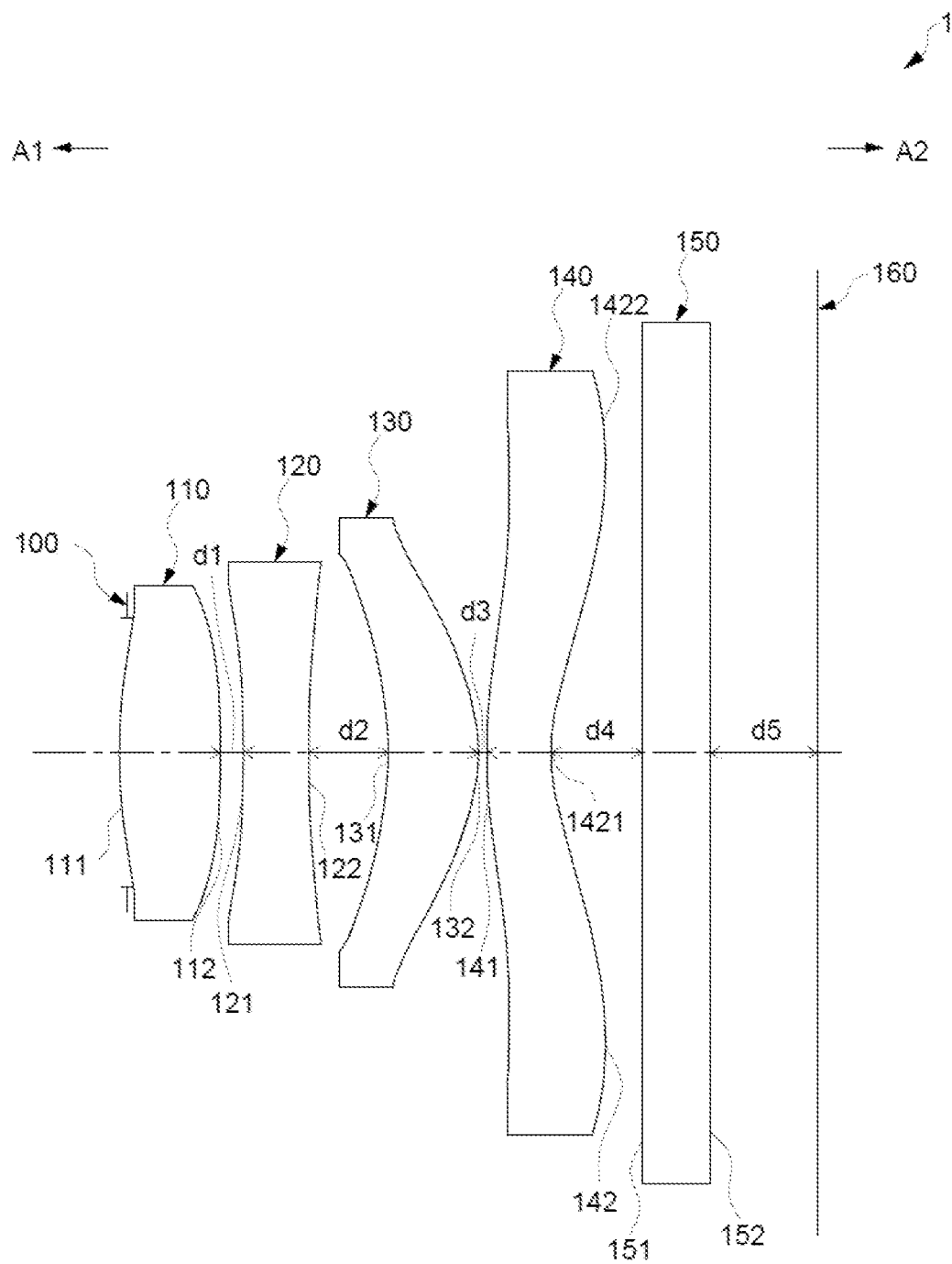
FIG. 1 shows a cross-sectional view of an optical imaging lens having four lens elements of the optical imaging lens according to embodiment 1 of the invention.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise a first lens element, a second lens element, a third lens element, and a fourth lens element. These lens elements may be arranged in an order from an object side to an image side, and example embodiments of the lens as a whole may comprise only the four lens elements with refracting power. In an example embodiment: the first lens element has positive refracting power and the object-side surface thereof is a convex surface; the second lens element has negative refracting power, the object-side surface thereof comprises a concave portion in the vicinity of the optical axis and the image-side surface thereof comprises a concave portion in the vicinity of the optical axis; the third lens element has positive refracting power, the object-side surface thereof is a concave surface and the image-side surface thereof being a convex surface; the object-side surface of the fourth lens element comprises a convex portion in the vicinity of the optical axis, and the image-side surface thereof comprises a concave portion in the vicinity of the optical axis and a convex portion in the vicinity of a periphery of the fourth lens element. The central thickness of the third lens element along the optical axis, T3, an air gap between the third lens element and the fourth lens element, $G_{34}$, and the sum of all air gaps between the first lens element to the fourth lens element along the optical axis, $G_{aa}$, satisfy the relations as followed:

$$(T3/G_{34})>4 \qquad \text{relation (1); and}$$

$$(G_{aa}/T3)>1 \qquad \text{relation (2).}$$

Preferably, the first lens element having positive refracting power have better light converge ability and the third lens element and the fourth lens element could eliminate the astigmatism aberration and distortion aberration to reduce the aberration of the whole system to achieve good optical characters and shortened the length of the optical imaging lens.

Reference is now made to relation (1). A person having ordinary skill in the art would readily understand that when the air gap $G_{34}$ between the third lens element and the fourth lens element along the optical axis is shortened to satisfy relation (1), assuming the thickness of the third lens element is not changed, the length of the optical imaging lens would be shortened. If relation (1) is not satisfied, i.e. $(T3/G_{34})<4$, the air gap between the third lens element and the fourth lens element may be large that it would cause a long optical imaging lens. Relation (1) may be further restricted by an upper limit, for example but not limited to, $15>(T3/G_{34})>4$.

Reference is now made to relation (2). A person having ordinary skill in the art would readily understand that when the central thickness T3 of the third lens element along the optical axis is shortened to satisfy relation (2), assuming the sum of all air gaps from the first lens element to the fourth lens element along the optical axis, $G_{aa}$, is not changed, the length of the optical imaging lens would also be effectively shortened. If relation (2) is not satisfied, i.e. $(G_{aa}/T3)<1$, the thickness of the third lens along the optical axis may be so large that it would cause a long optical imaging lens. Relation (2) may be further restricted by an upper limit, for example but not limited to, $2>(G_{aa}/T3)>1$. By applying these techniques, the length of the optical imaging lens can be shortened.

In some example embodiments, other related parameters, such as the central thickness of lens element along the optical axis, focal length, and/or other related parameters could be further controlled. For example, these related parameters could be a central thickness of the second lens element along the optical axis, T2, an air gap between the first lens element and the second lens element, $G_{12}$, an effective focal length, EFL, of the optical imaging lens, a back focal length, BFL, of the optical imaging lens, a focal length of the first lens element, f1, and a focal length of the third lens element, f3, satisfying at least one of the relations:

$(EFL/G_{12})<24$  relation (3);

$(T3/G_{12})<5$  relation (4);

$0.5 \leq (T2+T3) \leq 0.83 (mm)$  relation (5);

$1.5<[(T2+T3)/T3]<2.5$  relation (6);

$0.07<(G_{12}+G_{34})<0.25(mm)$  relation (7);

$2<(f1+f3)<4(mm)$  relation (8); and/or $(BFL/EFL) \leq 0.5$  relation (9), wherein, BFL is defined by the distance between the image-side surface of the fourth lens element and an image plane along the optical axis.

Reference is now made to relation (3). A person having ordinary skill in the art would readily understand that when relation (3) is satisfied, assuming the air gap $G_{12}$ between the first lens element and the second lens element along the optical axis is not shortened, the effective focal length of the optical imaging lens would be shorter to effectively shorten the length of the optical imaging lens. If relation (3) is not satisfied, i.e. $(EFL/G_{12})>24$, the effective focal length of the optical imaging lens is so long that a long optical imaging lens is caused. Relation (3) may be further restricted by a lower limit. For example, a lower limit may be, but is not limited to, $17<(EFL/G_{12})<24$.

Reference is now made to relation (4). A person having ordinary skill in the art would readily understand that if relation (4) is not satisfied, i.e. $(T3/G_{12})>5$, the central thickness of the third lens element along the optical axis is so thick that a long optical imaging lens is caused. Relation (4) may be further restricted by a lower limit. For example, a lower limit may be, but is not limited to, $2<(T3/G_{12})<5$.

Reference is now made to relation (5). A person having ordinary skill in the art would readily understand the results if relation (5) is not satisfied. If the lower limit is exceeded, i.e. $(T2+T3) \leq 0.5$ (mm), the central thickness of the second lens element or third lens element along the optical axis would be so thin that making the optical imaging lens would be difficult. If the upper limit is exceeded, i.e. $0.83 \leq (T2+T3)$ (mm), the central thickness of the second lens element or the third lens element along the optical axis would be so thick as to cause a long optical imaging lens.

Reference is now made to relation (6). A person having ordinary skill in the art would readily understand the results if relation (6) is not satisfied. If the lower limit is exceeded, i.e. $[(T2+T3)/T3]<1.5$, the central thickness of the third lens element along the optical axis would be so thick as to cause a long optical imaging lens. If the upper limit is exceeded, i.e. $[(T2+T3)/T3]>2.5$, assuming the thickness of the third lens element is not changed, the central thickness of the second lens element along the optical axis would be so thick as to cause a long optical imaging lens.

Reference is now made to relation (7). A person having ordinary skill in the art would readily understand the results if relation (7) is not satisfied. If the lower limit is exceeded, i.e. $(G_{12}+G_{34}) \leq 0.07$ (mm), the air gap between the first lens element and the second lens element or the air gap between the third lens element and the fourth lens element along the optical axis would be so narrow that manufacturing the optical imaging lens would be difficult. If the upper limit is exceeded, i.e. $(G_{12}+G_{34})>0.25$ (mm), the sum of the air gap between the first lens element and the second lens element and the air gap between the third lens element and the fourth lens element along the optical axis is so large that a long optical imaging lens is caused.

Reference is now made to relation (8). A person having ordinary skill in the art would readily understand the results if relation (8) is not satisfied. If the lower limit is exceeded, i.e. $(f1+f3)<2$ (mm), the focal length of the first lens element or the third lens element would be short and the refracting power of the first lens element or the third lens element would be large. Arrangement of the refracting power for such a system is difficult. If the upper limit is exceeded, i.e. $(f1+f3)>4$ (mm), the focal length of the first lens element or third lens element would be so long as to cause a long optical imaging lens.

Reference is now made to relation (9). A person of ordinary skill in the art would readily understand that when relation (9) is satisfied, the effective focal length of the optical imaging lens would be shorter. If relation (9) is not satisfied, i.e. $(BFL/EFL)<0.5$, the effective focal length of the optical imaging lens would be so long as to cause a long optical imaging lens.

When implementing example embodiments, more details about the convex or concave surface structure and/or the refracting power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 3:
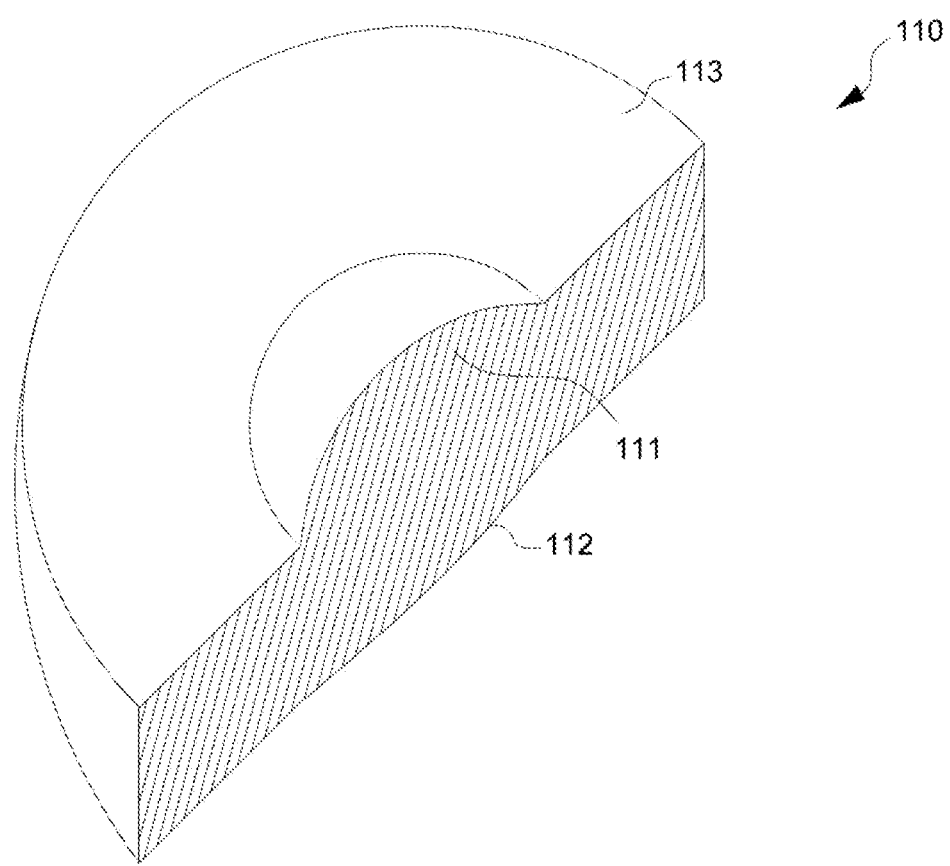
FIG. 3 shows another cross-sectional view of a lens element of the optical imaging lens according to embodiment 1 of the invention.
Figure 5:
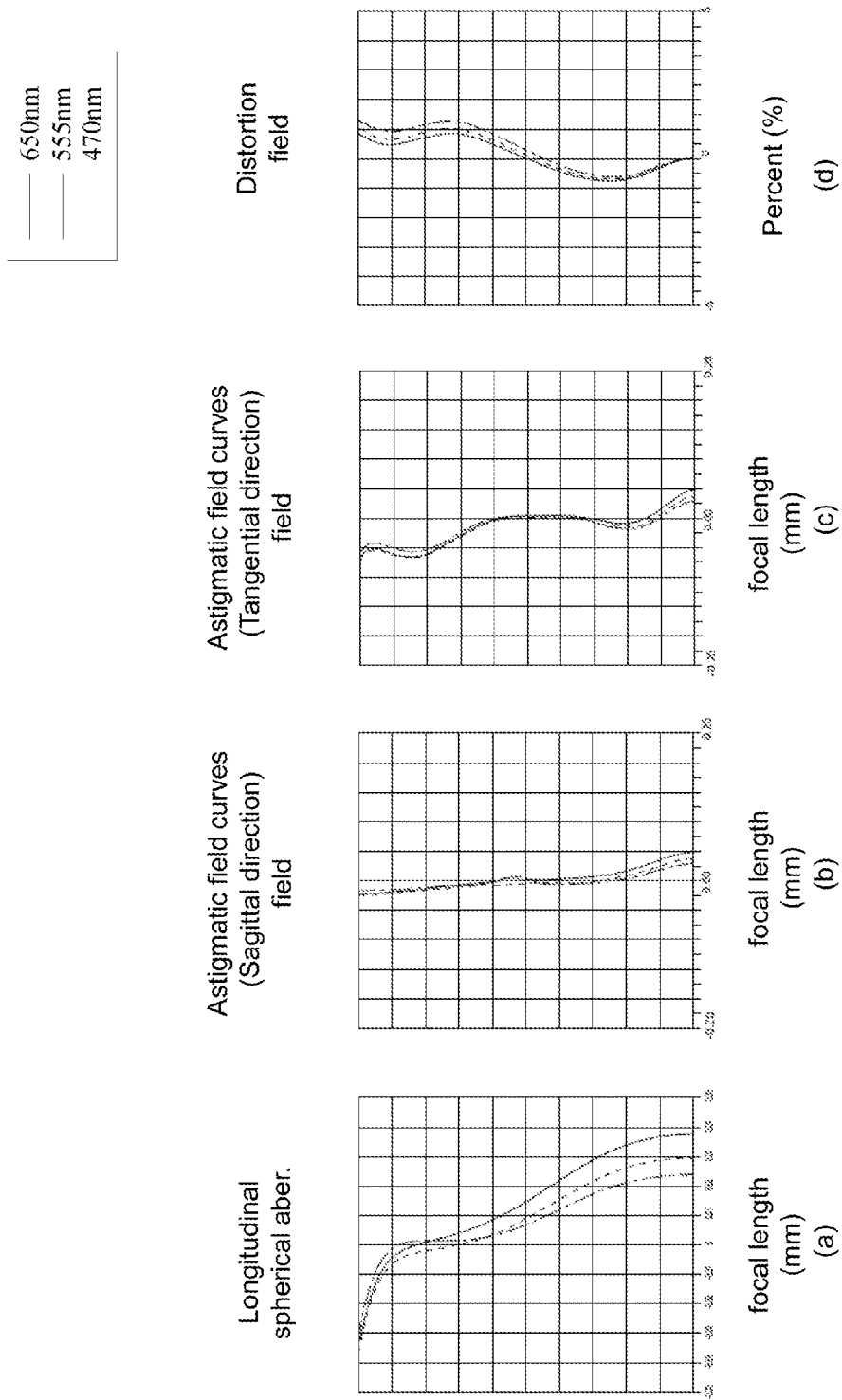
FIG. 5 shows charts of longitudinal spherical aberration and other kinds of optical aberrations of the optical imaging lens according to embodiment 1 of the invention.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens having four lens elements of the optical imaging lens according to a first example embodiment. FIG. 2 illustrates an example table of optical data of each lens element of the optical imaging lens according to an example embodiment. FIG. 3 depicts another example cross-sectional view of a lens element of the optical imaging lens according to an example embodiment. FIG. 4 depicts an example table of aspherical data of the optical imaging lens according to an example embodiment. FIG. 5 shows example charts of longitudinal spherical aberration and other kinds of optical aberrations of the optical imaging lens according to an example embodiment.

As shown in FIG. 1, the optical imaging lens 1 of the present embodiment comprises, in order from an object side A1 to an image side A2, an aperture stop 100, a first lens element 110, a second lens element 120, a third lens element 130 and a fourth lens element 140. Both of a filtering unit 150 and an image plane 160 of an image sensor are positioned at the image side A2 of the optical imaging lens 1. Each of the first, second, third, fourth lens elements 110, 120, 130, 140 and the filtering unit 150 has an object-side surface 111/121/131/141/151 facing toward the object side A1 and an image-side surface 112/122/132/142/152 facing toward the image side A2. The aperture stop 100, positioned in front of the first lens element 110, and together with the first lens element 110 having positive refracting power could effectively shorten the length of the optical imaging lens 1. The example embodiment of the filtering unit 150 illustrated is an IR cut filter (infrared cut filter) positioned between the fourth lens element 140 and an image plane 160. The filtering unit 150 filters light with specific wavelength from the light passing optical imaging lens. For example, IR light is filtered, and this will prohibit the IR light which is not visible by human eyes from producing an image on the image plane 160.

Exemplary embodiments of each lens elements of the optical imaging lens 1 will now be described with reference to the drawings.

The first lens element 110 may have positive refracting power, which may be constructed by plastic material. Both the object-side surface 111 and the image-side surface 112 are convex surfaces. The convex surface 111 and convex surface 112 may both be aspherical surfaces.

The second lens element 120 may have negative refracting power, which may be constructed by plastic material. Both the object-side surface 121 and the image-side surface 122 are concave surfaces. The concave surface 121 and concave surface 122 may both be aspherical surfaces.

The third lens element 130 may have positive refracting power, which may be constructed by plastic material. The object-side surface 131 is a concave surface and the image-side surface 132 is a convex surface. The concave surface 131 and the convex surface 132 may both be aspherical surfaces.

The fourth lens element 140 may have negative refracting power, which may be constructed by plastic material. The object-side surface 141 comprises a convex portion 1411 in the vicinity of the optical axis and a concave portion 1412 in the vicinity of the periphery of the fourth lens element 140. The image-side surface 142 has a concave portion 1421 in the vicinity of the optical axis and a convex portion 1422 in the vicinity of a periphery of the fourth lens element 140. The object-side surface 141 and the image-side surface 142 may both be aspherical surfaces.

In example embodiments, air gaps exist between the four lens elements 110, 120, 130, 140, the filtering unit 150 and the image plane 160 of the image sensor. For example, FIG. 1 illustrates the air gap d1 existing between the first lens element 110 and the second lens element 120, the air gap d2 existing between the second lens element 120 and the third lens element 130, the air gaps d existing between the third lens element 130 and the fourth lens element 140, the air gap d4 existing between the fourth lens element 140 and the filtering unit 150 and the air gap d5 existing between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by $G_{12}$, the air gap d3 is denoted by $G_{34}$, and the sum of all air gaps d1, d2, d3 between the first and fourth lens elements is denoted by $G_{aa}$.

FIG. 2 depicts the optical characters of each lens elements in the optical imaging lens 1 of the present embodiment, wherein the values of the relations (1)~(9) are:

$(T3/G_{34})=11.45$;

$(G_{aa}/T3)=1.21$;

$(EFL/G_{12})=23.87$;

$(T3/G_{12})=4.06$;

$(T2+T3)=0.69(mm)$;

$[(T2+T3)/T3]=1.73$;

$(G_{12}+G_{34})=0.13(mm)$;

$(f1+f3)=3.21(mm)$;

$(BFL/EFL)=0.5$;

wherein the distance from the object-side surface 111 of the first lens element 110 to the image plane 160 is 3.063 (mm), and the length of the optical imaging lens is shortened.

Please note that, in example embodiments, to clearly illustrate the structure of each lens element, only the part where light passes, is shown. For example, taking the first lens element 110 as an example, FIG. 1 illustrates the object-side surface 111 and the image-side surface 112. However, when implementing each lens element 110, 120, 130, 140 of the present embodiment, a fixing part for positioning the lens elements inside the optical imaging lens may be formed selectively. Based on the first lens element 110, please refer to FIG. 3, which illustrates the first lens element 110 further comprising a fixing part. Here the fixing part is not limited to a protruding part 113 for mounting the first lens element 110 in the optical imaging lens, and ideally, light will not pass through the protruding part 113.

The aspherical surfaces, including the convex surface 111 and the convex surface 112 of the first lens element 110, the concave surfaces 121, 122 of the second lens element 120, the concave surface 131 and the convex surface 132 of the third lens element 130, and the object-side surface 141 and the image-side surface 142 of the fourth lens element 140 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein:
R represents the radius of the surface of the lens element;
Z represents the depth of the aspherical surface (the perpendicular distance between the point of the aspherical surface at a distance Y from the optical axis and the tangent plane of the vertex on the optical axis of the aspherical surface);
Y represents the perpendicular distance between the point of the aspherical surface and the optical axis;
K represents a conic constant;
$a_{2i}$, represents a aspherical coefficient of $2i^{th}$ level;
and the values of each aspherical parameter are represented in FIG. 4.

As illustrated in FIG. 5, the optical imaging lens of present example embodiments show great optical characteristics in the longitudinal spherical aberration (a), astigmatism aberration in the sagittal direction (b), astigmatism aberration in the tangential direction (c) and distortion aberration (d). Therefore, according to above illustration, the optical imaging lens of example embodiments indeed achieve great optical performance and the length of the optical imaging lens is effectively shortened.

Figure 6:
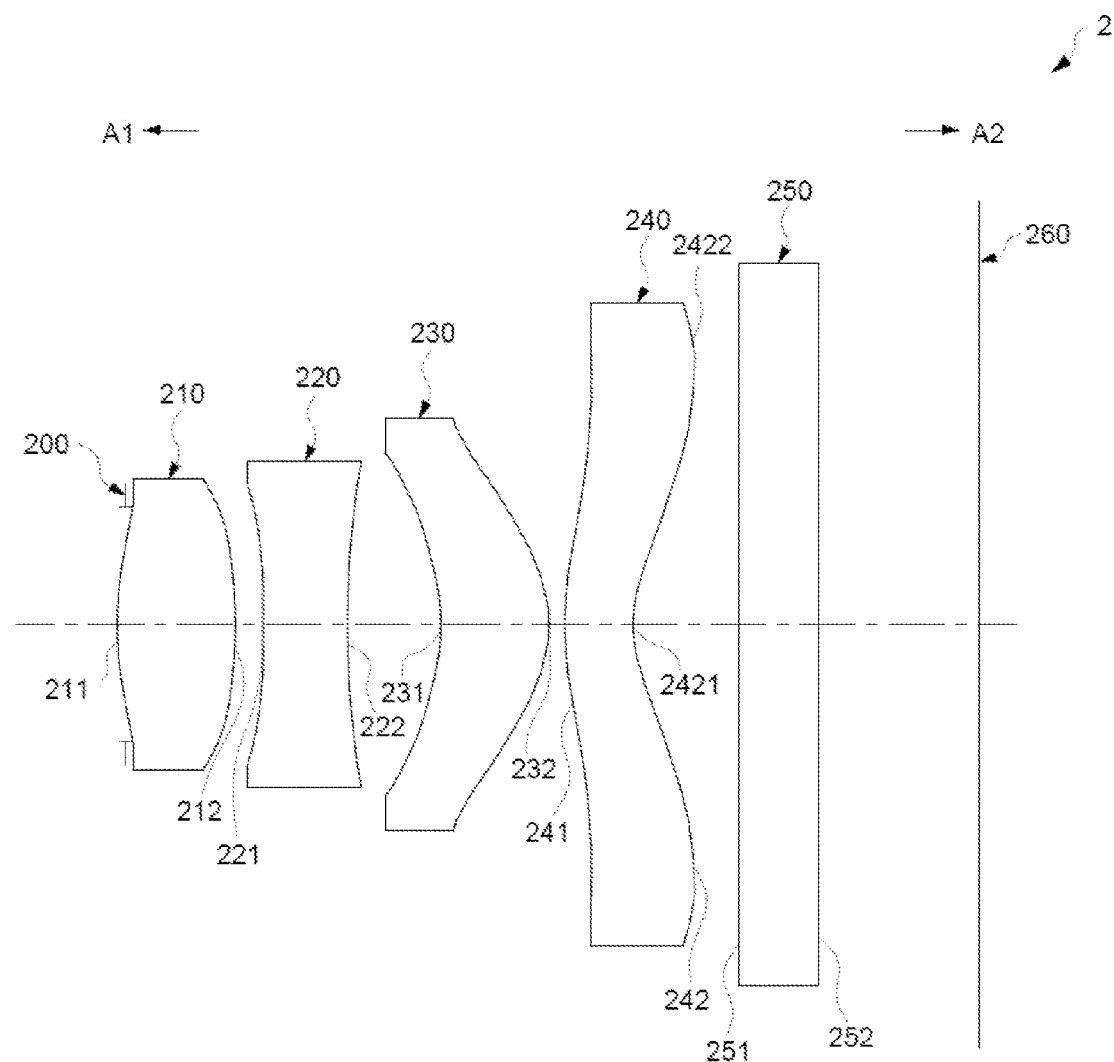
FIG. 6 shows a cross-sectional view of an optical imaging lens having four lens elements of the optical imaging lens according to embodiment 2 of the invention.
Figure 9:
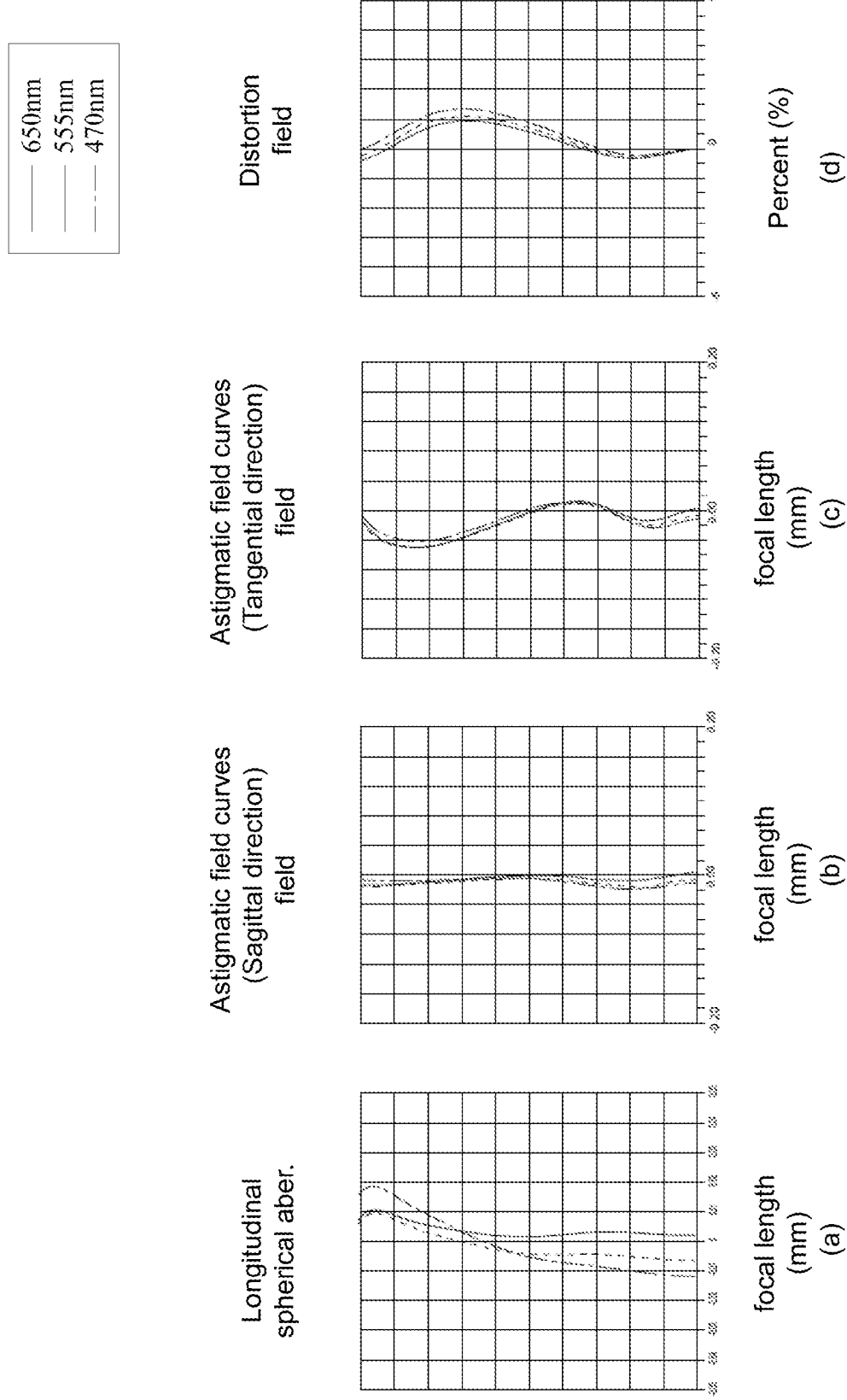
FIG. 9 shows charts of longitudinal spherical aberration and other kinds of optical aberrations of the optical imaging lens according to embodiment 2 of the invention.

Reference is now made to FIGS. 6-9. FIG. 6 illustrates an example cross-sectional view of an optical imaging lens having four lens elements of the optical imaging lens according to a second example embodiment. FIG. 7 shows an example table of optical data of each lens element of the optical imaging lens according to the second example embodiment. FIG. 8 shows an example table of aspherical data of the optical imaging lens according to the second example embodiment. FIG. 9 shows example charts of longitudinal spherical aberration and other kinds of optical aberrations of the optical imaging lens according to an example embodiment.

As shown in FIG. 6, the optical imaging lens 2 of the present embodiment, in an order from an object side A1 to an image side A2, comprises an aperture stop 200, a first lens element 210, a second lens element 220, a third lens element 230 and a fourth lens element 240. The aperture stop 200, positioned in front of the first lens element 210, and together with the first lens element 210 having positive refracting power could effectively shorten the length of the optical imaging lens 2. Both of a filtering unit 250 and an image plane 260 of an image sensor are positioned at the image side A2 of the optical imaging lens 2. Each of the first, second, third, fourth lens elements 210, 220, 230, 240 and the filtering unit 250 has an object-side surface 211/221/231/241/251 facing toward the object side A1 and an image-side surface 212/222/232/242/252 facing toward the image side A2. In an example embodiment, the filtering unit 250 is an IR cut filter positioned between the fourth lens element 240 and the image plane 260. The filtering unit 250 filters light with specific wavelength from the light passing optical imaging lens 2. For example, IR light is filtered, and this will prohibit the IR light which is not visible by human eyes from producing an image on image plane 260.

Similarly, in the present embodiment, air gaps exist between the lens elements 210, 220, 230, 240, the filtering unit 250 and the image plane 260 of the image sensor. Please refer to FIG. 1 for the positions of the air gaps. The sum of all air gaps d1, d2, d3 between the first and fourth lens elements is denoted by $G_{aa}$.

One difference between the second embodiments and the first embodiments is that the central thickness of lens T3 of the third lens element 230, the air gap $G_{34}$ between the third lens element 230 and the fourth lens element 240 and the sum of all air gaps $G_{aa}$ from the first lens element 210 to the fourth lens element 240 are different. Please refer to FIG. 7 for the optical characteristics of each lens elements in the optical imaging lens 2 of the present embodiment, wherein the values of the relations (1)~(9) are:

$(T3/G_{34})=7.01$;

$(G_{aa}/T3)=1.26$;

$(EFL/G_{12})=23.80$;

$(T3/G_{12})=3.84$;

$(T2+T3)=0.73$(mm);

$[(T2+T3)/T3]=1.77$;

$(G_{12}+G_{34})=0.17$(mm);

$(f1+f3)=3.23$(mm);

$(BFL/EFL)=0.51$;

wherein the distance from the object-side surface 211 of the first lens element 210 to the image side of the image plane 260 is 3.266 (mm) and the length of the optical imaging lens 2 is shortened.

Example embodiments of the lens elements of the optical imaging lens 2 may comprise the following example embodiments:

The first lens element 210 may have positive refracting power, which may be constructed by plastic material. Both the object-side surface 211 and the image-side surface 212 are convex surfaces. The convex surface 211 and convex surface 212 may both be aspherical surfaces defined by the aspherical formula. Please refer to FIG. 8 for values of the aspherical parameters.

The second lens element 220 may have negative refracting power, which may be constructed by plastic material. Both the object-side surface 221 and the image-side surface 222 are concave surfaces. The concave surfaces 221, 222 may both be aspherical surfaces defined by the aspherical formula. Please refer to FIG. 8 for values of the aspherical parameters.

The third lens element 230 may have positive refracting power, which may be constructed by plastic material. The object-side surface 231 is a concave surface and the image-side surface 232 is a convex surface. The concave surface 231 and the convex surface 232 may both be aspherical surfaces defined by the aspherical formula. Please refer to FIG. 8 for values of the aspherical parameters.

The fourth lens element 240 may have negative refracting power, which may be constructed by plastic material. The object-side surface 241 is a convex surface. The image-side surface 242 has a concave portion 2421 in the vicinity of the optical axis and a convex portion 2422 in the vicinity of a periphery of the fourth lens element 240. The convex surface 241 and the image-side surface 242 may both be aspherical surfaces defined by the aspherical formula. Please refer to FIG. 8 for values of the aspherical parameters.

As shown in FIG. 9, the optical imaging lens 2 of the present embodiment shows great optical characteristics in longitudinal spherical aberration (a), astigmatism in the sagittal direction (b), astigmatism in the tangential direction (c) and distortion aberration (d). Therefore, according to the above illustration, the optical imaging lens of the present embodiment indeed shows great optical performance and the length of the optical imaging lens is effectively shortened.

Figure 10:
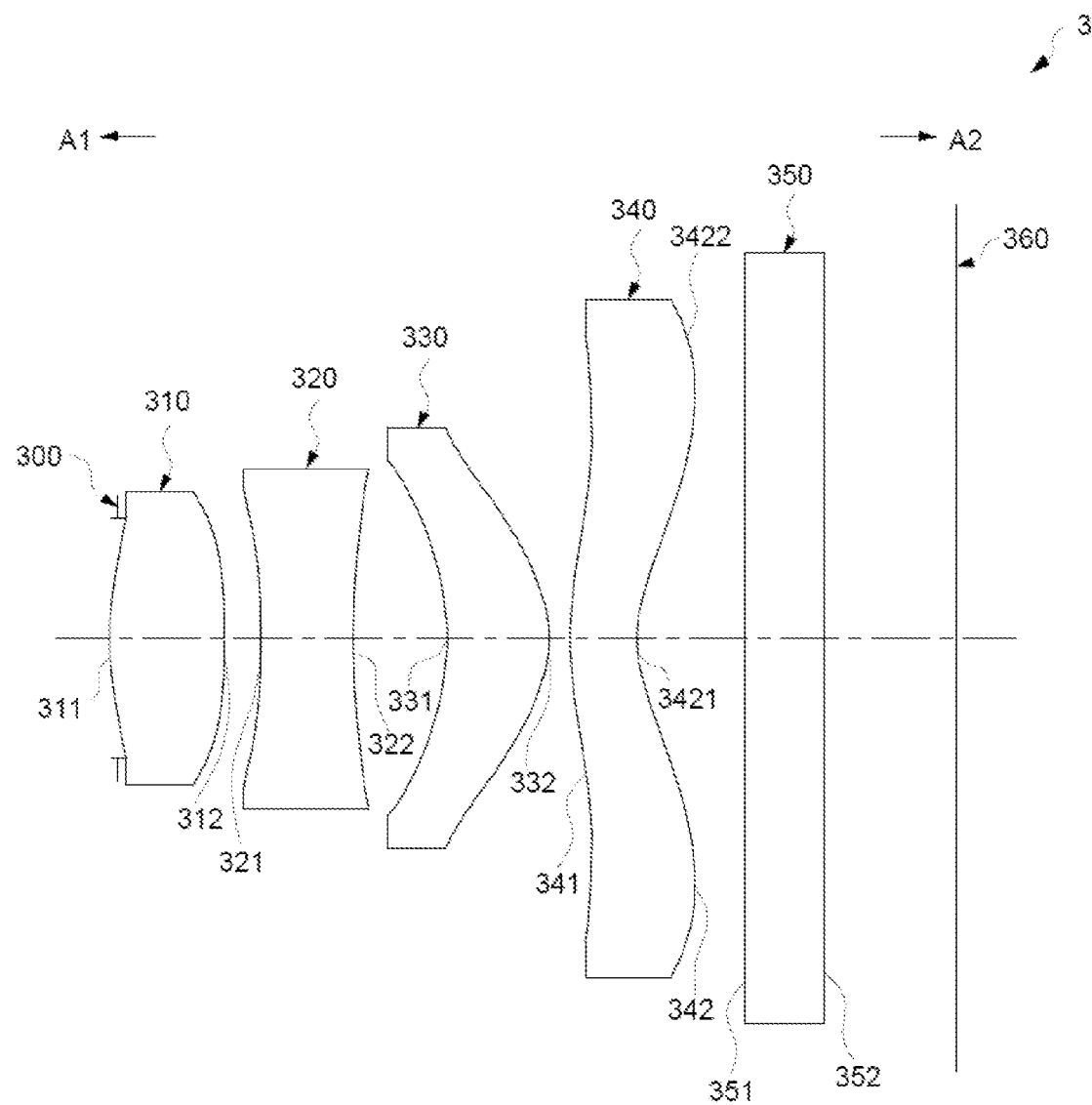
FIG. 10 shows a cross-sectional view of an optical imaging lens having four lens elements of the optical imaging lens according to embodiment 3 of the invention.
Figure 13:
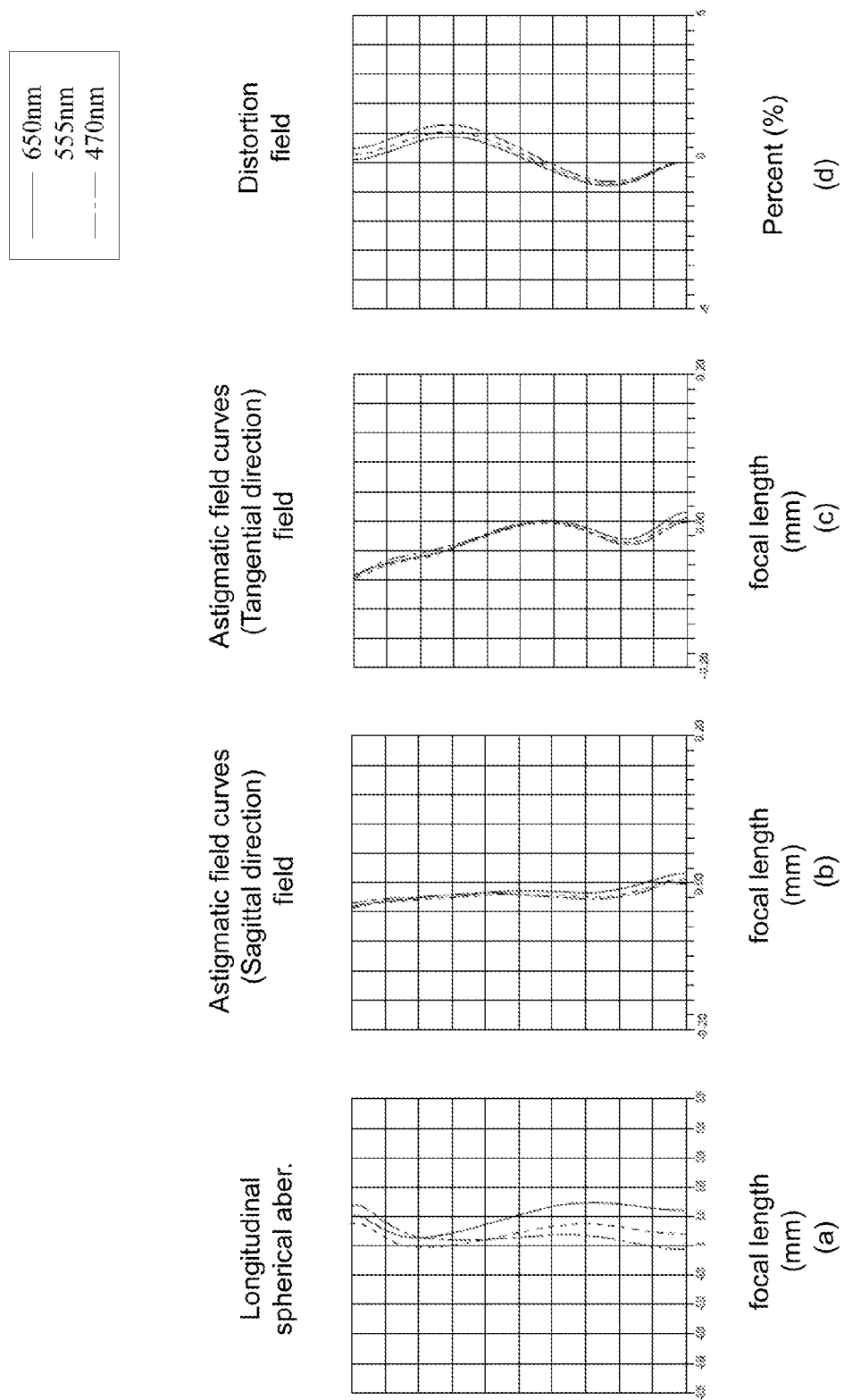
FIG. 13 shows charts of longitudinal spherical aberration and other kinds of optical aberrations of the optical imaging lens according to embodiment 3 of the invention.

Reference is now made to FIGS. 10-13. FIG. 10 illustrates an example cross-sectional view of an optical imaging lens having four lens elements of the optical imaging lens according to a third example embodiment. FIG. 11 depicts an example table of optical data of each lens element of the optical imaging lens according to the third example embodiment. FIG. 12 depicts an example table of aspherical data of the optical imaging lens according to the third example embodiment. FIG. 13 shows example charts of longitudinal spherical aberration and other kinds of optical aberrations of the optical imaging lens according to the third example embodiment.

As shown in FIG. 10, the optical imaging lens 3 of the present embodiment, in an order from an object side A1 to an image side A2, comprises an aperture stop 300, a first lens element 310, a second lens element 320, a third lens element 330 and a fourth lens element 340. Both of a filtering unit 350 and an image plane 360 of an image sensor may be positioned at the image side A2 of the optical imaging lens 3. Each of the first, second, third, fourth lens elements 310, 320, 330, 340 and the filtering unit 350 has an object-side surface 311/321/331/341/351 facing toward the object side A1 and an image-side surface 312/322/332/342/352 facing toward the image side A2. The aperture stop 300, positioned in front of the first lens element 310, and together with the first lens element 310 having positive refracting power could effectively shorten the length of the optical imaging lens 3. Here an example embodiment of the filtering unit 350 is an IR cut filter positioned between the fourth lens element 340 and the image plane 360. The filtering unit 350 filters light with specific wavelength from the light passing optical imaging lens. For example, the IR light is filtered, and this will prohibit the IR light which is not visible by human eyes from producing an image on image plane 360.

Similarly, in the present embodiment, air gaps exist between the lens elements 310, 320, 330, 340, the filtering unit 350 and the image plane 360 of the image sensor. Please refer to FIG. 1 for the positions of the air gaps. The sum of all air gaps d1, d2, d3 between the first and fourth lens elements is denoted by $G_{aa}$.

One difference between the third embodiment and the first embodiment is that the central thickness of lens T3 of the third lens element 330, the air gap $G_{34}$ between the third lens element 330 and the fourth lens element 340 and the sum of all air gaps $G_{aa}$ from the first lens element 310 to the fourth lens element 340 are different. Please refer to FIG. 11 for the optical characteristics of each lens elements in the optical imaging lens 3 of the present embodiment, wherein the values of the relations (1)~(9) are:

$(T3/G_{34})=4.90;$ $(G_{aa}/T3)=1.46;$ $(EFL/G_{12})=18.69;$ $(T3/G_{12})=2.88;$ $(T2+T3)=0.73(mm);$ $[(T2+T3)/T3]=1.91;$ $(G_{12}+G_{34})=0.21(mm);$ $(f1+f3)=3.21(mm);$ $(BFL/EFL)=0.48;$ wherein the distance from the object-side surface 311 of the first lens element 310 to the image side of the image plane 360 is 3.158 (mm), and the length of the optical imaging lens 3 is shortened.

Example embodiments of the lens elements 3 of the optical imaging lens may comprise the following example embodiments:

The first lens element 310 may have positive refracting power, which may be constructed by plastic material. Both the object-side surface 311 and the image-side surface 312 are convex surfaces. The convex surfaces 311, 312 may both be aspherical surfaces defined by the aspherical formula. Please refer to FIG. 12 for values of the aspherical parameters.

The second lens element 320 may have negative refracting power, which may be constructed by plastic material. Both the object-side surface 321 and the image-side surface 322 are concave surfaces. The concave surfaces 321, 322 may both be aspherical surfaces defined by the aspherical formula. Please refer to FIG. 12 for values of the aspherical parameters.

The third lens element 330 may have positive refracting power, which may be constructed by plastic material. The object-side surface 331 is a concave surface and the image-side surface 332 is a convex surface. The concave surface 331 and convex surface 332 may both be aspherical surfaces defined by the aspherical formula. Please refer to FIG. 12 for values of the aspherical parameters.

The fourth lens element 340 may have negative refracting power, which may be constructed by plastic material. The object-side surface 341 comprises a convex portion 3411 in the vicinity of the optical axis and a concave portion 3412 in the vicinity of the periphery of the fourth lens element 340. The image-side surface 342 has a concave portion 3421 in the vicinity of the optical axis and a convex portion 3422 in the vicinity of a periphery of the fourth lens element 340. The object-side surface 341 and the image-side surface 342 may both be aspherical surfaces defined by the aspherical formula. Please refer to FIG. 12 for values of the aspherical parameters.

As illustrated in FIG. 13, it is clear that the optical imaging lens of the present embodiment may achieve great optical characteristics in longitudinal spherical aberration (a), astigmatism in the sagittal direction (b), astigmatism in the tangential direction (c) and distortion aberration (d). Therefore, according to above illustration, the optical imaging lens of the present embodiment indeed achieves great optical performance, and the length of the optical imaging lens is effectively shortened.

Figure 14:
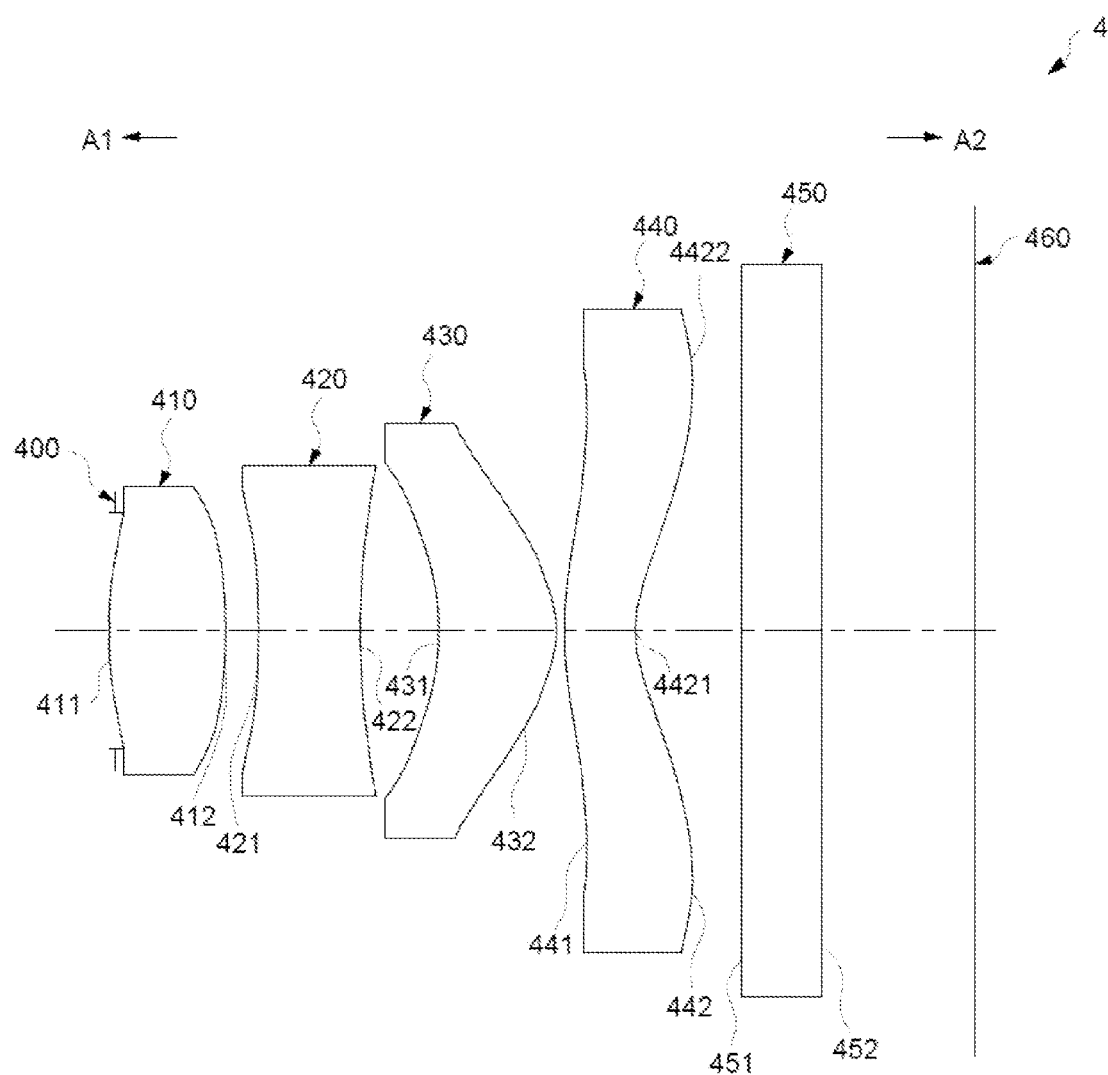
FIG. 14 shows a cross-sectional view of an optical imaging lens having four lens elements of the optical imaging lens according to embodiment 4 of the invention.
Figure 17:
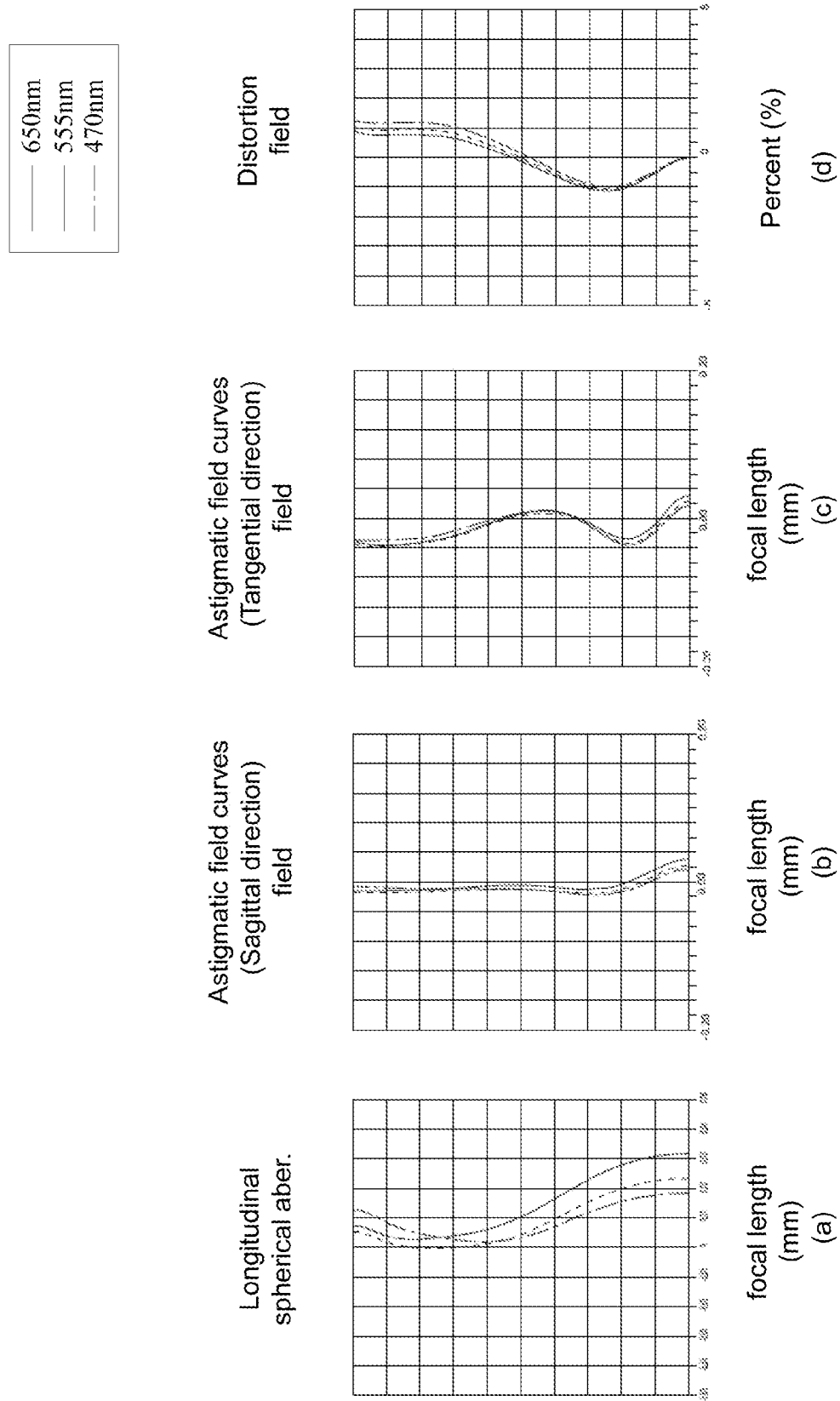
FIG. 17 shows charts of longitudinal spherical aberration and other kinds of optical aberrations of the optical imaging lens according to embodiment 4 of the invention.

Reference is now made to FIGS. 14-17. FIG. 14 illustrates an example cross-sectional view of an optical imaging lens having four lens elements of the optical imaging lens according to a fourth example embodiment. FIG. 15 shows an example table of optical data of each lens element of the optical imaging lens according to the fourth example embodiment. FIG. 16 shows an example table of aspherical data of the optical imaging lens according to the fourth example embodiment. FIG. 17 shows example charts of longitudinal spherical aberration and other kinds of optical aberrations of the optical imaging lens according to the fourth example embodiment.

As shown in FIG. 14, the optical imaging lens of the present embodiment, in an order from an object side A1 to an image side A2, comprises an aperture stop 400, a first lens element 410, a second lens element 420, a third lens element 430 and a fourth lens element 440. Both of a filtering unit 450 and an image plane 460 of an image sensor may be positioned at the image side A2 of the optical imaging lens 4. Each of the first, second, third, fourth lens elements 410, 420, 430, 440 and the filtering unit 450 has an object-side surface 411/421/431/441/451 facing toward the object side A1 and an image-side surface 412/422/432/442/452 facing toward the image side A2. The aperture stop 400, positioned in front of the first lens element 410, and together with the first lens element 410 having positive refracting power could effectively shorten the length of the optical imaging lens 4. Here an example embodiment of filtering unit 450 is an IR cut filter, which may be positioned between the fourth lens element 440 and the image plane 460. The filtering unit 450 filters light with specific wavelength from the light passing optical imaging lens 4. For example, IR light may be filtered, and this will prohibit the IR light which is not visible by human eyes from producing an image on image plane 460.

Similarly, in the present embodiment, air gaps exist between the lens elements 410, 420, 430, 440, the filtering unit 450 and the image plane 460 of the image sensor. Please refer to FIG. 1 for the positions of the air gaps. The sum of all air gaps d1, d2, d3 between the first and fourth lens elements is denoted by $G_{aa}$.

One difference between the fourth embodiment and the first embodiment is that the central thickness of lens T3 of the third lens element 430, the air gap $G_{34}$ between the third lens element 430 and the fourth lens element 440 and the sum of all air gaps $G_{aa}$ from the first lens element 410 to the fourth lens element 440 are different. Please refer to FIG. 15 for the optical characteristics of each lens elements in the optical imaging lens 4 of the present embodiment, wherein the values of the relations (1)~(9) are:

$(T3/G_{34})$=14.23;

$(G_{aa}/T3)$=1.02;

$(EFL/G_{12})$=20.87;

$(T3/G_{12})$=3.58;

$(T2+T3)$=0.83(mm);

$[(T2+T3)/T3]$=1.87;

$(G_{12}+G_{34})$=0.15(mm);

$(f1+f3)$=3.15(mm);

$(BFL/EFL)$=0.5;

wherein the distance from the object-side surface 411 of the first lens element 410 to the image plane 460 is 3.258 (mm), and the length of the optical imaging lens 4 is shortened.

Example embodiments of the lens elements of the optical imaging lens 4 may comprise the following example embodiments:

The first lens element 410 may have positive refracting power, which may be constructed by plastic material. Both the object-side surface 411 and the image-side surface 412 are convex surfaces. The convex surfaces 411, 412 may both be aspherical surfaces defined by the aspherical formula. Please refer to FIG. 16 for values of the aspherical parameters.

The second lens element 420 may have negative refracting power, which may be constructed by plastic material. Both the object-side surface 421 and the image-side surface 422 are concave surfaces. The concave surfaces 421, 422 may both be aspherical surfaces defined by the aspherical formula. Please refer to FIG. 16 for values of the aspherical parameters.

The third lens element 430 may have positive refracting power, which may be constructed by plastic material. The object-side surface 431 is a concave surface and the image-side surface 432 is a convex surface. The concave surface 431 and the convex surface 432 may both be aspherical surfaces defined by the aspherical formula. Please refer to FIG. 16 for values of the aspherical parameters.

The fourth lens element 440 may have negative refracting power, which may be constructed by plastic material. The object-side surface 441 comprises a convex portion 4411 in the vicinity of the optical axis and a concave portion 4412 in the vicinity of the periphery of the fourth lens element 440. The image-side surface 442 has a concave portion 4421 in the vicinity of the optical axis and a convex portion 4422 in the vicinity of a periphery of the fourth lens element 440. The object-side surface 441 and the image-side surface 442 may both be aspherical surfaces defined by the aspherical formula. Please refer to FIG. 16 for values of the aspherical parameters.

As illustrated in FIG. 17, it is clear that the optical imaging lens of the present embodiment may achieve great optical characteristics in longitudinal spherical aberration (a), astigmatism in the sagittal direction (b), astigmatism in the tangential direction (c) and distortion aberration (d). Therefore, according to above illustration, the optical imaging lens of the present embodiment indeed achieves great optical performance, and the length of the optical imaging lens is effectively shortened.

Figure 18:
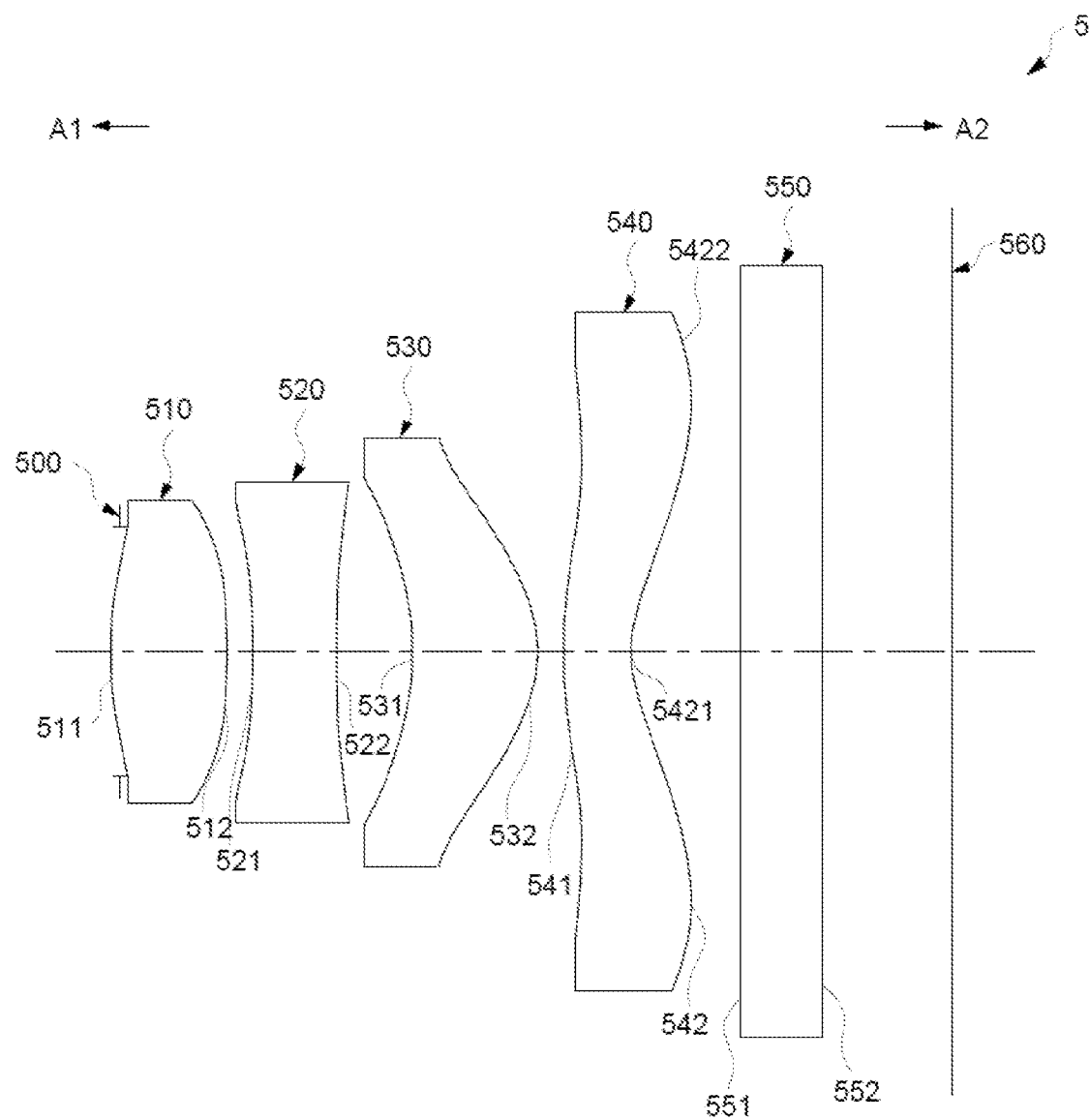
FIG. 18 shows a cross-sectional view of an optical imaging lens having four lens elements of the optical imaging lens according to embodiment 5 of the invention.
Figure 21:
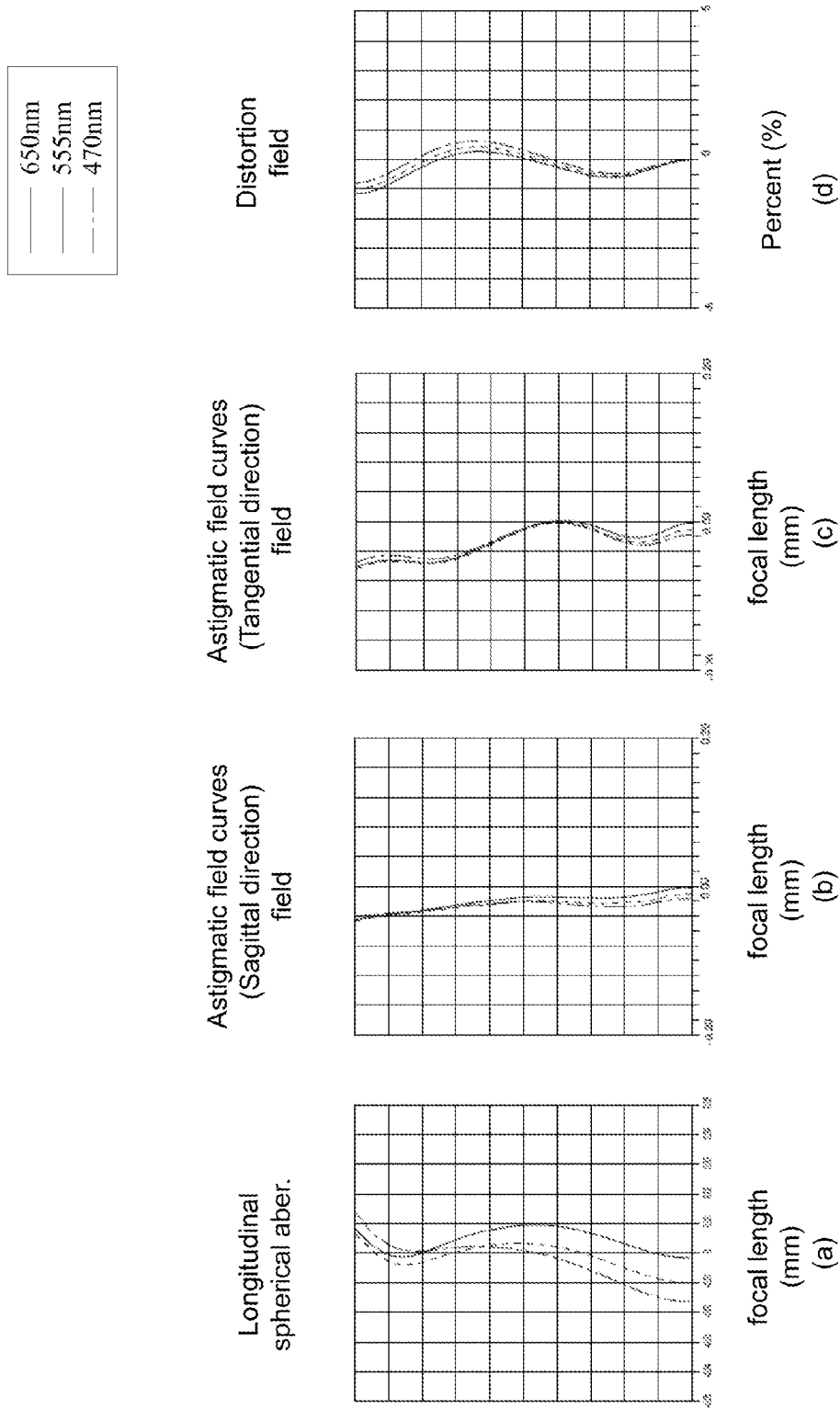
FIG. 21 shows charts of longitudinal spherical aberration and other kinds of optical aberrations of the optical imaging lens according to embodiment 5 of the invention.

Reference is now made to FIGS. 18-21. FIG. 18 illustrates an example cross-sectional view of an optical imaging lens having four lens elements of the optical imaging lens according to a fifth embodiment. FIG. 19 shows an example table of optical data of each lens element of the optical imaging lens according to the fifth example embodiment. FIG. 20 shows an example table of aspherical data of the optical imaging lens according to the fifth example embodiment. FIG. 21 shows example charts of longitudinal spherical aberration and other kinds of optical aberrations of the optical imaging lens according to the fifth example embodiment.

As shown in FIG. 18, the optical imaging lens 5 of the present embodiment, in an order from an object side A1 to an image side A2, comprises an aperture stop 500, a first lens element 510, a second lens element 520, a third lens element 530 and a fourth lens element 540. Both of a filtering unit 550 and an image plane 560 of an image sensor may be positioned at the image side A2 of the optical imaging lens 5. Each of the first, second, third, fourth lens elements 510, 520, 530, 540 and the filtering unit 550 has an object-side surface 511/521/531/541/551 facing toward the object side A1 and an image-side surface 512/522/532/542/552 facing toward the image side A2. The aperture stop 500, positioned in front of the first lens element 510, and together with the first lens element 510 having positive refracting power could effectively shorten the length of the optical imaging lens 5. Here an example embodiment of filtering unit 550 is an IR cut filter, which may be positioned between the fourth lens element 540 and the image plane 560. The filtering unit 550 filters light with specific wavelength from the light passing optical imaging lens. For example, IR light may be filtered, and this will prohibit the IR light which is not visible by human eyes from producing an image on image plane 560.

Similarly, in the present embodiment, air gaps exist between the lens elements 510, 520, 530, 540, the filtering unit 550 and the image plane 560 of the image sensor. Please refer to FIG. 1 for the positions of the air gaps. The sum of all air gaps d1, d2, d3 between the first and fourth lens elements is denoted by $G_{aa}$.

One difference between the fifth embodiments and the first embodiments is that the central thickness of lens T3 of the third lens element 530, the air gap $G_{34}$ between the third lens element 530 and the fourth lens element 540 and the sum of all air gaps $G_{aa}$ from the first lens element 510 to the fourth lens element 540 are different. Please refer to FIG. 19 for the optical characteristics of each lens elements in the optical imaging lens 5 of the present embodiment, wherein the values of the relations (1)~(9) are:

$(T3/G_{34})$=4.86;

$(G_{aa}/T3)$=1.03;

$(EFL/G_{12})=24.00;$ $(T3/G_{12})=4.73;$ $(T2+T3)=0.76(mm);$ $[(T2+T3)/T3]=1.66;$ $(G_{12}+G_{34})=0.19(mm);$ $(f1+f3)=3.12(mm);$ $(BFL/EFL)=0.51;$ wherein the distance from the object-side surface 511 of the first lens element 510 to the image plane 560 is 3.081 (mm), and the length of the optical imaging lens 5 is shortened.

Example embodiments of the lens elements of the optical imaging lens 5 may comprise the following example embodiments:

The first lens element 510 may have positive refracting power, which may be constructed by plastic material. Both the object-side surface 511 and the image-side surface 512 are convex surfaces. The convex surfaces 511, 512 may both be aspherical surfaces defined by the aspherical formula. Please refer to FIG. 20 for values of the aspherical parameters.

The second lens element 520 may have negative refracting power, which may be constructed by plastic material. Both the object-side surface 521 and an image-side surface 522 are concave surfaces. The concave surfaces 521, 522 may both be aspherical surfaces defined by the aspherical formula. Please refer to FIG. 20 for values of the aspherical parameters.

The third lens element 530 may have positive refracting power, which may be constructed by plastic material. The object-side surface 531 is a concave surface and the image-side surface 532 is a convex surface. The concave surface 531 and convex surface 532 may both be aspherical surfaces defined by the aspherical formula. Please refer to FIG. 20 for values of the aspherical parameters.

The fourth lens element 540 may have negative refracting power, which may be constructed by plastic material. The object-side surface 541 comprises a convex portion 5411 in the vicinity of the optical axis and a concave portion 5412 in the vicinity of the periphery of the fourth lens element 540. The image-side surface 542 has a concave portion 5421 in the vicinity of the optical axis and a convex portion 5422 in the vicinity of a periphery of the fourth lens element 540. The object-side surface 541 and surface 542 may both be aspherical surfaces defined by the aspherical formula. Please refer to FIG. 20 for values of the aspherical parameters.

As illustrated in FIG. 21, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 22:
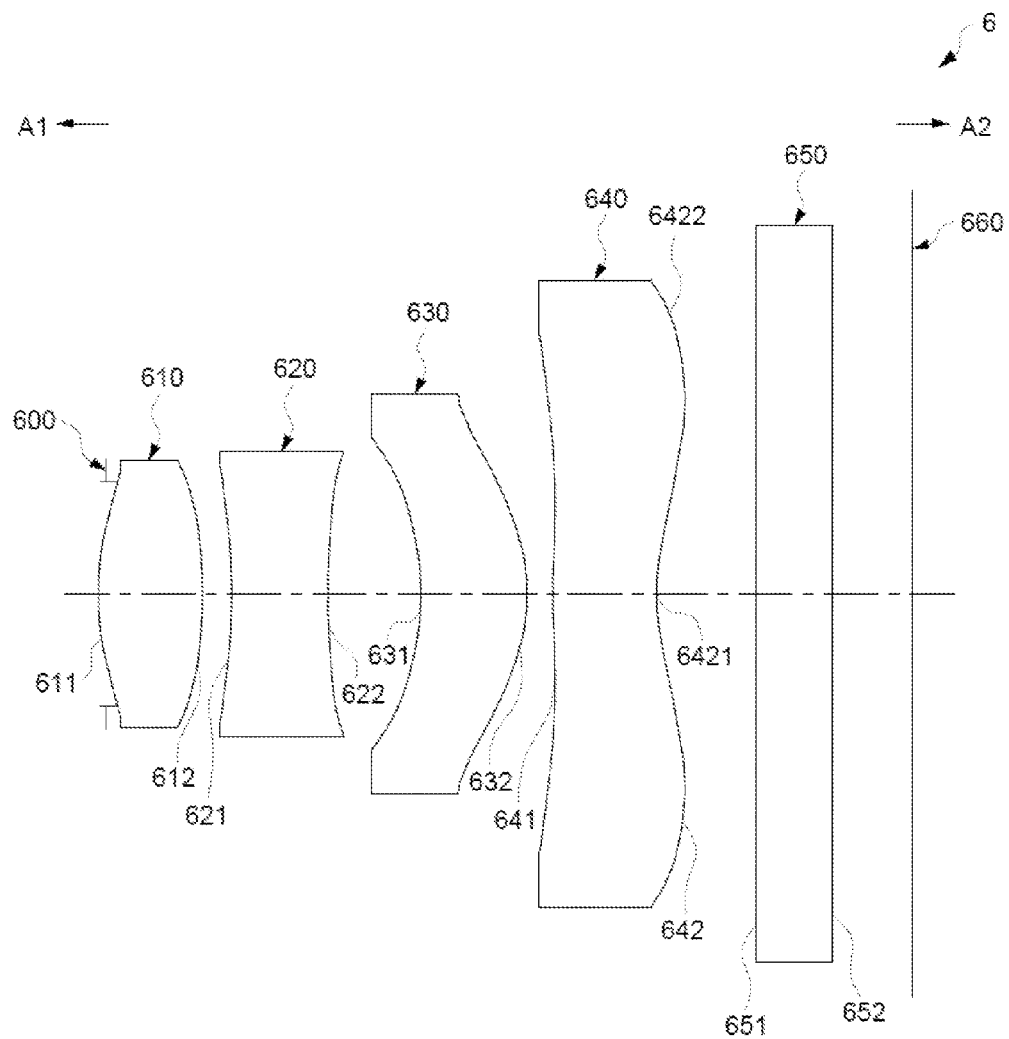
FIG. 22 shows a cross-sectional view of an optical imaging lens having four lens elements of the optical imaging lens according to embodiment 6 of the invention.
Figure 25:
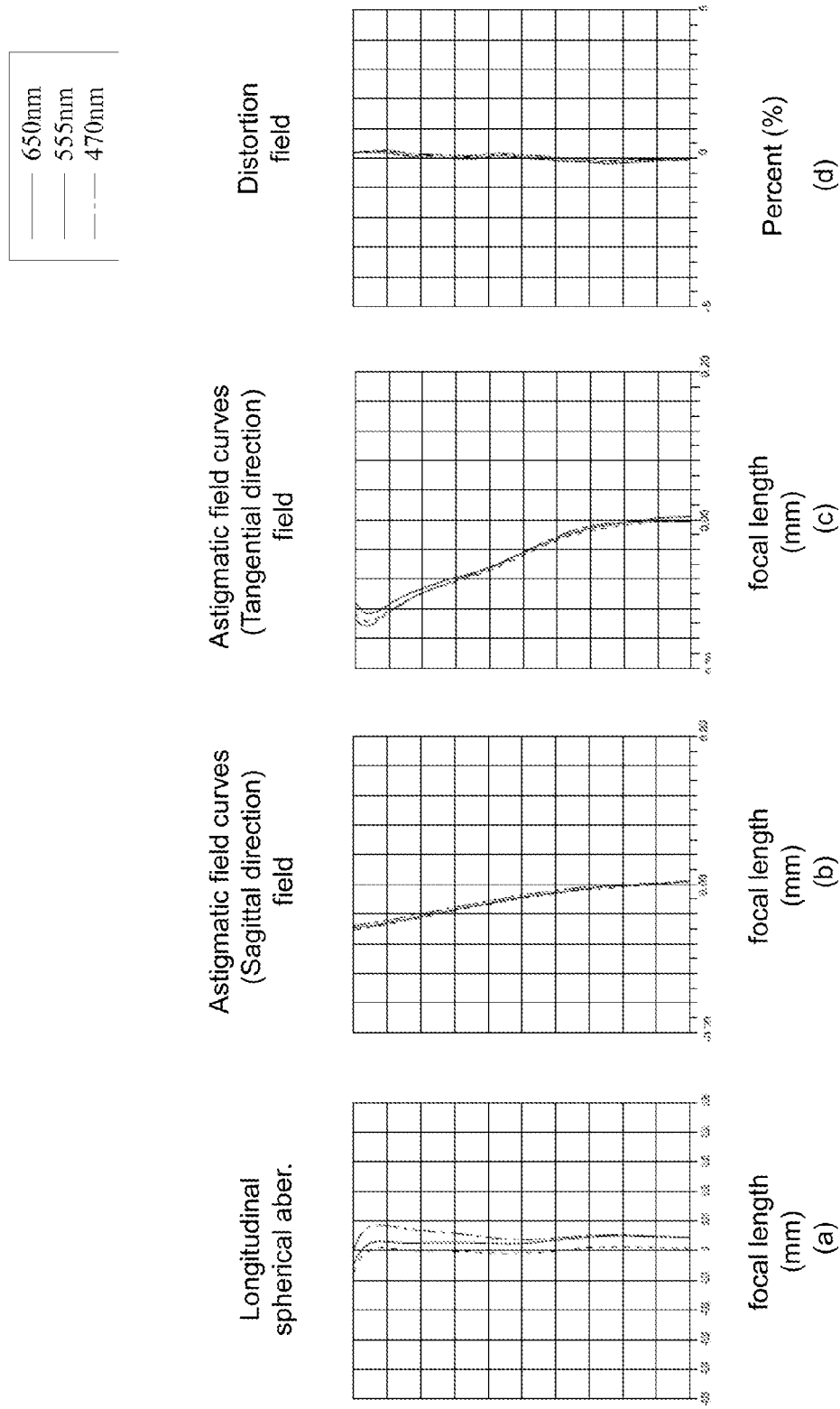
FIG. 25 shows charts of longitudinal spherical aberration and other kinds of optical aberrations of the optical imaging lens according to embodiment 6 of the invention.

Reference is now made to FIGS. 22-25. FIG. 22 illustrates an example cross-sectional view of an optical imaging lens having four lens elements of the optical imaging lens according to a sixth example embodiment. FIG. 23 shows an example table of optical data of each lens element of the optical imaging lens according to the sixth example embodiment. FIG. 24 shows an example table of aspherical data of the optical imaging lens according to the sixth example embodiment. FIG. 25 shows example charts of longitudinal spherical aberration and other kinds of optical aberrations of the optical imaging lens according to the sixth example embodiment.

As shown in FIG. 22, the optical imaging lens 6 of the present embodiment, in an order from an object side A1 to an image side A2, comprises an aperture stop 600, a first lens element 610, a second lens element 620, a third lens element 630 and a fourth lens element 640. Both of a filtering unit 650 and an image plane 660 of an image sensor may be positioned at the image side A2 of the optical imaging lens 6. Each of the first, second, third, fourth lens elements 610, 620, 630, 640 and the filtering unit 650 has an object-side surface 611/621/631/641/651 facing toward the object side A1 and an image-side surface 612/622/632/642/652 facing toward the image side A2. The aperture stop 600, positioned in front of the first lens element 610, and together with the first lens element 610 having positive refracting power could effectively shorten the length of the optical imaging lens 6. Here an example embodiment of filtering unit 650 may be an IR cut filter, which may be positioned between the fourth lens element 640 and the image plane 660. The filtering unit 650 filters light with specific wavelength from the light passing optical imaging lens 6. For example, IR light may be filtered, and this may prohibit the IR light which is not visible by human eyes from producing an image on image plane 660.

Similarly, in the present embodiment, air gaps exist between the lens elements 610, 620, 630, 640, the filtering unit 650 and the image plane 660 of the image sensor. Please refer to FIG. 1 for the positions of the air gaps. The sum of all air gaps d1, d2, d3 between the first and fourth lens elements is denoted by $G_{aa}$.

One difference between the sixth embodiments and the first embodiments is that the central thickness of lens T3 of the third lens element 630, the air gap $G_{34}$ between the third lens element 630 and the fourth lens element 640 and the sum of all air gaps $G_{aa}$ from the first lens element 610 to the fourth lens element 640 are different. Please refer to FIG. 23 for the optical characteristics of each lens elements in the optical imaging lens 6 of the present embodiment, wherein the values of the relations (1)~(9) are:

$(T3/G_{34})=4.07;$ $(G_{aa}/T3)=1.39;$ $(EFL/G_{12})=23.91;$ $(T3/G_{12})=3.59;$ $(T2+T3)=0.81(mm);$ $[(T2+T3)/T3]=1.91;$ $(G_{12}+G_{34})=0.22(mm);$ $(f1+f3)=3.97(mm);$ $(BFL/EFL)=0.36;$ wherein the distance from the object-side surface 611 of the first lens element 610 to the image plane 660 is 3.24 (mm), and the length of the optical imaging lens 6 is shortened.

Example embodiments of the lens elements of the optical imaging lens 6 may comprise the following example embodiments:

The first lens element 610 may have positive refracting power, which may be constructed by plastic material. Both the object-side surface 611 and the image-side surface 612 are convex surfaces. The convex surfaces 611 and 612 may both be aspherical surfaces defined by the aspherical formula. Please refer to FIG. 24 for values of the aspherical parameters.

The second lens element 620 may have negative refracting power, which may be constructed by plastic material. Both the object-side surface 621 and the image-side surface 622 are concave surfaces. The concave surfaces 621, 622 may both be aspherical surfaces defined by the aspherical formula. Please refer to FIG. 24 for values of the aspherical parameters.

The third lens element 630 may have positive refracting power, which may be constructed by plastic material. The object-side surface 631 is a concave surface and the image-side surface 632 is a convex surface. The concave surface 631 and convex surface 632 may both be aspherical surfaces defined by the aspherical formula. Please refer to FIG. 24 for values of the aspherical parameters.

The fourth lens element 640 may have negative refracting power, which may be constructed by plastic material. The object-side surface 641 comprises a convex portion 6411 in the vicinity of the optical axis and a concave portion 6412 in the vicinity of the periphery of the fourth lens element 640. The image-side surface 642 has a concave portion 6421 in the vicinity of the optical axis and a convex portion 6422 in the vicinity of a periphery of the fourth lens element 640. The object-side surface 641 and the image-side surface 642 may both be aspherical surfaces defined by the aspherical formula. Please refer to FIG. 24 for values of the aspherical parameters.

As illustrated in FIG. 25, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 26:
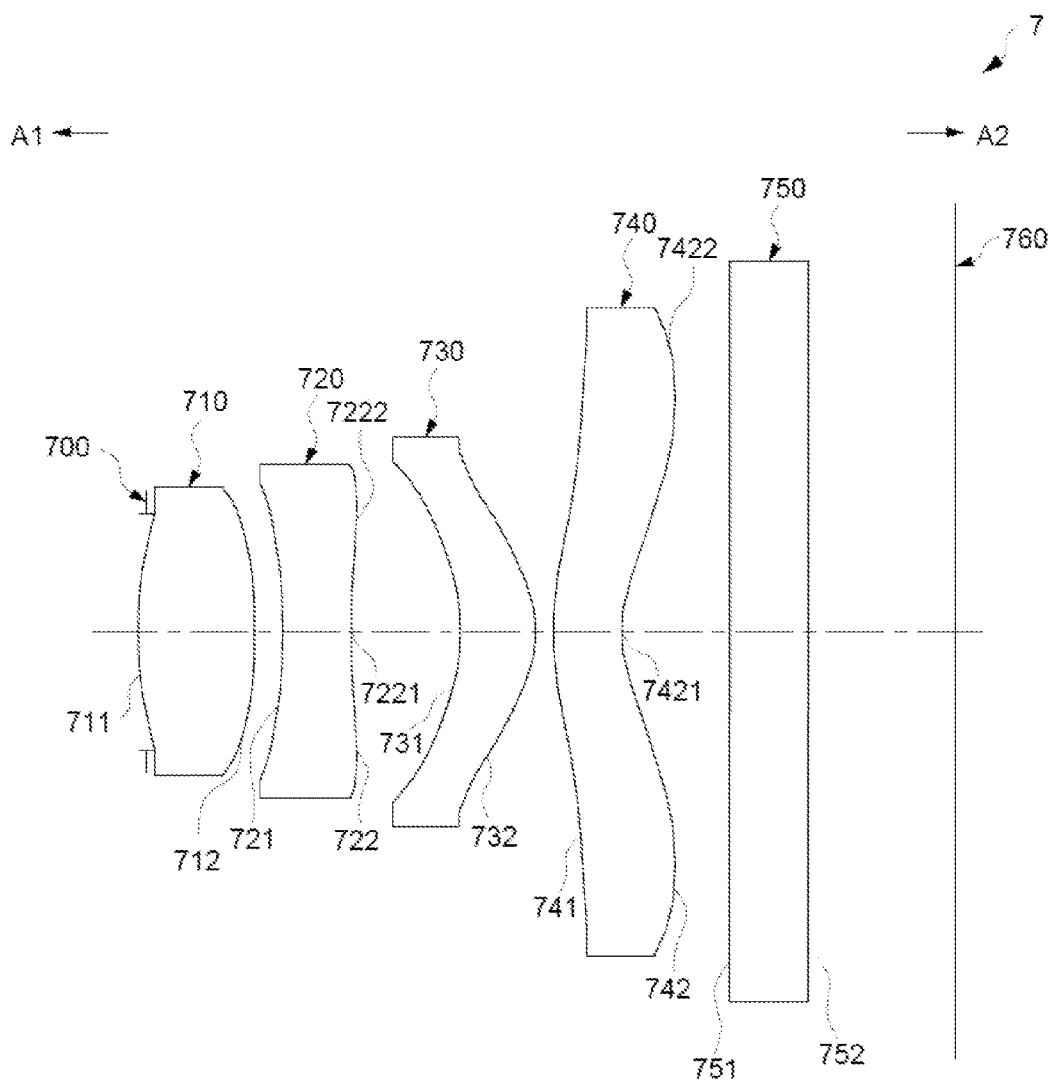
FIG. 26 shows a cross-sectional view of an optical imaging lens having four lens elements of the optical imaging lens according to embodiment 7 of the invention.
Figure 29:
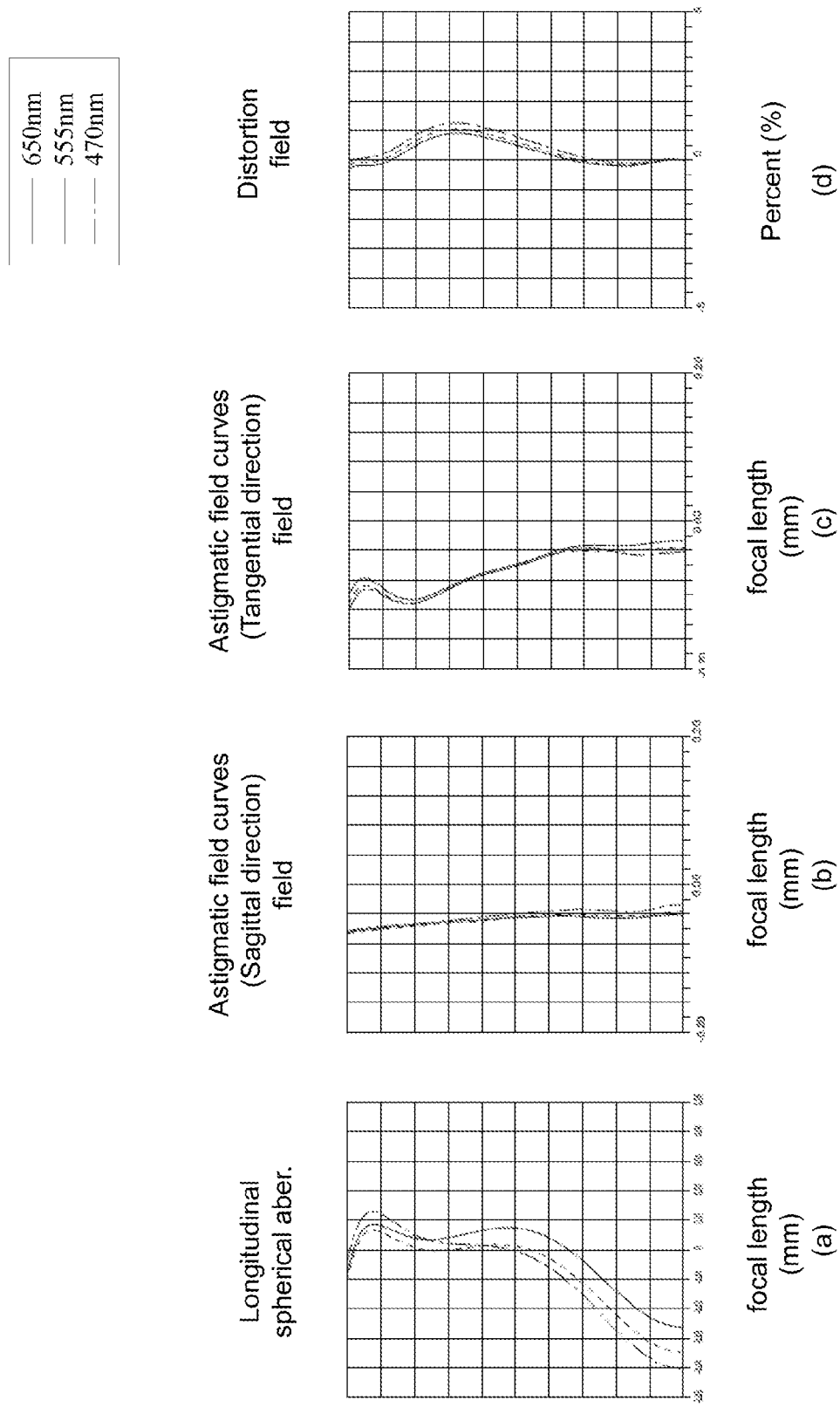
FIG. 29 shows charts of longitudinal spherical aberration and other kinds of optical aberrations of the optical imaging lens according to embodiment 7 of the invention.

Reference is now made to FIGS. 26-29. FIG. 26 illustrates an example cross-sectional view of an optical imaging lens having four lens elements of the optical imaging lens according to a seventh example embodiment. FIG. 27 shows an example table of optical data of each lens element of the optical imaging lens according to the seventh example embodiment. FIG. 28 shows an example table of aspherical data of the optical imaging lens according to the seventh example embodiment. FIG. 29 shows example charts of longitudinal spherical aberration and other kinds of optical aberrations of the optical imaging lens according to the seventh example embodiment.

As shown in FIG. 26, the optical imaging lens 7 of the present embodiment, in an order from an object side A1 to an image side A2, comprises an aperture stop 700, a first lens element 710, a second lens element 720, a third lens element 730 and a fourth lens element 740.

Both of a filtering unit 750 and an image plane 760 of an image sensor may be positioned at the image side A2 of the optical imaging lens 7. Each of the first, second, third, fourth lens elements 710, 720, 730, 740 and the filtering unit 750 has an object-side surface 711/721/731/741/751 facing toward the object side A1 and an image-side surface 712/722/732/742/752 facing toward the image side A2. The aperture stop 700, positioned in front of the first lens element 710, and together with the first lens element 710 having positive refracting power could effectively shorten the length of the optical imaging lens 7. Here an example embodiment of filtering unit 750 may comprise an IR cut filter, which is positioned between the fourth lens element 740 and the image plane 760. The filtering unit 750 filters light with specific wavelength from the light passing optical imaging lens 7. For example, IR light is filtered, and this may prohibit the IR light which is not seen by human eyes from producing an image on image plane 760.

Similarly, in the present embodiment, air gaps exist between the lens elements 710, 720, 730, 740, the filtering unit 750 and the image plane 760 of the image sensor. Please refer to FIG. 1 for the positions of the air gaps. The sum of all air gaps d1, d2, d3 between the first and fourth lens elements is denoted by $G_{aa}$.

One difference between the seventh embodiments and the first embodiments is that the central thickness of lens T3 of the third lens element 730, the air gap $G_{34}$ between the third lens element 730 and the fourth lens element 740 and the sum of all air gaps $G_{aa}$ from the first lens element 710 to the fourth lens element 740 are different. Please refer to FIG. 27 for the optical characteristics of each lens elements in the optical imaging lens 7 of the present embodiment, wherein the values of the relations (1)~(9) are:

$(T3/G_{34})=4.15$;

$(G_{aa}/T3)=2.07$;

$(EFL/G_{12})=23.90$;

$(T3/G_{12})=2.72$;

$(T2+T3)=0.54$(mm);

$[(T2+T3)/T3]=1.93$;

$(G_{12}+G_{34})=0.17$(mm);

$(f1+f3)=3.34$(mm);

$(BFL/EFL)=0.51$;

wherein the distance from the object-side surface 711 of the first lens element 710 to the image plane 760 is 3.064 (mm), and the length of the optical imaging lens 7 is shortened.

Example embodiments of the lens elements of the optical imaging lens 7 may comprise the following example embodiments:

The first lens element 710 may have positive refracting power, which may be constructed by plastic material. Both the object-side surface 711 and the image-side surface 712 are convex surfaces. The convex surfaces 711 and 712 may both be aspherical surfaces defined by the aspherical formula. Please refer to FIG. 28 for values of the aspherical parameters.

The second lens element 720 may have negative refracting power, which may be constructed by plastic material. The object-side surface 721 is a convex surface. The image-side surface 722 has a concave portion 7221 in the vicinity of the optical axis and a convex portion 7222 in the vicinity of a periphery of the second lens element 720. The convex surface 721 and the image-side surface 722 may both be aspherical surfaces defined by the aspherical formula. Please refer to FIG. 28 for values of the aspherical parameters.

The third lens element 730 may have positive refracting power, which may be constructed by plastic material. The object-side surface 731 is a concave surface and the image-side surface 732 is a convex surface. The concave surface 731 and convex surface 732 may both be aspherical surfaces defined by the aspherical formula. Please refer to FIG. 28 for values of the aspherical parameters.

The fourth lens element 740 may have negative refracting power, which may be constructed by plastic material. The object-side surface 741 is a convex surface. The image-side surface 742 has a concave portion 7421 in the vicinity of the optical axis and a convex portion 7422 in the vicinity of a periphery of the fourth lens element 740. The convex surface 741 and the image-side surface 742 may both be aspherical surfaces defined by the aspherical formula. Please refer to FIG. 28 for values of the aspherical parameters.

As illustrated in FIG. 29, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 30:
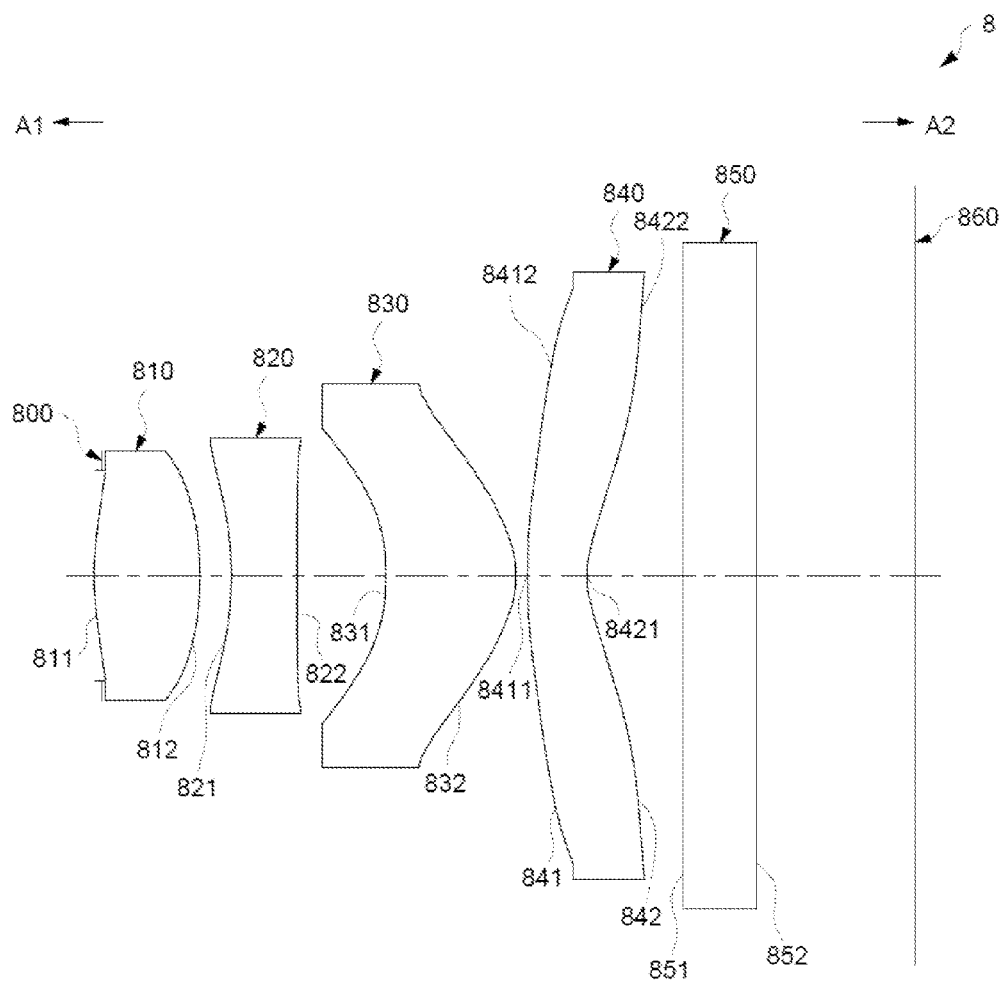
FIG. 30 shows a cross-sectional view of an optical imaging lens having four lens elements of the optical imaging lens according to embodiment 8 of the invention.
Figure 33:
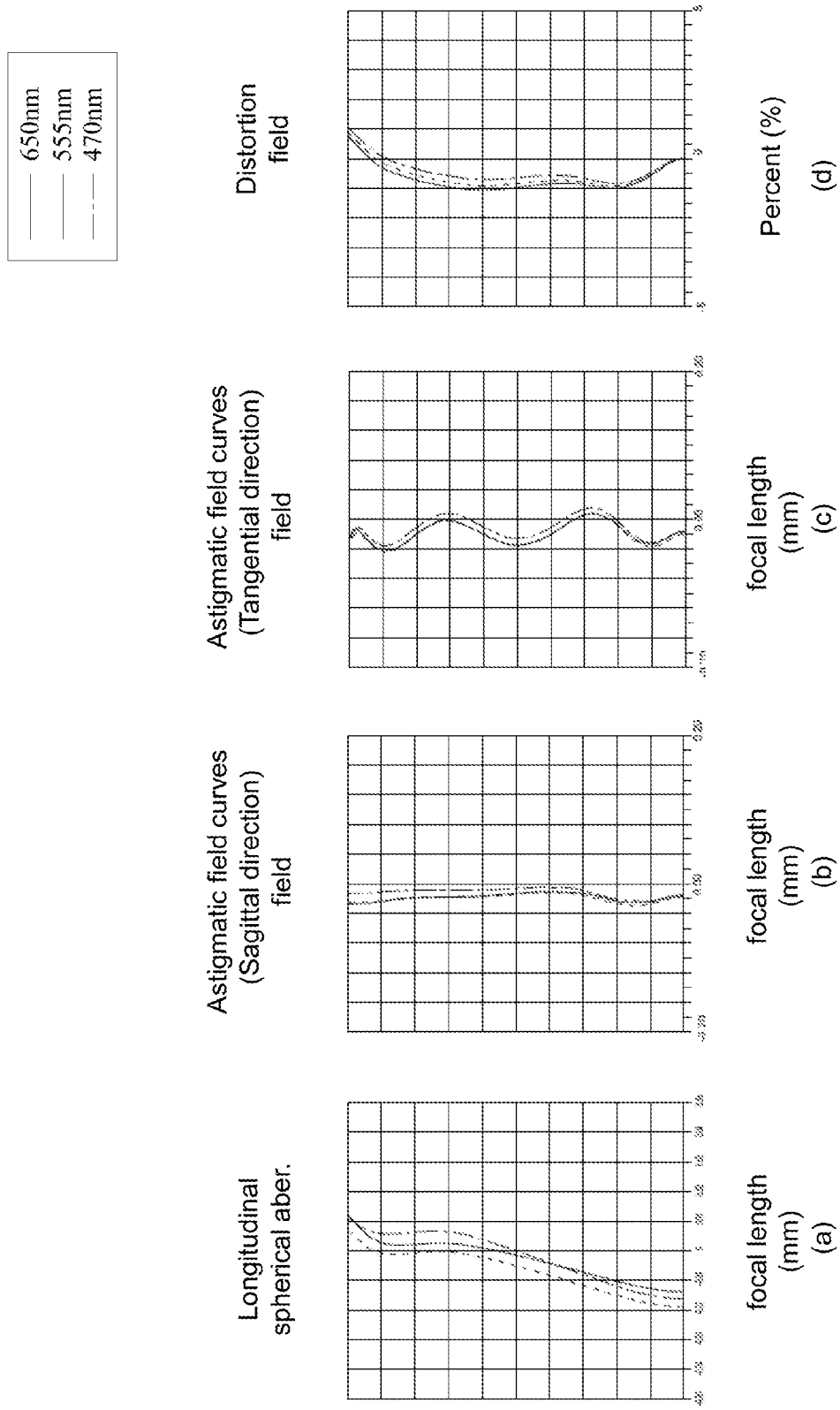
FIG. 33 shows charts of longitudinal spherical aberration and other kinds of optical aberrations of the optical imaging lens according to embodiment 8 of the invention.

Reference is now made to FIGS. 30-33. FIG. 30 illustrates an example cross-sectional view of an optical imaging lens having four lens elements of the optical imaging lens according to an eighth example embodiment. FIG. 31 shows an example table of optical data of each lens element of the optical imaging lens according to the eighth example embodiment. FIG. 32 shows an example table of aspherical data of the optical imaging lens according to the eighth example embodiment. FIG. 33 shows example charts of longitudinal spherical aberration and other kinds of optical aberrations of the optical imaging lens according to the eighth example embodiment.

As shown in FIG. 30, the optical imaging lens 8 of the present embodiment, in an order from an object side A1 to an image side A2, comprises an aperture stop 800, a first lens element 810, a second lens element 820, a third lens element 830 and a fourth lens element 840. Both of a filtering unit 850 and an image plane 860 of an image sensor may be positioned at the image side A2 of the optical imaging lens 8. Each of the first, second, third, fourth lens elements 810, 820, 830, 840 and the filtering unit 850 has an object-side surface 811/821/831/841/851 facing toward the object side A1 and an image-side surface 812/822/832/842/852 facing toward the image side A2. The aperture stop 800, positioned in front of the first lens element 810, and together with the first lens element 810 having positive refracting power could effectively shorten the length of the optical imaging lens 8. Here an example embodiment of filtering unit 850 may comprise an IR cut filter, which is positioned between the fourth lens element 840 and the image plane 860. The filtering unit 850 filters light with specific wavelength from the light passing optical imaging lens 8. For example, IR light is filtered, and this may prohibit the IR light which is not seen by human eyes from producing an image on image plane 860.

Similarly, in the present embodiment, air gaps exist between the lens elements 810, 820, 830, 840, the filtering unit 850 and the image plane 860 of the image sensor. Please refer to FIG. 1 for the positions of the air gaps. The sum of all air gaps d1, d2, d3 between the first and fourth lens elements is denoted by $G_{aa}$.

One difference between the eighth embodiments and the first embodiments is that the central thickness of lens T3 of the third lens element 830, the air gap $G_{34}$ between the third lens element 830 and the fourth lens element 840 and the sum of all air gaps $G_{aa}$ from the first lens element 810 to the fourth lens element 840 are different. The object-side surface 841 of the fourth lens element 840 facing toward the object side A1 further comprises a convex portion 8412 in the vicinity of a periphery of the fourth lens element 840. Please refer to FIG. 31 for the optical characteristics of each lens elements in the optical imaging lens 8 of the present embodiment, wherein the values of the relations (1)~(9) are:

$(T3/G_{34})$=11.72;

$(G_{aa}/T3)$=1.01;

$(EFL/G_{12})$=20.38;

$(T3/G_{12})$=4.11;

$(T2+T3)$=0.81(mm);

$[(T2+T3)/T3]$=1.51;

$(G_{12}+G_{34})$=0.18(mm);

$(f1+f3)$=2.50(mm);

$(BFL/EFL)$=0.51;

wherein the distance from the object-side surface 811 of the first lens element 810 to the image plane 860 is 3.408 (mm), and the length of the optical imaging lens 8 is shortened.

Example embodiments of the lens elements of the optical imaging lens 8 may comprise the following example embodiments:

The first lens element 810 may have positive refracting power, which may be constructed by plastic material. Both the object-side surface 811 and the image-side surface 812 are convex surfaces. The convex surfaces 811 and 812 may both be aspherical surfaces defined by the aspherical formula. Please refer to FIG. 32 for values of the aspherical parameters.

The second lens element 820 may have negative refracting power, which may be constructed by plastic material. Both the object-side surface 821 and the image-side surface 822 are concave surfaces. The concave surfaces 821 and 822 may both be aspherical surfaces defined by the aspherical formula. Please refer to FIG. 32 for values of the aspherical parameters.

The third lens element 830 may have positive refracting power, which may be constructed by plastic material. The object-side surface 831 is a concave surface and the image-side surface 832 is a convex surface. The concave surface 831 and convex surface 832 may both be aspherical surfaces defined by the aspherical formula. Please refer to FIG. 32 for values of the aspherical parameters.

The fourth lens element 840 may have negative refracting power, which may be constructed by plastic material. The object-side surface 841 has a convex portion 8411 in the vicinity of the optical axis and a convex portion 8412 in the vicinity of a periphery of the fourth lens element 840 and the image-side surface 842 has a concave portion 8421 in the vicinity of the optical axis and a convex portion 8422 in the vicinity of a periphery of the fourth lens element 840. The object-side surface 841 and the image-side surface 842 may both be aspherical surfaces defined by the aspherical formula. Please refer to FIG. 32 for values of the aspherical parameters.

As illustrated in FIG. 33, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 34:
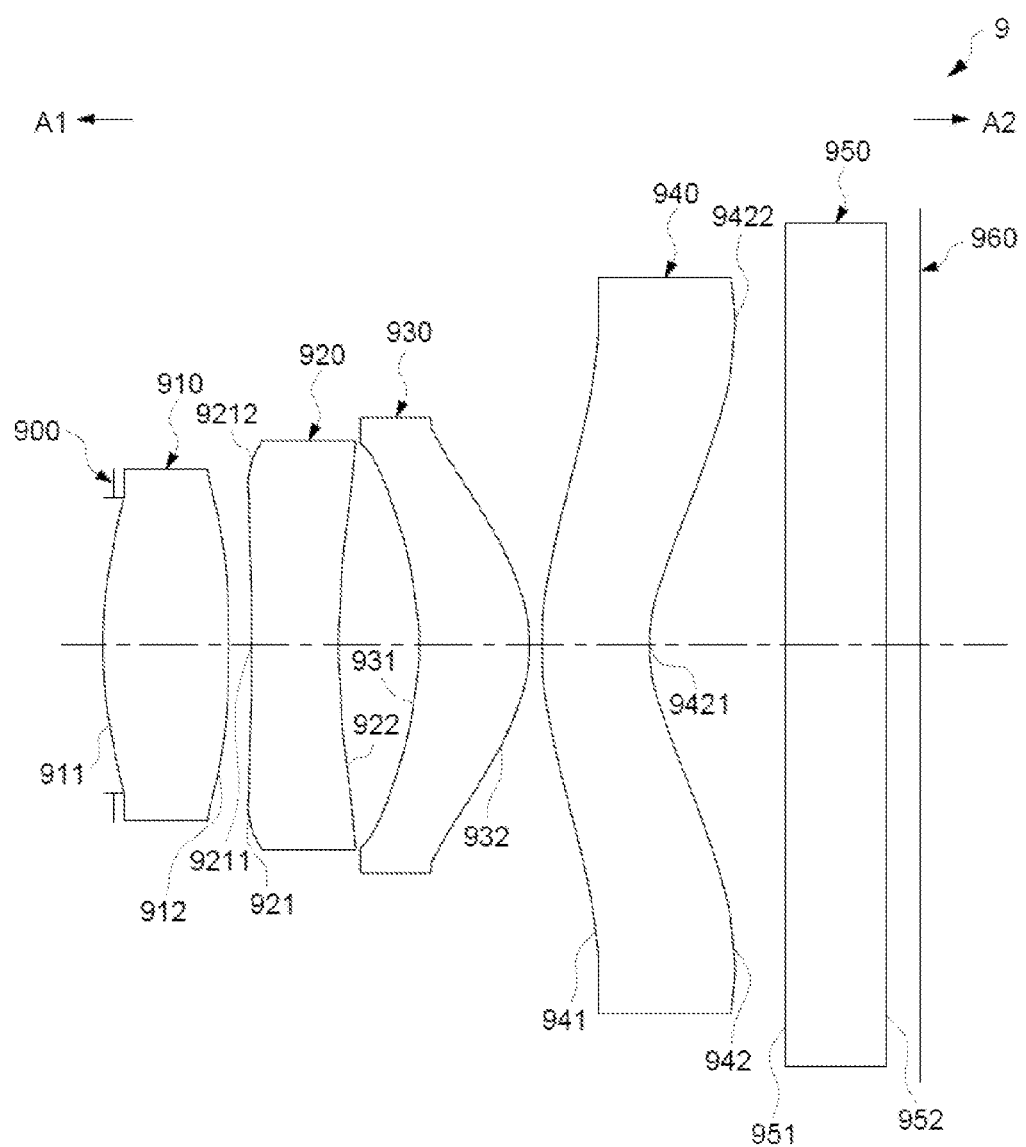
FIG. 34 shows a cross-sectional view of an optical imaging lens having four lens elements of the optical imaging lens according to embodiment 9 of the invention.
Figure 37:
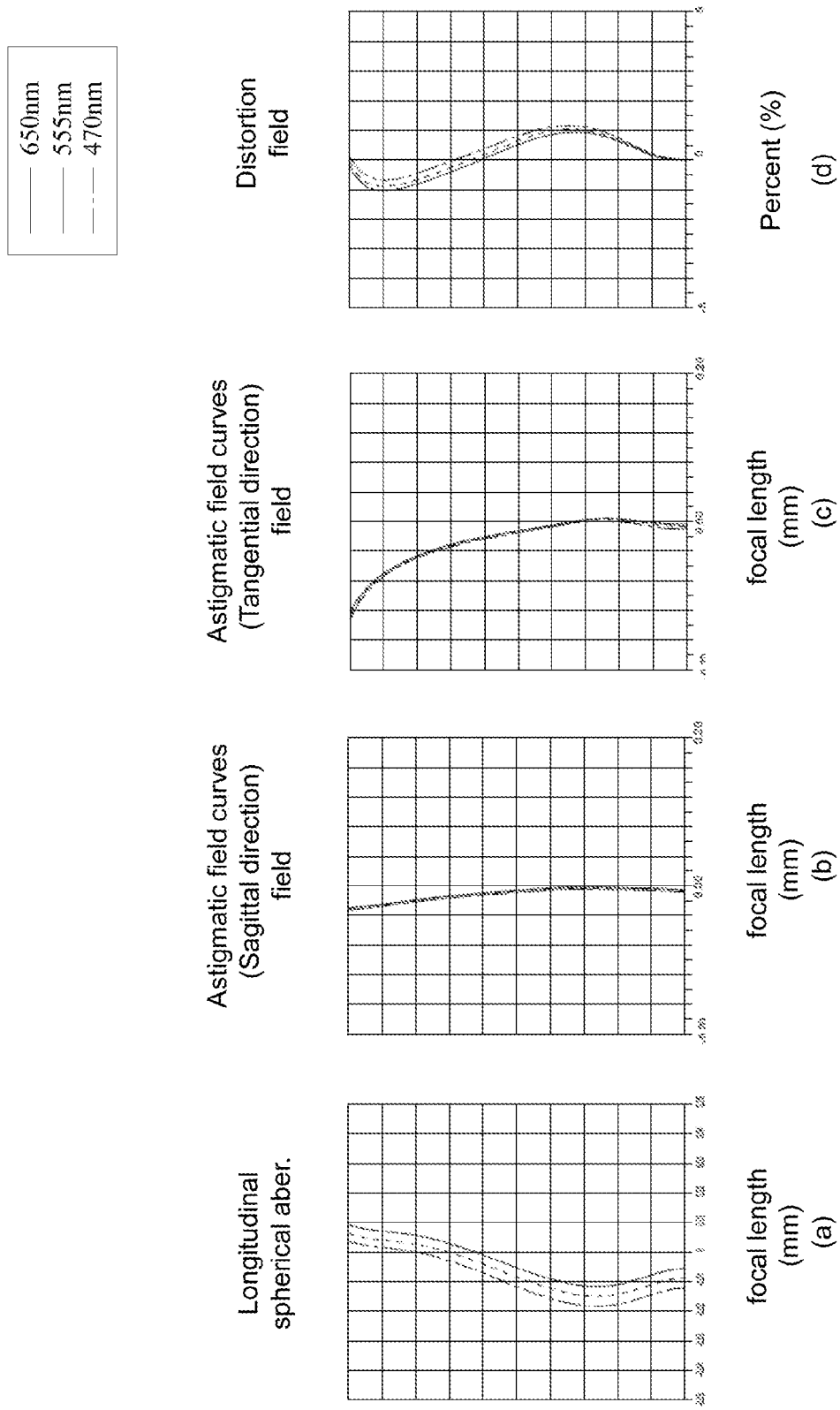
FIG. 37 shows charts of longitudinal spherical aberration and other kinds of optical aberrations of the optical imaging lens according to embodiment 9 of the invention.

Reference is now made to FIGS. 34-37. FIG. 34 illustrates an example cross-sectional view of an optical imaging lens having four lens elements of the optical imaging lens according to a ninth example embodiment. FIG. 35 shows an example table of optical data of each lens element of the optical imaging lens according to the ninth example embodiment. FIG. 36 shows an example table of aspherical data of the optical imaging lens according to the ninth example embodiment. FIG. 37 shows example charts of longitudinal spherical aberration and other kinds of optical aberrations of the optical imaging lens according to the ninth example embodiment.

As shown in FIG. 34, the optical imaging lens 9 of the present embodiment, in an order from an object side A1 to an image side A2, comprises an aperture stop 900, a first lens element 910, a second lens element 920, a third lens element 930 and a fourth lens element 940. Both of a filtering unit 950 and an image plane 960 of an image sensor may be positioned at the image side A2 of the optical imaging lens 9. Each of the first, second, third, fourth lens elements 910, 920, 930, 940 and the filtering unit 950 has an object-side surface 911/921/931/941/951 facing toward the object side A1 and an image-side surface 912/922/932/942/952 facing toward the image side A2. The aperture stop 900, positioned in front of the first lens element 910, and together with the first lens element 910 having positive refracting power could effectively shorten the length of the optical imaging lens 9. Here an example embodiment of filtering unit 950 may comprise an IR cut filter, which is positioned between the fourth lens element 940 and the image plane 960. The filtering unit 950 filters light with specific wavelength from the light passing optical imaging lens 9. For example, IR light is filtered, and this may prohibit the IR light which is not seen by human eyes from producing an image on image plane 960.

Similarly, in the present embodiment, air gaps exist between the lens elements 910, 920, 930, 940, the filtering unit 950 and the image plane 960 of the image sensor. Please refer to FIG. 1 for the positions of the air gaps. The sum of all air gaps d1, d2, d3 between the first and fourth lens elements is denoted by $G_{aa}$.

One difference between the ninth embodiment and the first embodiment is that the central thickness of lens T3 of the third lens element 930, the air gap $G_{34}$ between the third lens element 930 and the fourth lens element 940 and the sum of all air gaps $G_{aa}$ from the first lens element 910 to the fourth lens element 940 are different. The object-side surface 921 of the second lens element 920 further comprises a convex portion 9212 in the vicinity of a periphery of the second lens element 920. Please refer to FIG. 35 for the optical characteristics of each lens elements in the optical imaging lens 9 of the present embodiment, wherein the values of the relations (1)~(9) are:

$(T3/G_{34})=9.09$;

$(G_{aa}/T3)=1.02$;

$(EFL/G_{12})=23.90$;

$(T3/G_{12})=4.98$;

$(T2+T3)=0.59(mm)$;

$[(T2+T3)/T3]=1.79$;

$(G_{12}+G_{34})=0.10(mm)$;

$(f1+f3)=2.98(mm)$;

$(BFL/EFL)=0.51$;

wherein the distance from the object-side surface 911 of the first lens element 910 to the image plane 960 is 2.415 (mm), and the length of the optical imaging lens 9 is shortened.

Example embodiments of the lens elements of the optical imaging lens 9 may comprise the following example embodiments:

The first lens element 910 may have positive refracting power, which may be constructed by plastic material. Both the object-side surface 911 and the image-side surface 912 are convex surfaces. The convex surfaces 911 and 912 may both be aspherical surfaces defined by the aspherical formula. Please refer to FIG. 36 for values of the aspherical parameters.

The second lens element 920 may have negative refracting power, which may be constructed by plastic material. The image-side surface 922 is a concave surface. The object-side surface 921 has a concave portion 9211 in the vicinity of the optical axis and a convex portion 9212 in the vicinity of a periphery of the second lens element 920. The object-side surface 921 and image-side surface 922 may both be aspherical surfaces defined by the aspherical formula. Please refer to FIG. 36 for values of the aspherical parameters.

The third lens element 930 may have positive refracting power, which may be constructed by plastic material. The object-side surface 931 is a concave surface and the image-side surface 932 is a convex surface. The concave surface 931 and convex surface 932 may both be aspherical surfaces defined by the aspherical formula. Please refer to FIG. 36 for values of the aspherical parameters.

The fourth lens element 940 may have negative refracting power, which may be constructed by plastic material. The object-side surface 941 is a convex surface. The image-side surface 942 has a concave portion 9421 in the vicinity of the optical axis and a convex portion 9422 in the vicinity of a periphery of the fourth lens element 940. The convex surface 941 and image-side surface 942 may both be aspherical surfaces defined by the aspherical formula. Please refer to FIG. 36 for values of the aspherical parameters.

As illustrated in FIG. 37, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 38:
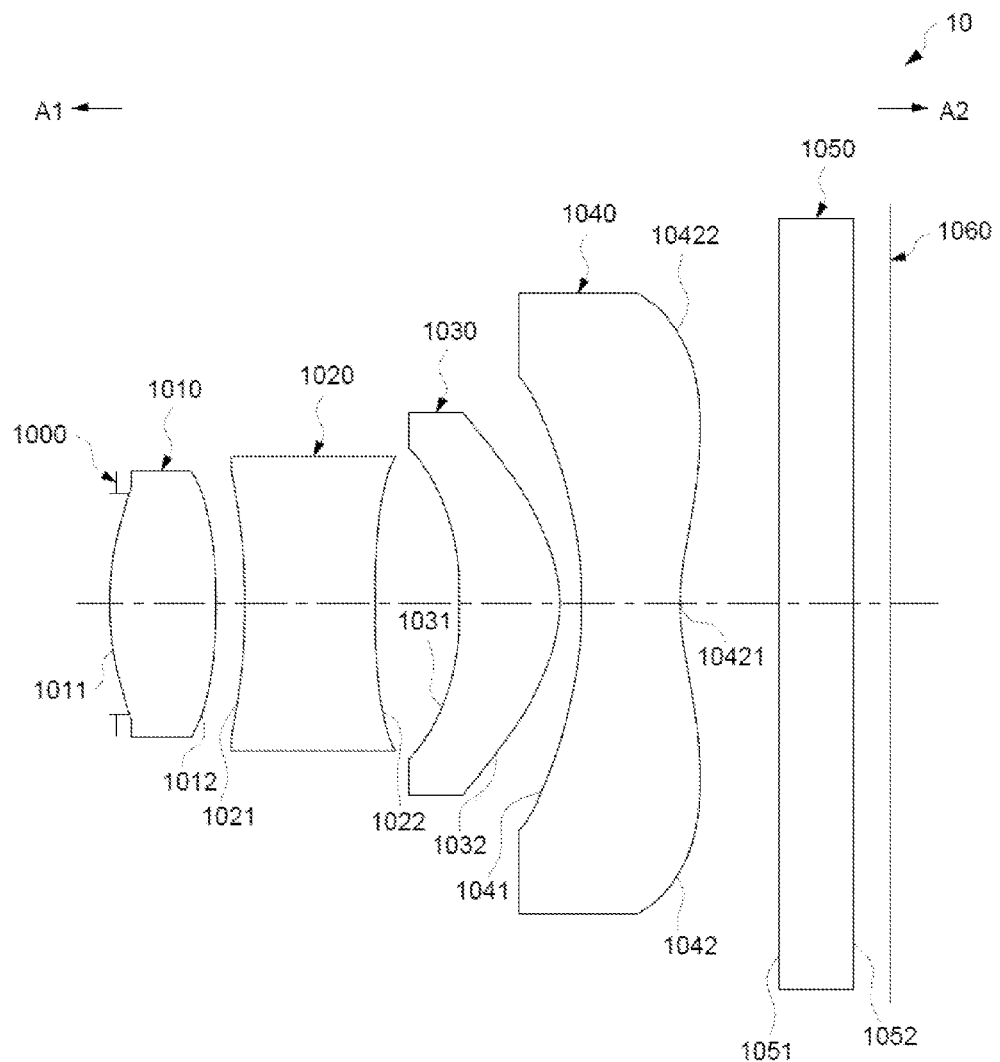
FIG. 38 shows a cross-sectional view of an optical imaging lens having four lens elements of the optical imaging lens according to embodiment 10 of the invention.
Figure 41:
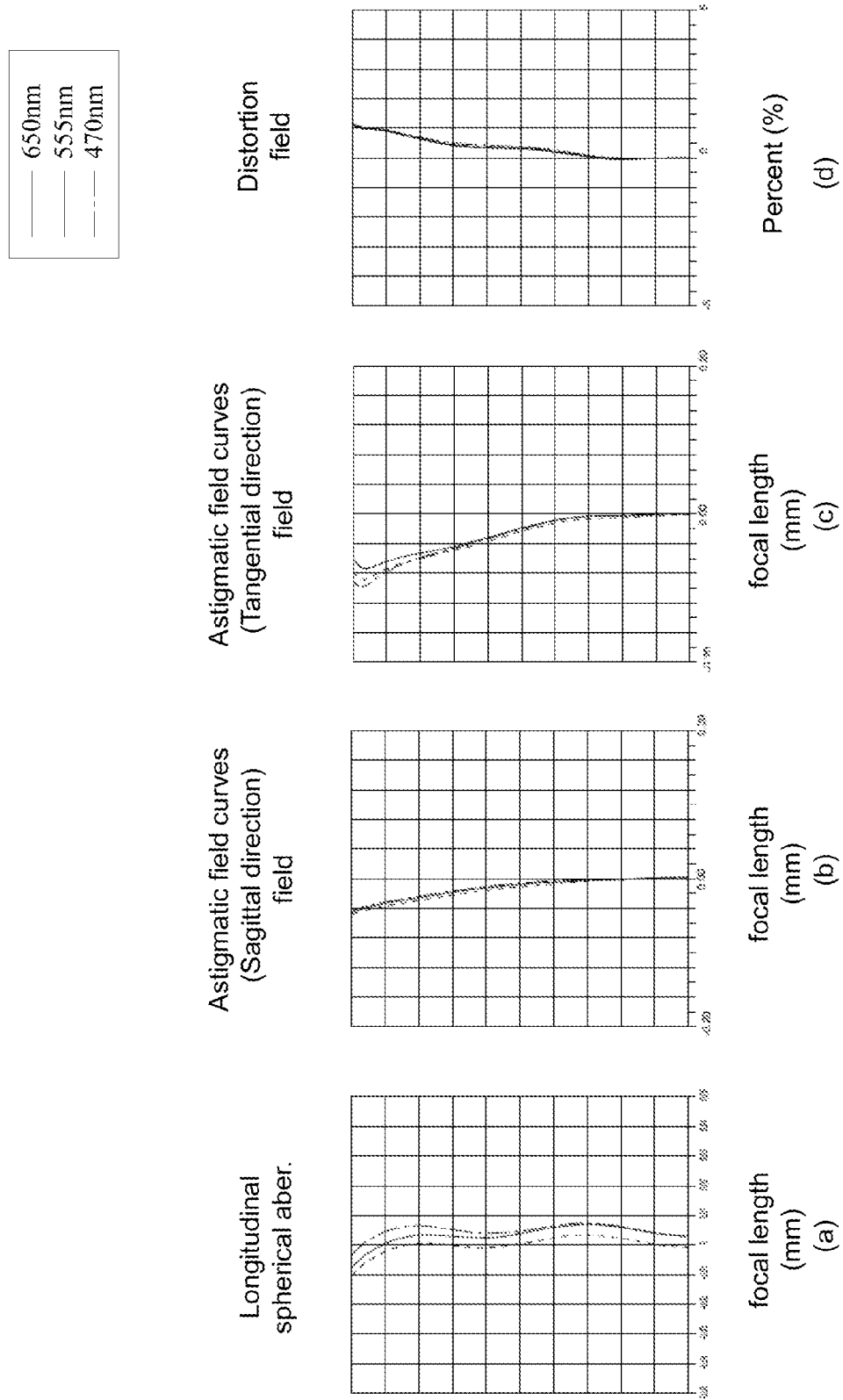
FIG. 41 shows charts of longitudinal spherical aberration and other kinds of optical aberrations of the optical imaging lens according to embodiment 10 of the invention.

Reference is now made to FIGS. 38-41. FIG. 38 illustrates an example cross-sectional view of an optical imaging lens having four lens elements of the optical imaging lens according to a tenth example embodiment. FIG. 39 shows an example table of optical data of each lens element of the optical imaging lens according to the tenth example embodiment. FIG. 40 shows an example table of aspherical data of the optical imaging lens according to the tenth example embodiment. FIG. 41 shows example charts of longitudinal spherical aberration and other kinds of optical aberrations of the optical imaging lens according to the tenth example embodiment.

As shown in FIG. 38, the optical imaging lens 10 of the present embodiment, in an order from an object side A1 to an image side A2, comprises an aperture stop 1000, a first lens element 1010, a second lens element 1020, a third lens element 1030 and a fourth lens element 1040. Both of a filtering unit 1050 and an image plane 1060 of an image sensor may be positioned at the image side A2 of the optical imaging lens 10. Each of the first, second, third, fourth lens elements 1010, 1020, 1030, 1040 and the filtering unit 1050 has an object-side surface 1011/1021/1031/1041/1051 facing toward the object side A1 and an image-side surface 1012/1022/1032/1042/1052 facing toward the image side A2. The aperture stop 1000, positioned in front of the first lens element 1010, and together with the first lens element 1010 having positive refracting power could effectively shorten the length of the optical imaging lens 10. Here an example embodiment of filtering unit 1050 may comprise an IR cut filter, which is positioned between the fourth lens element 1040 and the image plane 1060. The filtering unit 1050 filters light with specific wavelength from the light passing optical imaging lens 10. For example, IR light is filtered, and this may prohibit the IR light which is not visible by human eyes from producing an image on image plane 1060.

Similarly, in the present embodiment, air gaps exist between the lens elements 1010, 1020, 1030, 1040, the filtering unit 1050 and the image plane 1060 of the image sensor. Please refer to FIG. 1 for the positions of the air gaps. The sum of all air gaps d1, d2, d3 between the first and fourth lens elements is denoted by $G_{aa}$.

One difference between the tenth embodiments and the first embodiments is that the central thickness of lens T3 of the third lens element 1030, the air gap $G_{34}$ between the third lens element 1030 and the fourth lens element 1040 and the sum of all air gaps $G_{aa}$ from the first lens element 1010 to the fourth lens element 1040 are different. Please refer to FIG. 39 for the optical characteristics of each lens elements in the optical imaging lens 10 of the present embodiment, wherein the values of the relations (1)~(9) are:

$(T3/G_{34})$=4.62;

$(G_{aa}/T3)$=1.36;

$(EFL/G_{12})$=23.48;

$(T3/G_{12})$=3.42;

$(T2+T3)$=0.93(mm);

$[(T2+T3)/T3]$=2.31;

$(G_{12}+G_{34})$=0.21(mm);

$(f1+f3)$=3.06(mm);

$(BFL/EFL)$=0.31;

wherein the distance from the object-side surface 1011 of the first lens element 1010 to the image plane 1060 is 3.16 (mm), and the length of the optical imaging lens 10 is shortened.

Example embodiments of the lens elements of the optical imaging lens 10 may comprise the following example embodiments:

The first lens element 1010 may have positive refracting power, which may be constructed by plastic material. Both the object-side surface 1011 and the image-side surface 1012 are convex surfaces. The convex surfaces 1011 and 1012 may both be aspherical surfaces defined by the aspherical formula. Please refer to FIG. 40 for values of the aspherical parameters.

The second lens element 1020 may have negative refracting power, which may be constructed by plastic material. Both the object-side surface 1021 and the image-side surface 1022 are concave surfaces. The concave surfaces 1021, 1022 may both be aspherical surfaces defined by the aspherical formula. Please refer to FIG. 40 for values of the aspherical parameters.

The third lens element 1030 may have positive refracting power, which may be constructed by plastic material. The object-side surface 1031 is a concave surface and the image-side surface 1032 is a convex surface. The concave surface 1031 and convex surface 1032 may both be aspherical surfaces defined by the aspherical formula. Please refer to FIG. 40 for values of the aspherical parameters.

The fourth lens element 1040 may have negative refracting power, which may be constructed by plastic material. The object-side surface 1041 comprises a concave portion 10411 in the vicinity of the optical axis and a concave portion 10412 in the vicinity of the periphery of the fourth lens element 1040. The image-side surface 1042 has a concave portion 10421 in the vicinity of the optical axis and a convex portion 10422 in the vicinity of a periphery of the fourth lens element 1040. The object-side surface 1041 and the image-side surface 1042 may both be aspherical surfaces defined by the aspherical formula. Please refer to FIG. 40 for values of the aspherical parameters.

As illustrated in FIG. 41, it is clear that the optical imaging lens of the present embodiment may show great characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Figure 42:
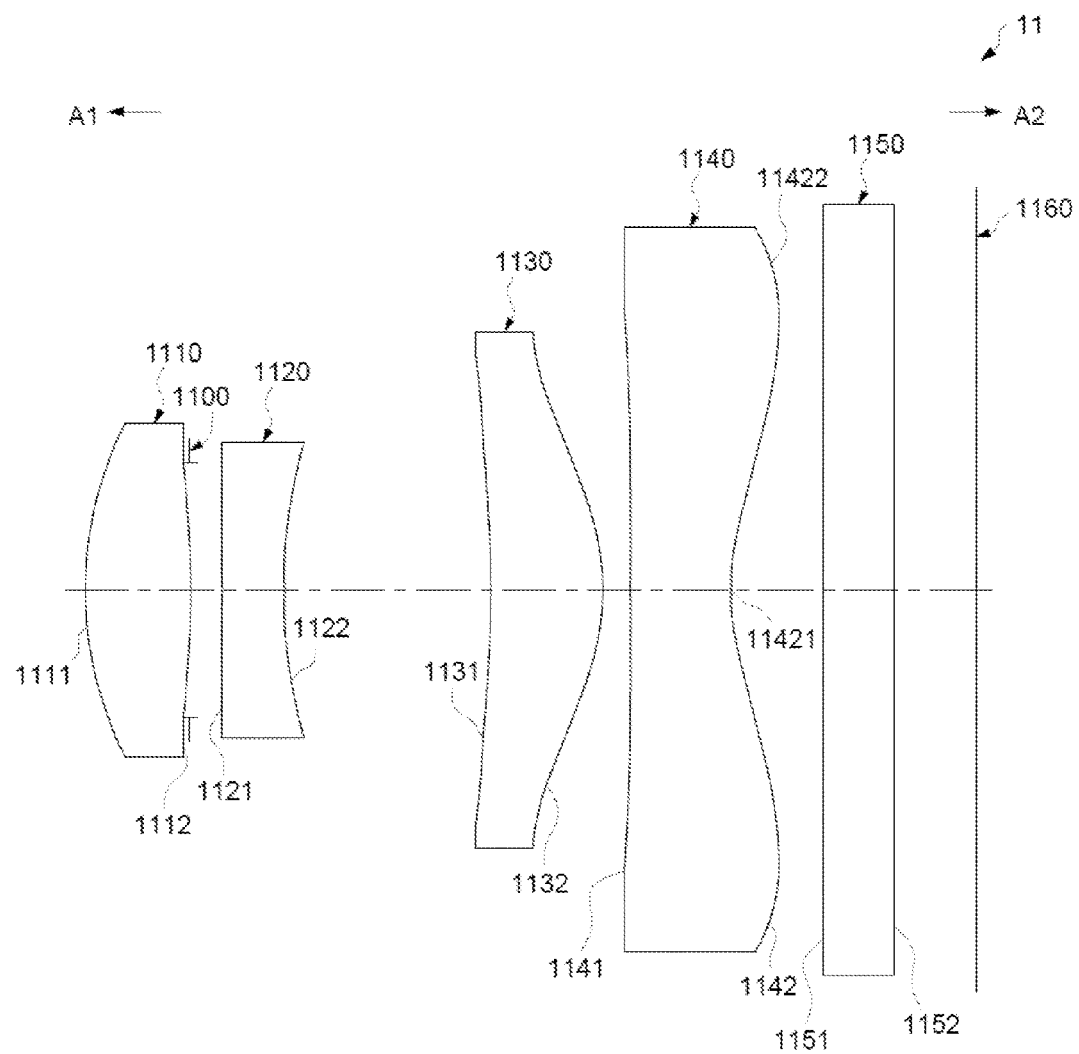
FIG. 42 shows a cross-sectional view of an optical imaging lens having four lens elements of the optical imaging lens according to embodiment 11 of the invention.
Figure 45:
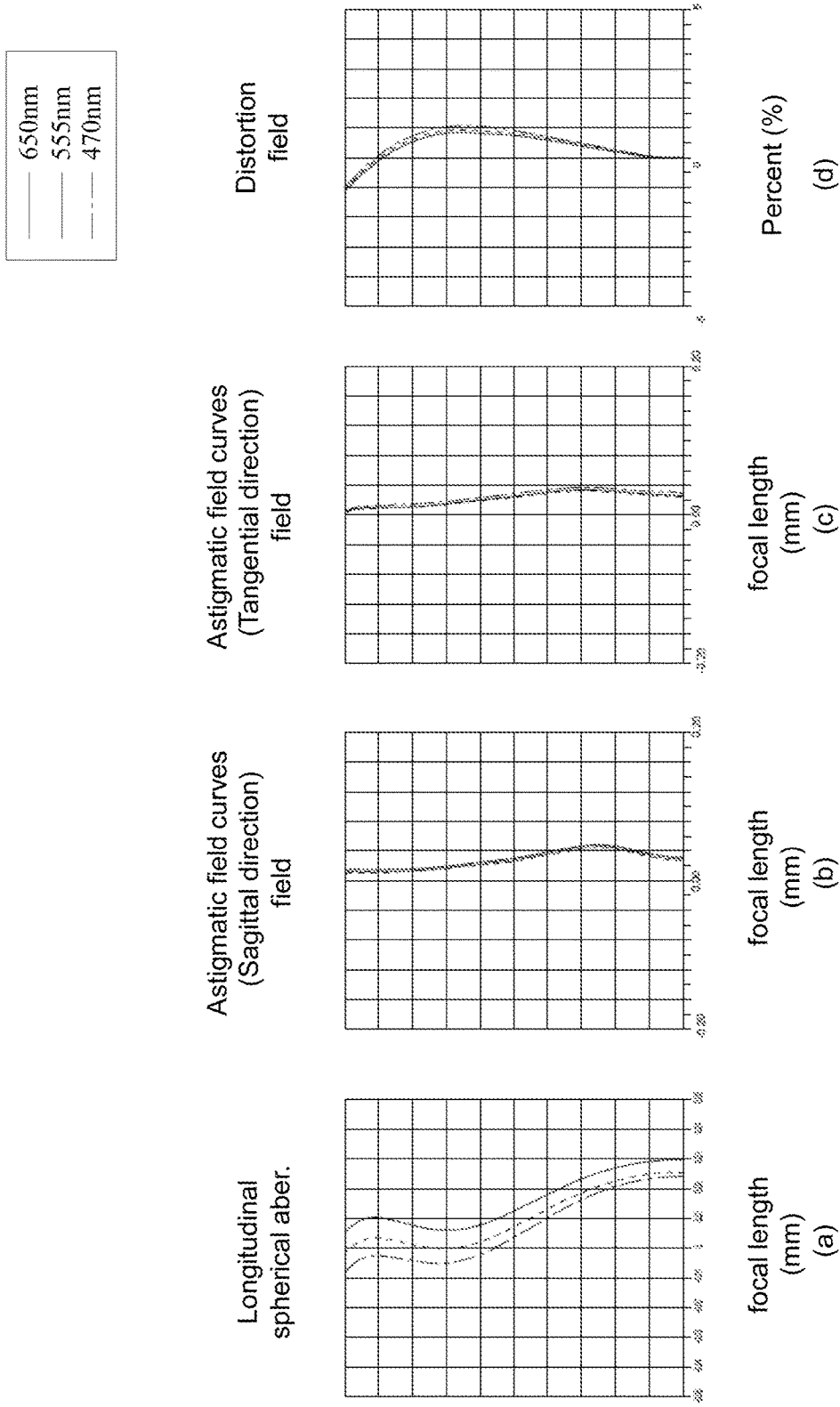
FIG. 45 shows charts of longitudinal spherical aberration and other kinds of optical aberrations of the optical imaging lens according to embodiment 11 of the invention.

Reference is now made to FIGS. 42-45. FIG. 42 illustrates an example cross-sectional view of an optical imaging lens having four lens elements of the optical imaging lens according to a eleventh example embodiment. FIG. 43 shows an example table of optical data of each lens element of the optical imaging lens according to the eleventh example embodiment. FIG. 44 shows an example table of aspherical data of the optical imaging lens according to the eleventh example embodiment. FIG. 45 shows example charts of longitudinal spherical aberration and other kinds of optical aberrations of the optical imaging lens according to the eleventh example embodiment.

As shown in FIG. 42, the optical imaging lens 11 of the present embodiment, in an order from an object side A1 to an image side A2, comprises a first lens element 1110, an aperture stop 1100, a second lens element 1120, a third lens element 1130 and a fourth lens element 1140. Both of a filtering unit 1150 and an image plane 1160 of an image sensor may be positioned at the image side A2 of the optical imaging lens 11. Each of the first, second, third, fourth lens elements 1110, 1120, 1130, 1140 and the filtering unit 1150 has an object-side surface 1111/1121/1131/1141/1151 facing toward the object side A1 and an image-side surface 1112/1122/1132/1142/1152 facing toward the image side A2. Here an example embodiment of filtering unit 1150 may comprise an IR cut filter, which is positioned between the fourth lens element 1140 and the image plane 1160. The filtering unit 1150 filters light with specific wavelength from the light passing optical imaging lens 11. For example, IR light is filtered, and this may prohibit the IR light which is not visible by human eyes from producing an image on image plane 1160.

Similarly, in the present embodiment, air gaps exist between the lens elements 1110, 1120, 1130, 1140, the filtering unit 1150 and the image plane 1160 of the image sensor. Please refer to FIG. 1 for the positions of the air gaps. The sum of all air gaps d1, d2, d3 between the first and fourth lens elements is denoted by $G_{aa}$.

One difference between the eleventh embodiments and the first embodiments is that the central thickness of lens T3 of the third lens element 1130, the air gap $G_{34}$ between the third lens element 1130 and the fourth lens element 1140 and the sum of all air gaps $G_{aa}$ from the first lens element 1110 to the fourth lens element 1140 are different. The apersure stop is positioned between the first lens element 1110 and the second lens element 1120. Please refer to FIG. 43 for the optical characteristics of each lens elements in the optical imaging lens 11 of the present embodiment, wherein the values of the relations (1)~(9) are:

$(T3/G_{34})=4.29;$ $(G_{aa}/T3)=2.33;$ $(EFL/G_{12})=23.85;$ $(T3/G_{12})=3.62;$ $(T2+T3)=0.75(\text{mm});$ $[(T2+T3)/T3]=1.55;$ $(G_{12}+G_{34})=0.25(\text{mm});$ $(f1+f3)=3.76(\text{mm});$ $(BFL/EFL)=0.33;$ wherein the distance from the object-side surface 1111 of the first lens element 1110 to the image plane 1160 is 3.818 (mm), and the length of the optical imaging lens 11 is shortened.

Example embodiments of the lens elements of the optical imaging lens 11 may comprise the following example embodiments:

The first lens element 1110 may have positive refracting power, which may be constructed by plastic material. Both the object-side surface 1111 and the image-side surface 1112 are convex surfaces. The convex surfaces 1111 and 1112 may both be aspherical surfaces defined by the aspherical formula. Please refer to FIG. 44 for values of the aspherical parameters.

The second lens element 1120 may have negative refracting power, which may be constructed by plastic material. The object-side surface 1121 comprises a concave portion 11211 in the vicinity of the optical axis and a convex portion 11212 in the vicinity of the periphery of the second lens element 1120. The image-side surface 1122 is a concave surface. The object-side surface 1121 and the image-side surface 1122 may both be aspherical surfaces defined by the aspherical formula. Please refer to FIG. 44 for values of the aspherical parameters.

The third lens element 1130 may have positive refracting power, which may be constructed by plastic material. The object-side surface 1131 is a concave surface and the image-side surface 1132 is a convex surface. The concave surface 1131 and convex surface 1132 may both be aspherical surfaces defined by the aspherical formula. Please refer to FIG. 44 for values of the aspherical parameters.

The fourth lens element 1140 may have negative refracting power, which may be constructed by plastic material. The object-side surface 1141 comprises a convex portion 11411 in the vicinity of the optical axis and a concave portion 11412 in the vicinity of the periphery of the fourth lens element 1140. The image-side surface 1142 has a concave portion 11421 in the vicinity of the optical axis and a convex portion 11422 in the vicinity of a periphery of the fourth lens element 1140. The object-side surface 1141 and the image-side surface 1142 may both be aspherical surfaces defined by the aspherical formula. Please refer to FIG. 44 for values of the aspherical parameters.

As illustrated in FIG. 45, it is clear that the optical imaging lens of the present embodiment may show great optical characteristics in longitudinal spherical aberration (a), astigmatism in the sagittal direction (b), astigmatism in the tangential direction (c) or distortion aberration (d). Therefore, according to above illustration, the optical imaging lens of the present embodiment indeed achieves great optical performance, and the length of the optical imaging lens is effectively shortened.

Please refer to FIG. 46, which shows the values of $(T3/G_{34})$, $(G_{aa}/T3)$, $(EFL/G_{12})$, $(T3/G_{12})$, $(T2+T3)$, $[(T2+T3)/T3]$, $(G_{12}+G_{34})$, $(f1+f3)$, $(BFL/EFL)$ and fno of all eleven embodiments.

Figure 47:
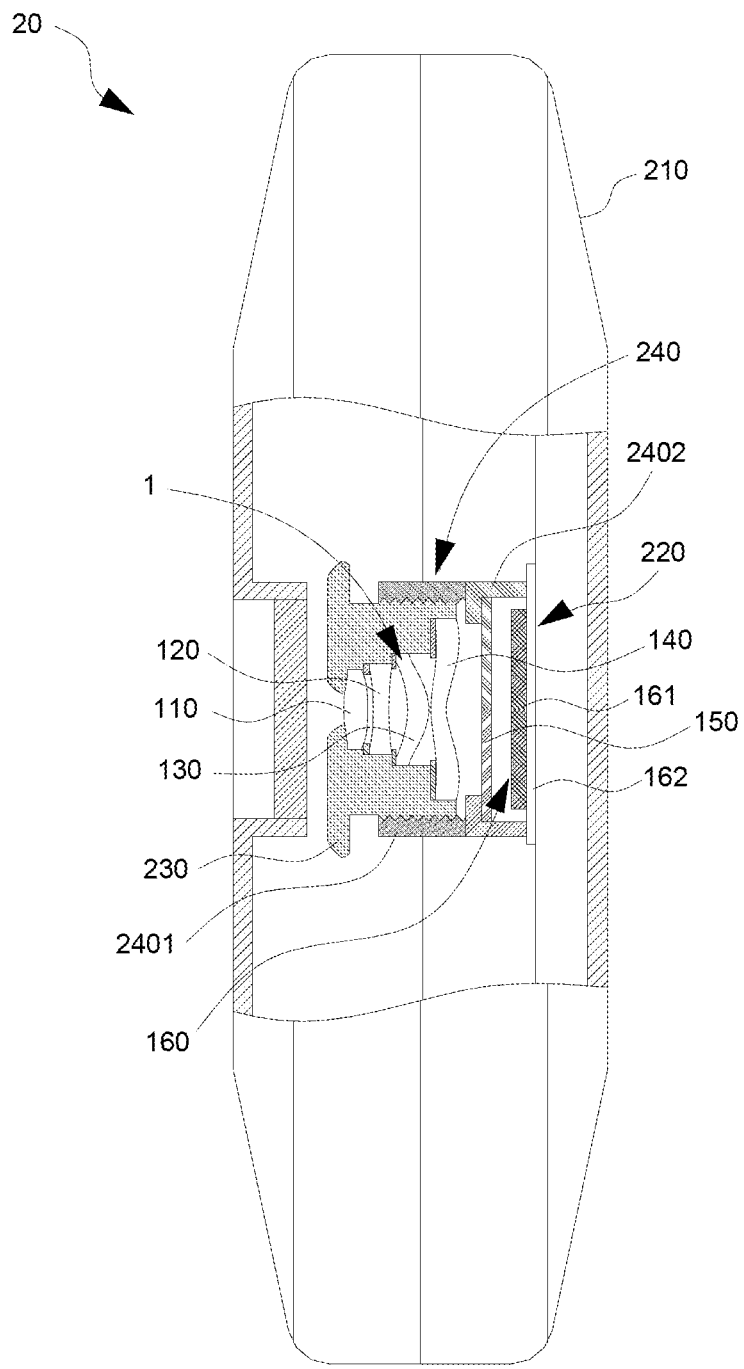
FIG. 47 shows a structure of an example embodiment of a mobile device.

Reference is now made to FIG. 47, which illustrates an example structural view of an example embodiment of mobile device 20 applying an aforesaid optical imaging lens. The mobile device 20 comprises a housing 210 and an optical imaging lens assembly 220 positioned in the housing 210. An example of the mobile device 20 may be, but is not limited to, a mobile phone.

As shown in FIG. 47, the optical imaging lens assembly 220 may comprise an aforesaid optical imaging lens, for example the optical imaging lens 1 of the first embodiment, a lens barrel 230 for positioning the optical imaging lens 1, a module housing unit 240 for positioning the lens barrel 230 and an image sensor 161 which is positioned at an image side of the optical imaging lens 1. The image plane 160 is formed on the image sensor 161.

In some other example embodiments, the structure of the filtering unit 150 may be omitted. In some example embodiments, the housing 210, the lens barrel 230, and/or the module housing unit 240 may be integrated into a single component or assembled by multiple components. In some example embodiments, the image sensor 161 used in the present embodiment is directly attached to the substrate 162 in the form of a chip on board (COB) package, and such package is different from traditional chip scale packages (CSP) since COB package does not require a cover glass before the image sensor 161 in the optical imaging lens 1.

Aforesaid exemplary embodiments are not limited to this package type and could be selectively incorporated in other described embodiments.

The module housing unit 240 comprises a lens backseat 2401 and an image sensor base 2402 positioned between the lens backseat 2401 and the image sensor 161. The lens barrel 230 and the lens backseat 2401 are positioned along a same axis, and the lens barrel 230 is positioned inside the lens backseat 2401.

Because the length of the optical imaging lens 1 is merely 3.063 (mm), the size of the mobile device 20 may be quite small. Therefore, the embodiments described herein meet the market demand for smaller sized product designs.

Figure 48:
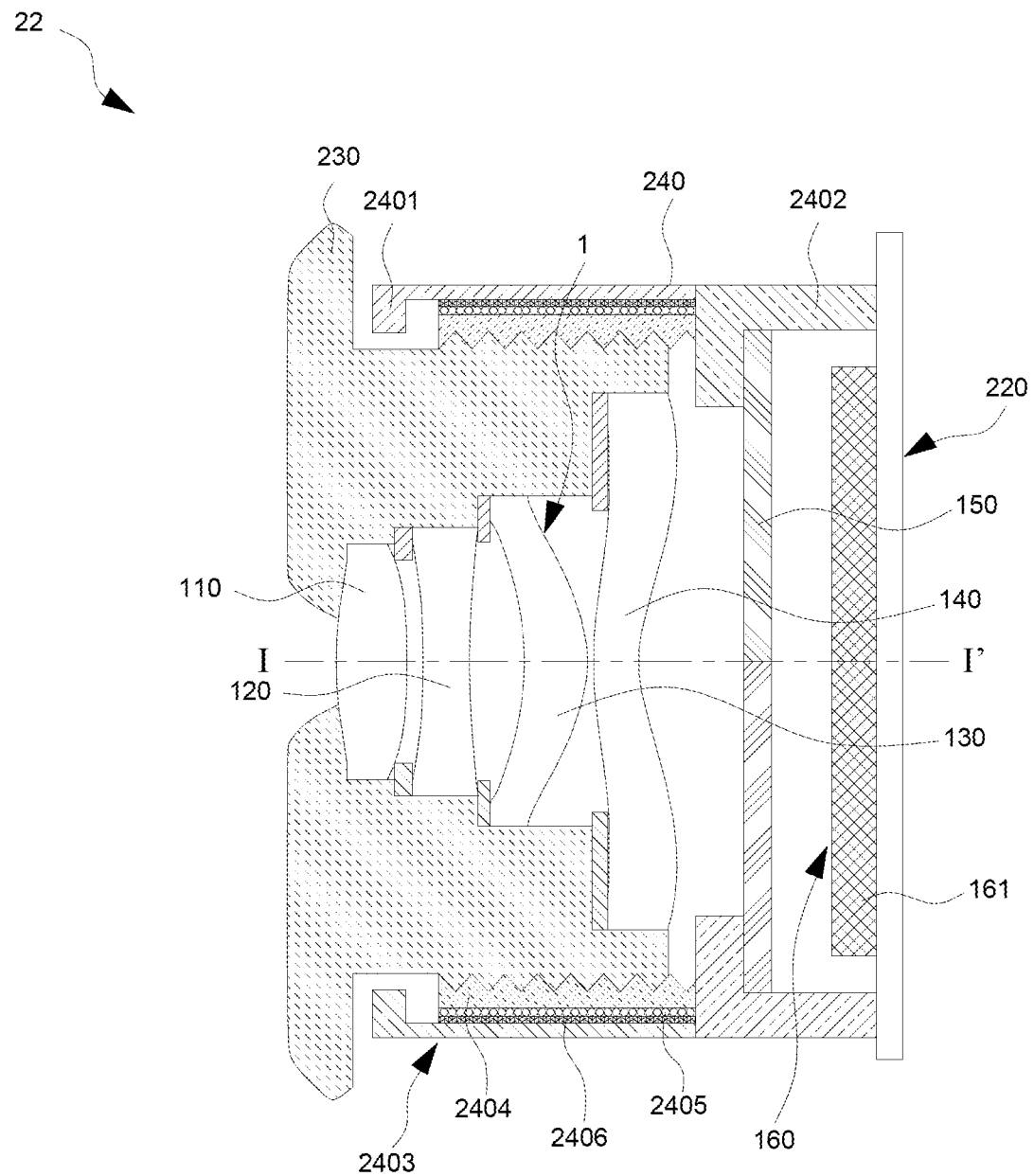
FIG. 48 shows a partially enlarged view of a structure of another example embodiment of a mobile device.

Reference is now made to FIG. 48, which shows another structural view of an example embodiment of mobile device 22 applying the aforesaid optical imaging lens 1. One difference between the mobile device 22 and the mobile device 20 may be the module housing unit 240 further comprising an autofocus module 2403. The autofocus module 2403 may comprise a lens seat 2404, a lens backseat 2401, a coil 2405 and a magnetic unit 2406. The lens seat 2404, which is close to the outside of the lens barrel 230, and the lens barrel 230 are positioned along an axis II', and the lens backseat 2401 is positioned along with the axis II' and around the outside of the the lens seat 2404. The coil 2405 is positioned between the lens seat 2404 and the inside of the lens backseat 2401. The magnetic unit 2406 is positioned between the outside of the coil 2405 and the inside of the lens backseat 2401.

The lens barrel 230 and the optical imaging lens 1 positioned therein are driven by the lens seat 2404 for moving along the axis II'. The sensor backseat 2402 is close to the lens backseat 2401. The filtering unit 150, for example IR cut, is positioned on the sensor backseat 2402. The rest structure of the mobile device 22 is similar to the mobile device 1.

Similarly, because the length of the optical imaging lens 1, 3.063 (mm), is shortened, the mobile device 22 may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling ratio of at least one central thickness of lens element to an air gap along the optical axis between two lens elements and the ratio of a sum of all air gaps along the optical axis between four lens elements to a central thickness of lens in a predetermined range, and incorporated with detail structure and/or refection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising, from an object side to an image side, a first lens element, a second lens element, a third lens element, and a fourth lens element, each of the first, second, third, and fourth lens elements having an object-side surface facing toward the object side and an image-side surface facing toward the image side, wherein:
   the object-side surface of the first element has a convex surface;
   the object-side surface of the second element comprises a concave portion in a vicinity of the optical axis and the image-side surface of the second lens element comprises a concave portion in the vicinity of a periphery of the second lens element;
   the third lens element has positive refracting power;
   the object-side surface and the image-side surface of the fourth element are aspheric;
   the optical imaging lens as a whole has only the four lens elements having refracting power; and
   a central thickness of the third lens element along the optical axis is T3, an air gap between the first lens element and the second lens element along the optical axis is $G_{12}$, and the half field of view of the optical imaging lens is HFOV, and T3, $G_{12}$ and HFOV satisfy the relation:

$4.21 \leq T3/(G_{12} \times \tan(\text{HFOV})) \leq 7.55$, and a sum of air gaps between the first lens element and the fourth lens element along the optical axis is $G_{aa}$, an air gap between the second lens element and the third lens element along the optical axis is $G_{23}$, and $G_{aa}$ and $G_{23}$ satisfy the relation:

$G_{aa}/G_{23} \leq 1.68$.

2. The optical imaging lens of claim 1, wherein an effective focal length is EFL, and a central thickness of the second lens element along the optical axis is T2, and EFL, HFOV, $G_{12}$, and T2 satisfy the relation:

$\text{EFL} \times \tan(\text{HFOV})/(G_{12}+T2) \leq 4.38$.

3. The optical imaging lens of claim 1, wherein a central thickness of the first lens element along the optical axis is T1, a central thickness of the fourth lens element along the optical axis is T4, and a central thickness of the second lens element along the optical axis is T2, and T1, T3, T4, $G_{12}$, and T2 satisfy the relation:

$(T1+T3+T4)/(G_{12}+T2) \leq 3.42$.

4. The optical imaging lens of claim 1, wherein a sum of thicknesses of the first to fourth lens elements is ALT, and a central thickness of the second lens element along the optical axis is T2, and ALT, $G_{12}$, and T2 satisfy the relation:

$ALT/(G_{12}+T2) \leq 4.08$.

5. The optical imaging lens of claim 1, wherein a central thickness of the second lens element along the optical axis is T2, and T3 and T2 satisfy the relation:

$T3/T2 \leq 1.96$.

6. The optical imaging lens of claim 5, wherein a central thickness of the first lens element along the optical axis is T1, and T1, $G_{12}$, and T2 satisfy the relation:

$T1(G_{12}+T2) \leq 1.21$.

7. The optical imaging lens of claim 5, wherein an effective focal length is EFL, and EFL, $G_{12}$, and T2 satisfy the relation:

$EFL/(G_{12}+T2) \le 8.00$.

8. The optical imaging lens of claim 5, wherein an effective focal length is EFL, and an air gap between the third lens element and the fourth lens element along the optical axis is $G_{34}$, and EFL, $G_{12}$, and $G_{34}$ satisfy the relation:

$EFL/(G_{12}+G_{34}) \le 17.67$.

9. The optical imaging lens of claim 1, wherein a central thickness of the second lens element along the optical axis is T2, and T3, $G_{12}$, and T2 satisfy the relation:

$T3/(G_{12}+T2) \le 1.33$.

10. The optical imaging lens of claim 9, wherein a central thickness of the first lens element along the optical axis is T1, and T1 and T2 satisfy the relation:

$T1/T2 \le 1.69$.

11. The optical imaging lens of claim 9, wherein T3 and $G_{12}$ satisfy the relation:

$T3/G_{12} \le 4.97$.

12. The optical imaging lens of claim 9, wherein a central thickness of the fourth lens element along the optical axis is T4, and T4 and T3 satisfy the relation:

$T4/T3 \le 1.00$.

13. The optical imaging lens of claim 9, wherein $G_{23}$ and $G_{12}$ satisfy the relation:

$G_{23}/G_{12} \le 6.6$.

14. The optical imaging lens of claim 1, wherein an effective focal length is EFL, and a central thickness of the first lens element along the optical axis is T1, and EFL, HFOV, and T1 satisfy the relation:

$EFL \times tan(HFOV)/T1 \le 4.02$.

15. The optical imaging lens of claim 14, wherein a central thickness of the fourth lens element along the optical axis is T4, and T4 and $G_{12}$ satisfy the relation:

$T4/G_{12} \le 4.79$.

16. The optical imaging lens of claim 14, wherein $G_{aa}$ and $G_{12}$ satisfy the relation:

$G_{aa}/G_{12} \le 8.45$.

17. The optical imaging lens of claim 14, wherein a sum of thicknesses of the first to fourth lens elements is ALT, and ALT and $G_{12}$ satisfy the relation:

$ALT/G_{12} \le 19.33$.

18. The optical imaging lens of claim 1, wherein an effective focal length is EFL, and a back focal length of the optical imaging lens measured between the image-side surface of the fourth lens element and an image plane along the optical axis is BFL, and EFL, HFOV, and BFL satisfy the relation:

$EFL \times tan(HFOV)/BFL \le 1.87$.

19. The optical imaging lens of claim 18, wherein a sum of thicknesses of the first to fourth lens elements is ALT, and a central thickness of the second lens element along the optical axis is T2, and ALT and T2 satisfy the relation:

$ALT/T2 \le 6.14$.

* * * * *